United States Patent
Ohya et al.

(10) Patent No.: US 10,138,866 B2
(45) Date of Patent: Nov. 27, 2018

(54) FLUID POWER GENERATION METHOD AND FLUID POWER GENERATION DEVICE

(71) Applicant: RIAMWIND Co., Ltd., Fukuoka (JP)

(72) Inventors: Yuji Ohya, Fukuoka (JP); Takashi Karasudani, Fukuoka (JP); Tomoyuki Nagai, Fukuoka (JP); Kimihiko Watanabe, Fukuoka (JP); Hideki Nishimura, Fukuoka (JP); Kazuki Hayashida, Fukuoka (JP)

(73) Assignee: RIAMWIND Co., Ltd., Fukuoka (JP)

( * ) Notice: Subject to any disclaimer, the term of this patent is extended or adjusted under 35 U.S.C. 154(b) by 0 days.

(21) Appl. No.: 15/526,618

(22) PCT Filed: Nov. 13, 2015

(86) PCT No.: PCT/JP2015/082014
§ 371 (c)(1),
(2) Date: Jul. 14, 2017

(87) PCT Pub. No.: WO2016/076425
PCT Pub. Date: May 19, 2016

(65) Prior Publication Data
US 2017/0335821 A1    Nov. 23, 2017

(30) Foreign Application Priority Data
Nov. 14, 2014  (JP) ................................. 2014-231932

(51) Int. Cl.
*F03D 1/02* (2006.01)
*F03B 13/26* (2006.01)
(Continued)

(52) U.S. Cl.
CPC ................ *F03D 1/02* (2013.01); *F03B 13/26* (2013.01); *F03B 13/264* (2013.01);
(Continued)

(58) Field of Classification Search
USPC ........... 290/54, 55; 415/121.2, 182.1, 4.3, 7; 416/1, 132 B
See application file for complete search history.

(56) References Cited

U.S. PATENT DOCUMENTS 3,986,787 A * 10/1976 Mouton, Jr. ............ F03B 11/02
290/54
3,999,884 A * 12/1976 Fuller ...................... B63H 5/14
415/144
(Continued)

FOREIGN PATENT DOCUMENTS

CN          102365452 A      2/2012
EP           2412971 A1      2/2012
(Continued)

OTHER PUBLICATIONS

International Search Report dated Feb. 9, 2016 filed in PCT/JP2015/082014.

*Primary Examiner* — Pedro J Cuevas
(74) *Attorney, Agent, or Firm* — Rankin, Hill & Clark LLP

(57) ABSTRACT

A fluid power generation device is configured to provide electric power generation using fluid action, and comprises multiple power generation mechanisms. Each power generation mechanism comprises: a casing that allows a fluid to pass through its internal space; and a power generation unit arranged within the casing, and configured to perform electric power generation using the fluid action. The casing is configured to generate vortexes in the vicinity of its fluid outlet. The multiple casings are arranged with spaces as intervals between them. Each casing generates vortexes in the vicinity of its fluid outlet. Furthermore, such an arrangement provides an interaction effect between the vortexes generated in the vicinity of the fluid outlets of the multipole casings arranged with the spaces as intervals between them.

(Continued)

This provides a synergistic effect for accelerating the inner flow based on the interaction between the power generation mechanisms.

13 Claims, 22 Drawing Sheets

(51) Int. Cl.
    *F03D 1/04*            (2006.01)
    *F03D 9/25*            (2016.01)
    *F03D 13/20*          (2016.01)
    *H02K 7/18*            (2006.01)
    *F03B 17/06*          (2006.01)
    *F03D 7/02*            (2006.01)

(52) U.S. Cl.
    CPC .............. *F03B 17/061* (2013.01); *F03D 1/04* (2013.01); *F03D 9/25* (2016.05); *F03D 13/20* (2016.05); *H02K 7/1838* (2013.01); *F03D 7/0204* (2013.01); *F05B 2210/16* (2013.01); *F05B 2240/122* (2013.01); *F05B 2240/133* (2013.01); *F05B 2240/40* (2013.01); *F05B 2250/131* (2013.01); *Y02E 10/28* (2013.01); *Y02E 10/721* (2013.01); *Y02E 10/725* (2013.01)

(56) References Cited

U.S. PATENT DOCUMENTS

| | | | | |
|---|---|---|---|---|
| 4,021,135 A * | 5/1977 | Pedersen | .................. | F03D 1/04 415/208.2 |
| 4,025,220 A * | 5/1977 | Thompson | ............ | F03B 17/061 415/121.2 |
| 4,080,100 A * | 3/1978 | McNeese | .................. | F03D 1/04 416/189 |
| 4,110,631 A * | 8/1978 | Salter | ........................ | F03D 1/02 290/55 |
| 4,132,499 A * | 1/1979 | Igra | ............................ | F03D 1/04 415/210.1 |
| 4,166,596 A * | 9/1979 | Mouton, Jr. | ............... | B64B 1/50 244/30 |
| 4,178,124 A * | 12/1979 | Puskas | ...................... | F03D 1/04 415/4.5 |
| 4,213,736 A * | 7/1980 | Gongwer | ................ | F01D 5/141 415/222 |
| 4,219,303 A * | 8/1980 | Mouton, Jr. | ........... | F03B 17/061 415/123 |
| 4,324,985 A * | 4/1982 | Oman | ........................ | F03D 1/04 290/55 |
| 4,550,259 A * | 10/1985 | Bertels | ................... | F03D 1/0608 290/44 |
| 4,720,640 A * | 1/1988 | Anderson | .............. | F03B 13/083 290/43 |
| 4,776,755 A * | 10/1988 | Bjorkestam | ............... | B63H 5/15 415/121.1 |
| 5,599,172 A * | 2/1997 | McCabe | .................... | F03D 1/04 417/334 |
| 6,100,600 A * | 8/2000 | Pflanz | ..................... | B01D 61/58 290/54 |
| 6,749,399 B2 * | 6/2004 | Heronemus | ............... | F03D 1/02 416/41 |
| 6,756,696 B2 * | 6/2004 | Ohya | ........................ | F03D 1/04 290/55 |
| 6,932,561 B2 * | 8/2005 | Yoo | ............................ | F03D 1/04 415/4.3 |
| 7,075,189 B2 * | 7/2006 | Heronemus | ............. | B63B 1/047 290/44 |
| 7,357,622 B2 * | 4/2008 | Corten | .................... | F03B 15/06 416/1 |
| 7,471,009 B2 | 12/2008 | Davis | | |
| 7,528,498 B2 * | 5/2009 | Yeh | ........................... | F03D 1/02 290/55 |
| 7,538,447 B1 * | 5/2009 | Berenda | .................... | F03D 1/04 290/55 |
| 8,072,091 B2 * | 12/2011 | Wilson | .................... | F03B 11/02 290/55 |
| 8,120,197 B2 * | 2/2012 | Branco | .................... | F03B 13/10 290/53 |
| 8,482,146 B2 * | 7/2013 | Freda | ........................ | F03D 1/02 290/55 |
| 8,672,622 B2 * | 3/2014 | Ohya | ........................ | F03D 1/04 415/208.1 |
| D707,628 S * | 6/2014 | Guinard | ....................... | D13/115 |
| 8,834,092 B2 * | 9/2014 | Ohya | .................... | F03B 13/264 415/1 |
| 8,858,177 B2 * | 10/2014 | Janssen | .................... | F03D 3/068 416/104 |
| 8,937,399 B2 * | 1/2015 | Freda | ..................... | F03D 80/70 290/55 |
| 8,939,724 B2 * | 1/2015 | Koya | ........................ | F03D 11/00 416/1 |
| 9,709,028 B2 * | 7/2017 | Freda | ......................... | F03D 1/04 |
| 9,784,244 B1 * | 10/2017 | Souryal | ...................... | F03D 9/11 |
| 9,970,419 B1 * | 5/2018 | Souryal | ................. | H02J 7/1415 |
| 2002/0088222 A1 * | 7/2002 | Vauthier | ............... | F03B 17/061 60/398 |
| 2003/0168864 A1 * | 9/2003 | Heronemus | ............. | B63B 1/047 290/55 |
| 2003/0178856 A1 * | 9/2003 | Ohya | ........................ | F03D 1/04 290/55 |
| 2005/0069415 A1 * | 3/2005 | Ferracani | .................. | F03D 1/04 416/132 B |
| 2005/0074324 A1 * | 4/2005 | Yoo | ............................ | F03D 1/04 415/4.3 |
| 2006/0138782 A1 * | 6/2006 | Friesth | ..................... | F03D 1/025 290/55 |
| 2007/0009348 A1 * | 1/2007 | Chen | ........................ | F03D 1/04 415/2.1 |
| 2007/0138797 A1 * | 6/2007 | Reidy | ....................... | F03D 9/00 290/44 |
| 2008/0258467 A1 * | 10/2008 | Wilson | .................... | F03B 11/02 290/54 |
| 2009/0257862 A2 * | 10/2009 | Presz, Jr. | .................. | F03D 1/04 415/116 |
| 2010/0028132 A2 * | 2/2010 | Presz, Jr. | .................. | F03D 1/04 415/116 |
| 2010/0080683 A1 * | 4/2010 | Presz, Jr. | .................. | F03D 1/04 415/4.3 |
| 2010/0090473 A1 * | 4/2010 | Glass | ........................ | F03D 1/04 290/55 |
| 2010/0150718 A1 * | 6/2010 | Freda | ..................... | B60L 8/006 416/120 |
| 2010/0278647 A1 * | 11/2010 | Janssen | .................... | F03D 3/068 416/99 |
| 2011/0042952 A1 * | 2/2011 | Ohya | ........................ | F03D 1/04 290/52 |
| 2011/0293419 A1 * | 12/2011 | Koya | ....................... | F03D 11/00 416/1 |
| 2012/0086216 A1 | 4/2012 | Ohya et al. | | |
| 2012/0128475 A1 | 5/2012 | Bailey | | |
| 2013/0334824 A1 * | 12/2013 | Freda | ..................... | F03D 80/70 290/55 |
| 2015/0110599 A1 * | 4/2015 | Freda | ..................... | F03D 1/025 415/4.5 |
| 2018/0128240 A1 * | 5/2018 | Freda | ........................ | F03D 1/04 |

FOREIGN PATENT DOCUMENTS

| | | |
|---|---|---|
| JP | 10225075 A2 | 8/1998 |
| JP | 2003097416 A2 | 4/2003 |
| JP | 3621975 B2 | 2/2005 |
| JP | 200746574 | 2/2007 |
| JP | 4736003 B2 | 7/2011 |
| JP | 5030122 | 9/2012 |

(56) References Cited

FOREIGN PATENT DOCUMENTS

| | | |
|---|---|---|
| JP | 201443849 | 3/2014 |
| KR | 10201185792 | 7/2011 |
| WO | 2010109800 A1 | 9/2010 |

* cited by examiner

Fig.11
(a)
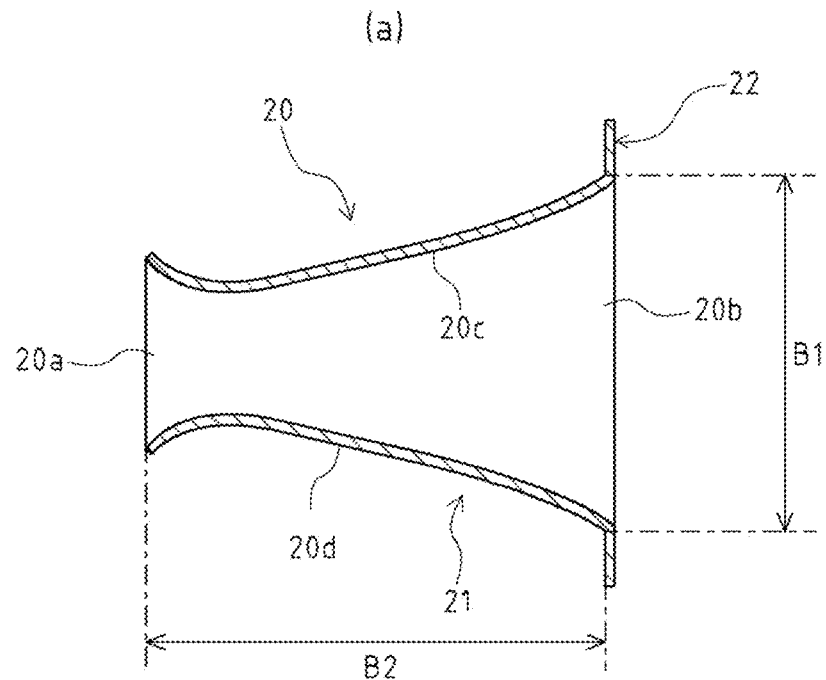
(b)
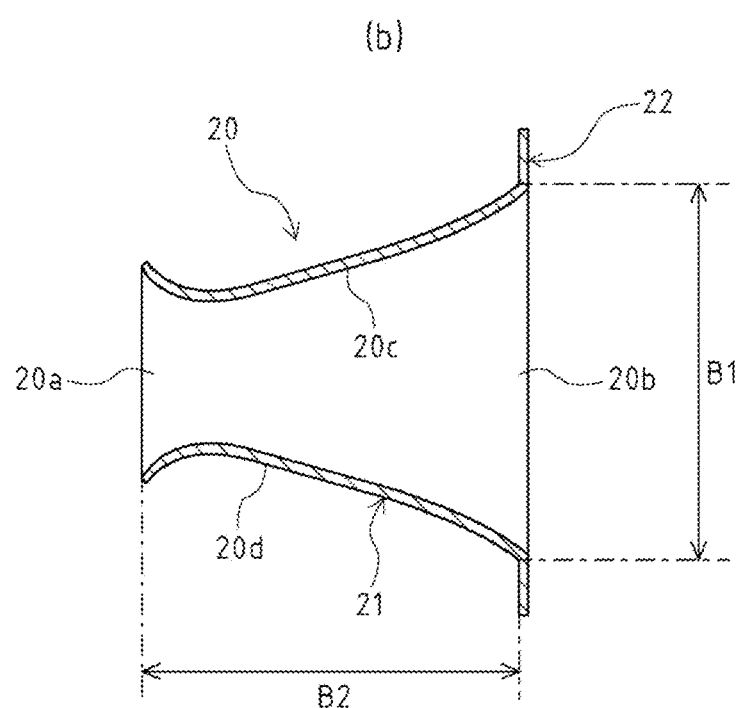

Fig.16
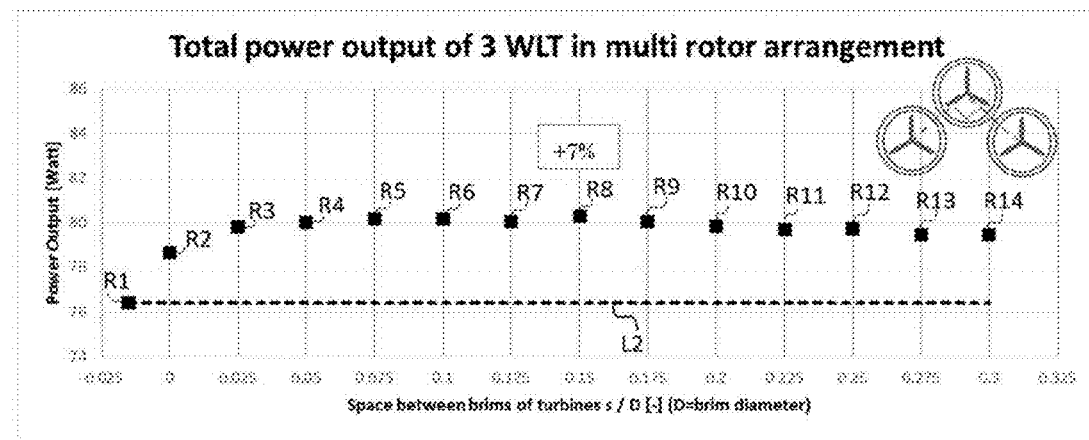
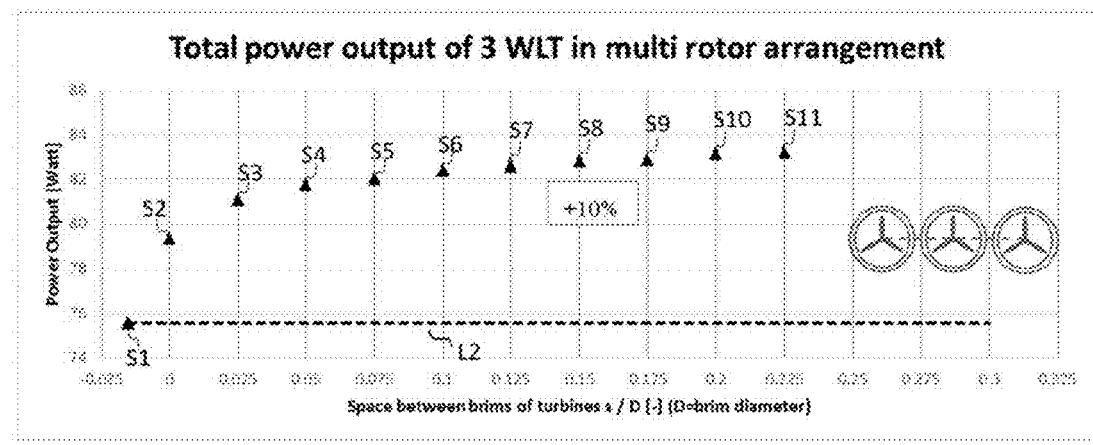

FLUID POWER GENERATION METHOD AND FLUID POWER GENERATION DEVICE

CROSS-REFERENCE TO RELATED APPLICATIONS

The present application is based upon and claims the benefit of priority from the prior Japanese Patent Application No. 2014-231932, filed Nov. 14, 2014, the entire contents of which are incorporated herein by reference.

TECHNICAL FIELD

The present invention relates to a fluid power generation method and a fluid power generation device configured to generate electric power using fluid action.

BACKGROUND ART

A fluid power generating device generates electric power (fluid power generation) using fluid action. Examples of such fluid action include wind power, tidal currents, and the like.

The present inventors have advanced research and development of a wind power generation device including a wind turbine (impeller) configured as a rotor configured to rotate when it receives wind, and a casing configured to generate vortexes in the vicinity of a wind outlet (see Patent documents 1 and 2, for example). Furthermore, actual wind power generation devices such as lens turbines (trademark) or the like have been developed.

Furthermore, as a wind power generation device, a so-called multi-rotor system including multiple wind turbines has been proposed. With typical multi-rotor systems, multiple wind turbines are assembled with a predetermined layout such that there is no interference between the multiple wind turbines. An example of such a multi-rotor system is described in Patent document 3. The multi-rotor system described in Patent document 3 is configured as a set of multiple unit configurations each comprising a wind turbine connected to the front end of a predetermined rotor shaft and a cylindrical duct surrounding the wind turbine such that the multiple unit configurations are mounted in a left-right symmetrical layout on a support pole installed on the Earth's surface.

CITATION LIST

Patent Literature

[Patent Document 1]
  Japanese Patent No. 4736003
[Patent Document 2]
  Japanese Patent No. 5030122
[Patent Document 3]
  Japanese Patent Application Laid Open No. 2003-97416

SUMMARY OF INVENTION

Technical Problem

Wind power energy has been attracting attention as having the greatest potential as a clean energy source. In order to increase the output from such a wind turbine so as to generate a sufficient amount of electric power, supersized (very-large-scale) wind turbines have become the global mainstream. Specifically, development has been performed for such wind turbines having a diameter of 100 m or more so as to output electric power on the order of several MW. However, as the scale of the wind turbine becomes greater, the cost performance becomes lower, or the failure rate becomes larger. In addition, such supersized wind turbines lead to social problems such as increased noise (aerodynamic noise) that occurs due to the wind turbines, increased risk of bird strike, degradation of the surrounding landscape due to such large-scale wind turbines or sharp blades, and the like. Accordingly, it is difficult for local people to accept such supersized wind turbines, leading to difficulty in installing such wind turbines, which is a problem.

It can be anticipated that a multi-rotor system is capable of solving such problems involved in such supersized wind turbines at some level. However, with typical multi-rotor systems, such an arrangement provides only overall output without any synergistic effects, which is simply represented by the product of the output of each wind turbine and the number of wind turbines. That is to say, with the number of wind turbines in the system as "n", the output of the overall system is a multiple n of the output of each single wind turbine. For example, with such an arrangement as described in Patent document 1 in which multiple wind turbines each mounting a cylindrical duct are arranged so as to form a system, such a cylindrical duct acts as a barrier with respect to the flow of wind. This leads to an elevation in pressure on the upstream side of the wind turbine, which interferes with the flow of wind. Accordingly, in a case of employing such an arrangement described in Patent document 3, it is estimated that the output of the overall system is smaller than a multiple n of the output of each single wind turbine. It should be noted that improvement of such conventional multi-rotor systems has limitations, and provide only a small increase in efficiency on the order of at most 1 to 3%.

As described above, such a conventional multi-rotor system provides overall output only on the order of the sum total of the outputs of all the wind turbine units. Accordingly, with such conventional multi-rotor systems, it is difficult to provide high-efficiency electric power generation. That is to say, it is substantially difficult for such conventional multi-rotor systems to provide significant power that matches the output of a supersized wind turbine.

It can be understood that such a problem can occur in various kinds of fluid power generation devices using fluid action.

The present invention has been made in view of such a situation as described above. Accordingly, it is a purpose of the present invention to provide a fluid power generation method or the like employing multiple power generation mechanisms so as to generate a large amount of electric power with high efficiency.

Solution of Problem

The first aspect of the present invention relates to a fluid power generation method employed in a fluid power generation device configured to perform electric power generation using a fluid action. The fluid power generation device comprises multiple power generation mechanisms. Each of the power generation mechanisms comprises: a casing configured to allow a fluid to pass through an interior thereof; and a power generation unit arranged within the casing, and configured to generate electric power using the fluid action. The casing is configured to have a structure for generating vortexes in the vicinity of a fluid outlet. The multiple casings are arranged so as to define a space between each adjacent pair thereof. The fluid power generation method comprises:

generating, by means of each casing, the vortexes in the vicinity of the fluid outlet; and controlling the vortex so as to provide an interaction effect between the vortexes thus generated in the vicinity of the fluid outlets of the multiple casings arranged with the spaces as intervals between them.

The second aspect of the present invention relates to the fluid power generation method according to the first aspect. The fluid power generation device comprises at least a first power generation mechanism, a second power generation mechanism, and a third power generation mechanism. The first power generation mechanism, the second power generation mechanism, and the third power generation mechanism are arranged in a layout other than a linear array layout. The space defined between the casing of the first power generation mechanism and the casing of the third power generation mechanism is larger than the space defined between the casing of the first power generation mechanism and the casing of the second power generation mechanism, and is larger than the space defined between the casing of the second power generation mechanism and the casing of the third power generation mechanism.

The third aspect of the present invention relates to the fluid power generation method according to the first aspect. The fluid power generation device comprises at least a first power generation mechanism, a second power generation mechanism, and a third power generation mechanism. The first power generation mechanism, the second power generation mechanism, and the third power generation mechanism are sequentially arranged in a linear array layout, so as to provide a vortex interaction effect between the first power generation mechanism and the second power generation mechanism, and between the second power generation mechanism and the third power generation mechanism, without involving such a vortex interaction effect between the first power generation mechanism and the third power generation mechanism.

The fourth aspect of the present invention relates to the fluid power generation method according to the first aspect. The fluid power generation device comprises at least a first power generation mechanism, a second power generation mechanism, and a third power generation mechanism. A space between the casings of the first power generation mechanism and the second power generation mechanism, a space between the casings of the second power generation mechanism and the third power generation mechanism, and a space between the casings of the first power generation mechanism and the third power generation mechanism are each defined to have the same size.

The fifth aspect of the present invention relates to the fluid power generation method according to any one of the first aspect through the fourth aspect. A part of or otherwise all of the multiple power generation mechanisms are arranged such that they can be rotated around a predetermined axis defined along a vertical direction. The fluid power generation device comprises a control unit configured to control a pair of the power generation mechanisms arranged such that they face each other across the predetermined axis so as to provide a difference in a load applied to the power generation unit between the pair of power generation mechanisms.

The sixth aspect of the present invention relates to the fluid power generation method according to any one of the first aspect through the fifth aspect. The casing comprises a flange portion configured to generate vortexes in the vicinity of the fluid outlet.

The seventh aspect of the present invention relates to the fluid power generation method according to any one of the first aspect through the sixth aspect. The orientations of the inner flows of the fluid that flows through the internal spaces of the respective casings are approximately in parallel with each other.

The eighth aspect of the present invention relates to the fluid power generation method according to any one of the first aspect through the seventh aspect. The casing is configured to generate vortexes in the vicinity of a fluid outlet thereof, so as to accelerate an inner flow speed of the fluid that flows through the casing. In the acceleration of the inner flow speed of the fluid, the vortexes thus generated in the vicinity of the fluid outlet of each casing are controlled so as to provide an interaction effect between the multiple casings arranged with the spaces as intervals between them, so as to raise the inner flow speed of the fluid that flows through each casing as compared with the inner flow speed provided without such an interaction effect.

The ninth aspect of the present invention relates to the fluid power generation method according to any one of the first aspect through the eighth aspect. The power generation unit comprises a rotor configured to rotate around a rotational axis and/or a rotor comprising an outer rotor generator comprising a coil fixed to a fixed shaft, and a magnet arranged on an outer circumferential side of the coil, and configured to rotate according to rotation of blades. The power generation unit further comprises multiple spokes each mounted between the casing and a front end or otherwise a rear end of the fixed shaft along an axial direction of the fixed shaft.

The tenth aspect of the present invention relates to the fluid power generation method according to any one of the first aspect through the ninth aspect. The fluid power generation device further comprises a casing member configured to surround the multiple power generation mechanisms.

The eleventh aspect of the present invention relates to the fluid power generation method according to any one of the first aspect through the tenth aspect. The space is defined with a size that is included within a range comprising 0.05 times to 1.5 times a maximum outer size of the casing.

The twelfth aspect of the present invention relates to a fluid power generation device configured to provide electric power generation using a fluid action. The fluid power generation device comprises multiple power generation mechanisms. Each of the power generation mechanisms comprises: a casing that allows a fluid to pass through an internal space thereof; and a power generation unit arranged within the casing, and configured to perform electric power generation using the fluid action. The casing is configured to have a shape for generating vortexes in the vicinity of a fluid outlet thereof. The multiple casings are arranged with spaces as intervals between them. The vortexes generated in the vicinity of the fluid outlet of each casing are controlled so as to provide an interaction effect between the multiple casings arranged with the spaces as intervals between them.

The thirteenth aspect of the present invention relates to the fluid power generation device according to the twelfth aspect. The space is defined with a size that is included within a range comprising 0.05 times to 1.5 times a maximum outer size of the casing.

Advantageous Effects of Invention

With the aspects according to the present invention, by employing multiple power generation mechanisms, such an arrangement provides a fluid power generation device with dramatically reduced weight, reduced costs, improved maintenance efficiency, and an improved availability ratio. Furthermore, each power generation mechanism is configured to generate vortexes in the vicinity of its fluid outlet. Such multiple power generation mechanisms are arranged with spaces as intervals between them so as to provide an interaction effect between the vortexes generated by the multiple power generation mechanisms. Thus, such an arrangement provides a synergistic effect based on the interaction between the power generation mechanisms, thereby providing a large output capacity with high efficiency, which is a point of difference from conventional multi-rotor systems.

BRIEF DESCRIPTION OF DRAWINGS

FIG. 11 is a diagram showing a modification of a wind conducting unit according to each embodiment of the present invention.

FIG. 16 is a diagram showing a comparison example of the relation between the angle employed in the layout shown in FIG. 15 and the measurement value of the overall output.

DESCRIPTION OF EMBODIMENTS

The present invention relates to a fluid power generation device configured to generate electric power using fluid action such as wind power, tidal current, or the like. The fluid power generation device employs a system including multiple power generation mechanisms each including a casing and a power generation unit mounted within the casing. With the present invention, the improved structure of each casing and the improved layout of the multiple power generation mechanisms are proposed so as to provide a synergistic effect in employing such multiple power generation mechanisms each generating vortexes in the vicinity of its fluid outlet, in addition to an advantage in employing such multiple power generation mechanisms, thereby providing high-efficiency power generation. Description will be made below regarding an embodiment of the present invention.

Description will be made below regarding an embodiment of the present invention as an example with reference to a wind power generation device using wind action. It should be noted that the fluid power generation device according to the present invention is applicable to various kinds of power generation devices configured to generate electric power using fluid action such as tidal power generation devices using tidal action, hydroelectric power generation devices using an ocean current or a streamflow in a river, or the like.

First Embodiment

Figure 1:
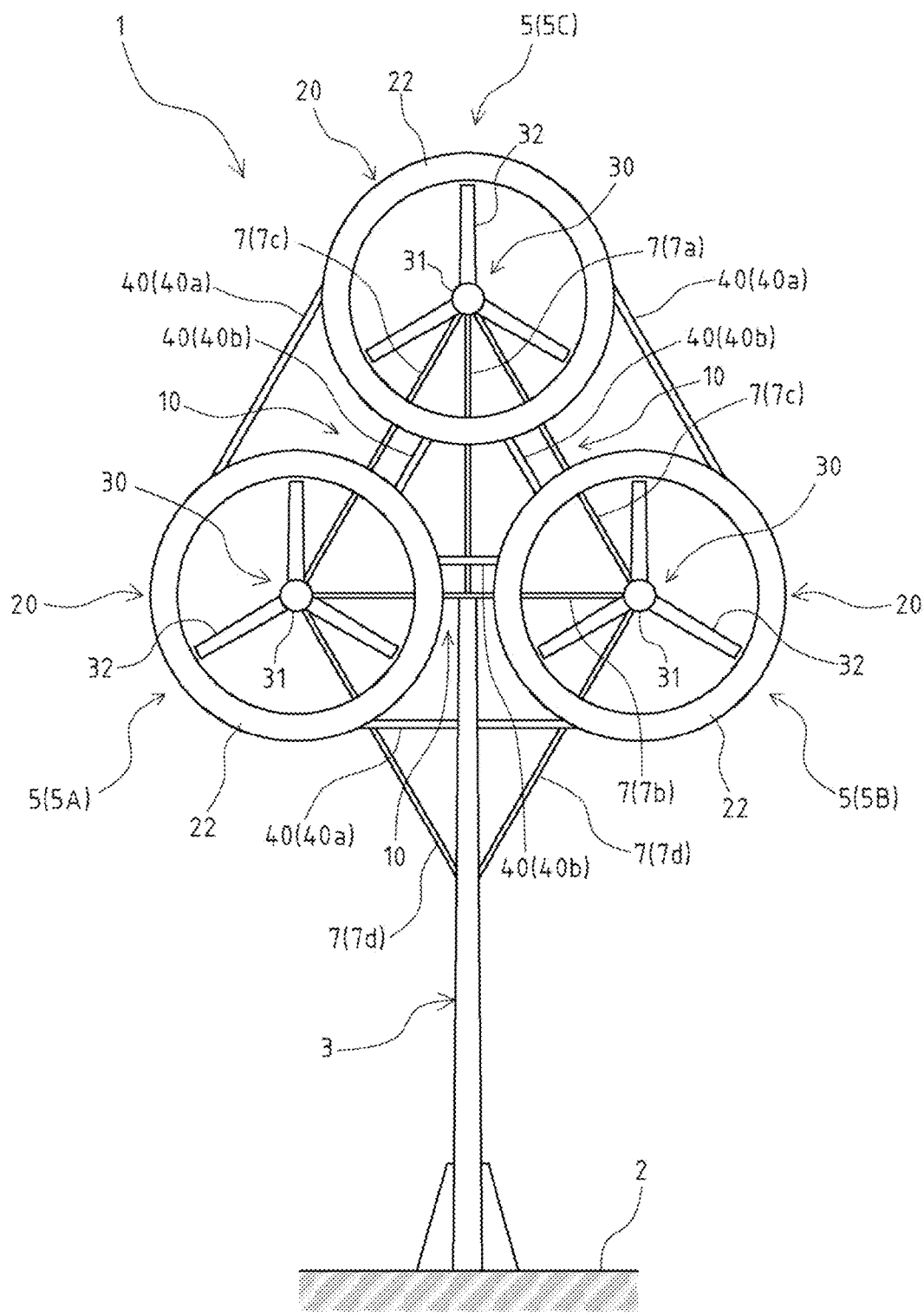
FIG. 1 is a back view showing a configuration of a wind power generation device according to a first embodiment of the present invention.
Figure 2:
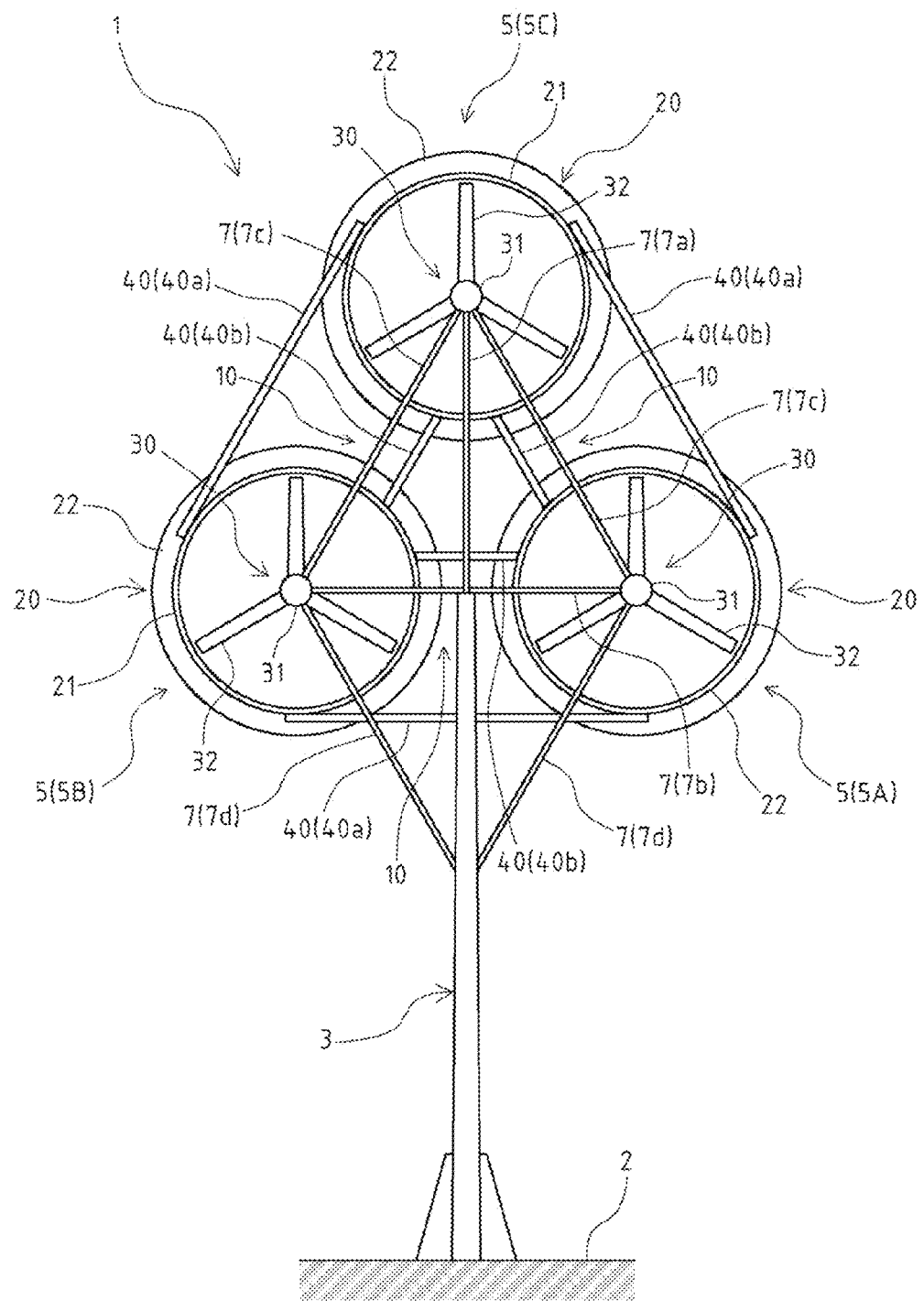
FIG. 2 is a front view showing the configuration of the wind power generation device according to the first embodiment of the present invention.

Description will be made regarding a first embodiment of the present invention. As shown in FIGS. 1 and 2, a wind power generation device 1 according to the present embodiment is configured as a multi-rotor wind power generation system including multiple rotor mechanisms 5 each configured to generate electric power using wind power. That is to say, the wind power generation device 1 according to the present embodiment includes three rotor mechanisms 5. With such a wind power generation device 1, the rotor mechanism 5 are each configured as a basic unit of a wind turbine, and are arranged in a predetermined layout so as to form a wind power generation system.

Each rotor mechanism 5 includes a wind conducting unit 20 configured as a casing and a wind turbine 30 configured as a rotor mounted within the wind conducting unit 20. With such a rotor mechanism 5, the wind turbine 30 is rotated using the natural flow of wind. The rotational energy (kinetic energy) generated by each wind turbine 30 is converted into electric energy by means of an electric power generator, thereby providing electric power generation.

The three rotor mechanisms 5 included in the wind power generation device 1 are supported in a predetermined layout by means of a support pole 3 installed such that it stands erect on a predetermined installation base 2 configured as a support base or the like installed on the Earth's surface. Description will be made in the present embodiment regarding an arrangement in which the three rotor mechanisms 5 are each configured to have the same structure and the same size.

Description will be made regarding the layout of the three rotor mechanisms 5 included in the wind power generation device 1 according to the present embodiment. The three rotor mechanisms 5 are arranged such that the rotational shafts of the wind turbines 30 are aligned approximately in parallel with each other along their axis direction (which will be referred to as the "rotor axis direction" hereafter). Furthermore, the three rotor mechanisms 5 are arranged on the same plane that orthogonal to the rotor axial direction. That is to say, the three rotor mechanisms 5 are arranged at the same position along the rotor axial direction (front-back direction). It should be noted that the present invention is not restricted to such an arrangement in which the three rotor mechanisms 5 are arranged at the same position in the rotor axial direction. Also, the adjacent rotor mechanisms 5 may be arranged at different positions with a distance between them in the rotor axial direction. That is to say, the adjacent rotor mechanisms 5 may each be arranged with an offset (in a staggered layout). It should be noted that description will be made regarding the wind power generation device 1 and the rotor mechanisms 5 with the downwind side or the downstream side as the "back side", and with the upwind side or the upstream side as the "front side".

Figure 7:
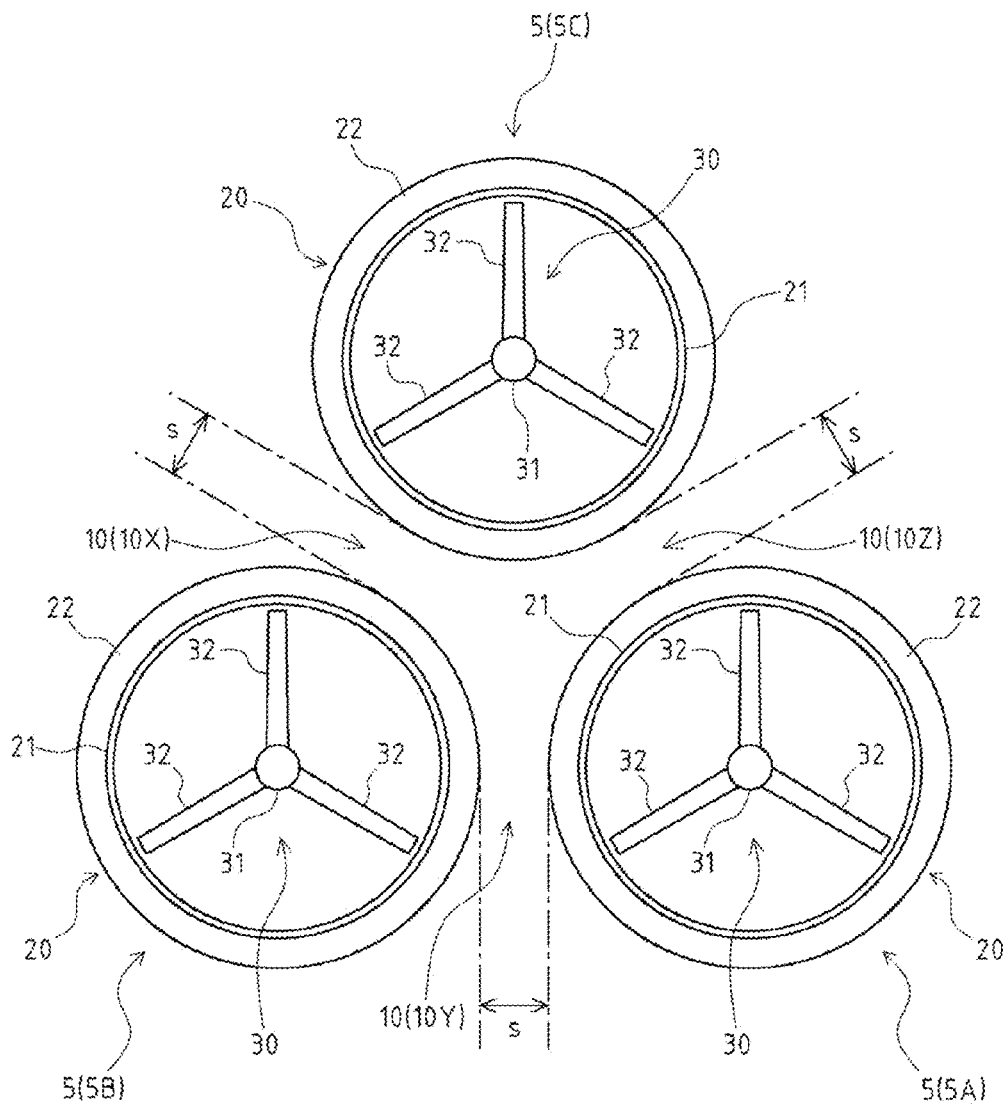
FIG. 7 is a diagram showing a layout of the multiple rotor mechanisms according to the first embodiment of the present invention.
Figure 9:
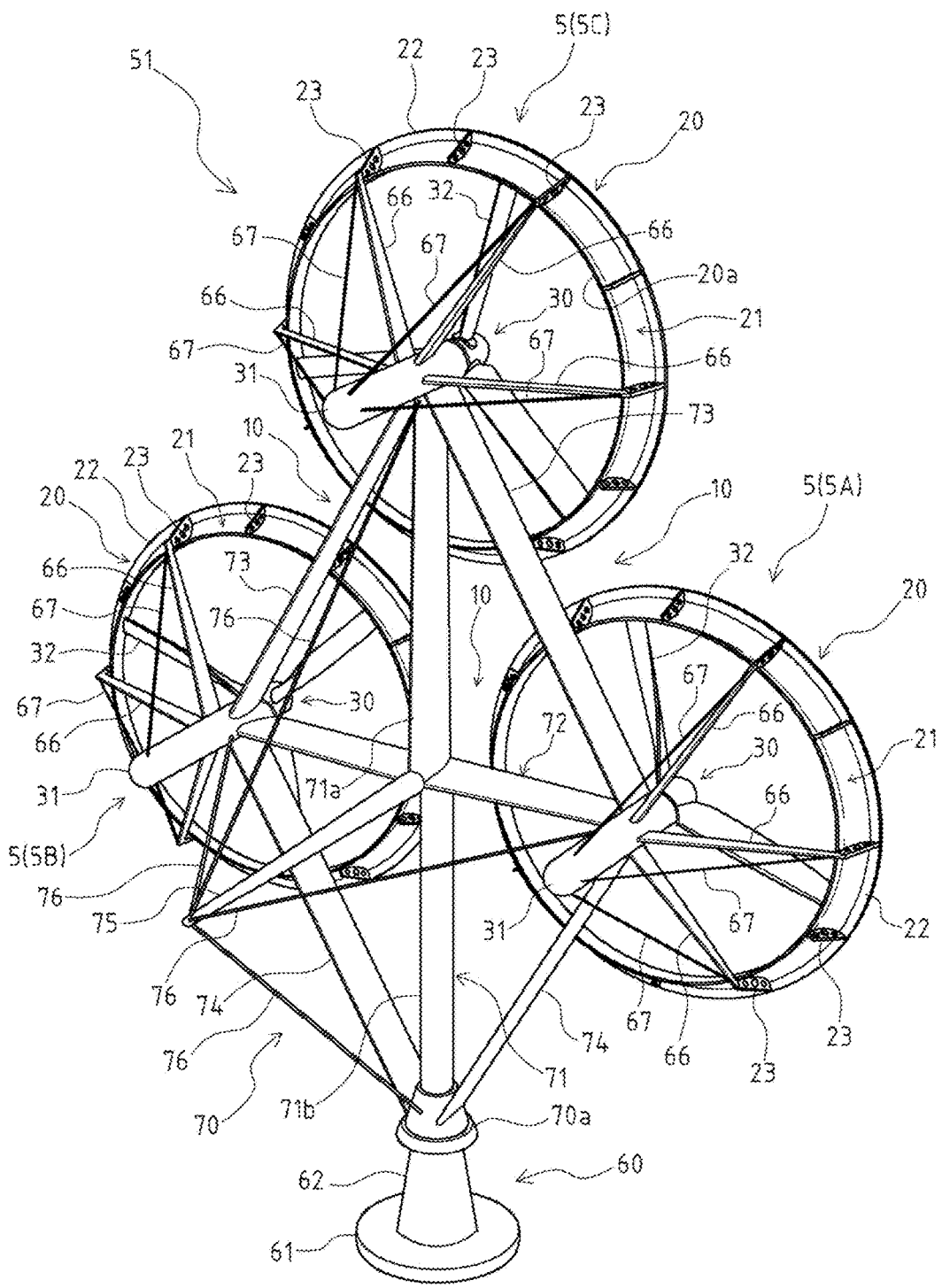
FIG. 9 is a perspective view from the front side showing a configuration of a wind power generation device according to a second embodiment of the present invention.
Figure 10:
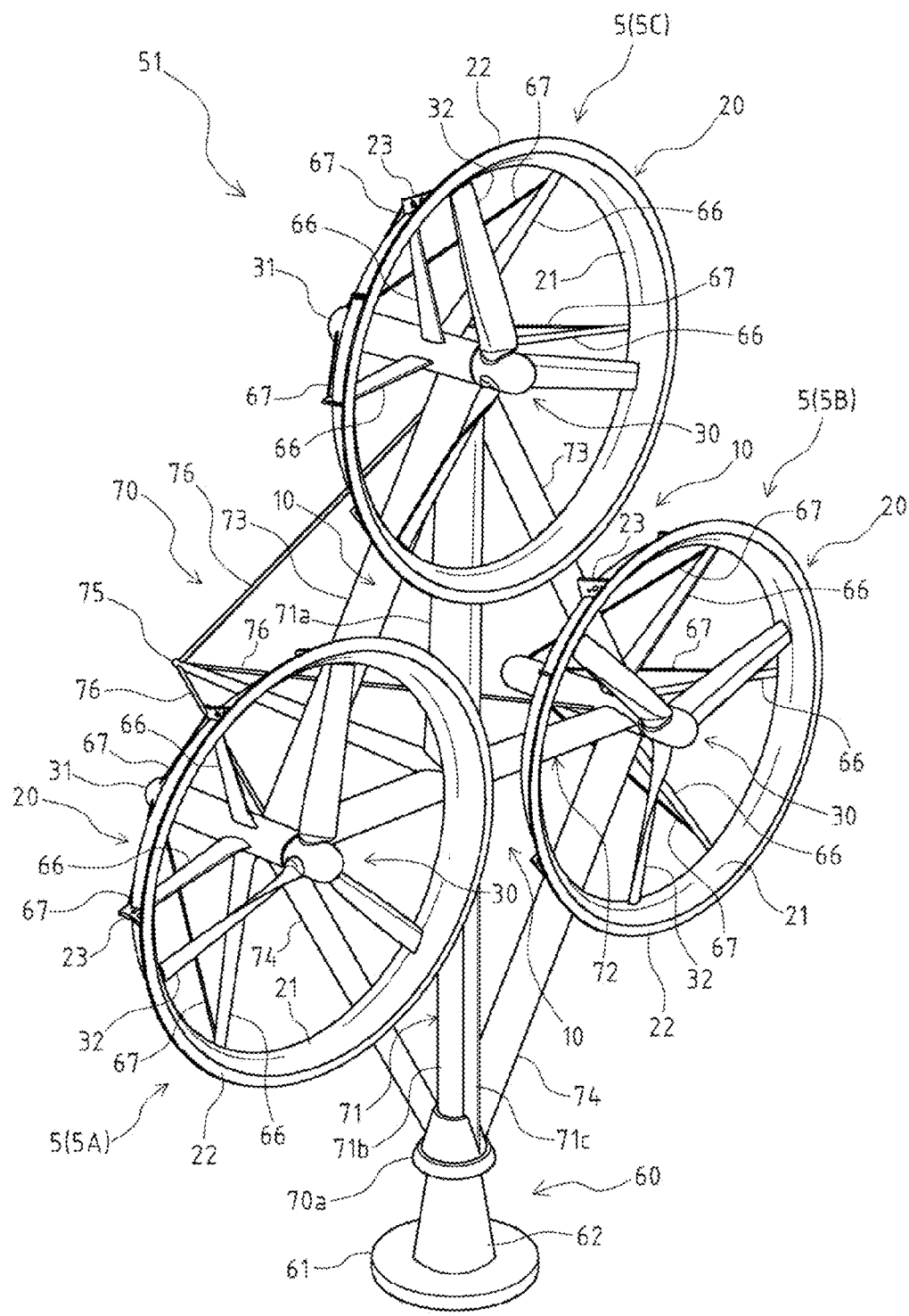
FIG. 10 is a perspective view from the back side showing the configuration of the wind power generation device according to the second embodiment of the present invention.

As shown in FIGS. 1 and 2, the three rotor mechanisms 5 are arranged such that their layout defines an isosceles triangular shape (FIGS. 1 and 2 show a regular triangular layout as an example of such an isosceles triangular layout, in the same manner as that shown in FIGS. 7, 9, and 10). That is to say, the three rotor mechanisms 5 are arranged such that, as viewed along the rotor axial direction, each apex of such a regular triangular shape is defined by the position of the rotational axis of the wind turbine 30 of the corresponding rotor mechanism 5, and such that a particular side of the regular triangular shape thus defined extends in the horizontal direction. That is to say, the three rotor mechanisms 5 are arranged such that three straight lines each defined as an imaginary line that connects the positions of the rotational axes of the wind turbines 30 of the adjacent rotor mechanisms 5 define an upright regular triangle in a state in which it stands elect as viewed along the rotor axial direction.

Accordingly, from among the three rotor mechanisms 5, a pair of rotor mechanisms 5 are arranged at the same height. The remaining one rotor mechanism 5 is arranged above the pair of rotor mechanisms 5 and between them in the horizontal direction. That is to say, such a pair of rotor mechanisms 5 arranged at the same height are each arranged at a lower position. Furthermore, another rotor mechanism 5 is arranged as an upper rotor mechanism above the pair of lower rotor mechanisms 5 and is arranged at a midpoint between them in the horizontal direction. In some cases, description will be made below with distinction made between such three rotor mechanisms 5. In this case, as shown in FIG. 1, for convenience, as viewed from the back side of the rotor mechanism 5, description will be made with the rotor mechanism on the lower-left side as the rotor mechanism 5A, with the rotor mechanism 5 on the lower-right side as the rotor mechanism 5B, and with the rotor mechanism 5 on the upper side as the rotor mechanism 5C.

Furthermore, with the three rotor mechanisms 5 arranged in such a regular triangular layout, a predetermined space (which will be referred to as the "wind turbine gap space" hereafter) 10 is defined between the adjacent rotor mechanisms 5. That is to say, the adjacent rotor mechanisms 5 are arranged such that they are separated by such a wind turbine gap space 10 having a predetermined size along a direction defined in a plane that is orthogonal to the rotor axial direction on which the three rotor mechanisms 5 are positioned. It should be noted that detailed description will be made later regarding the wind turbine gap space 10.

The three rotor mechanisms 5 arranged in such a layout described above are supported by means of the support pole 3 installed on the installation base 2 via a predetermined support structure. With the present embodiment, as shown in FIGS. 1 and 2, the three rotor mechanisms 5 are supported by the support pole 3 via multiple support rods 7. The wind power generation device 1 has a left-right symmetrical structure including the three rotor mechanisms 5, the support pole 3, and the support rods 7. Specific description will be made below.

The support pole 3 is configured such that it extends in a straight manner in the vertical direction (perpendicular direction) orthogonal to the installation base 2. The support pole 3 is arranged on the front side of the three rotor mechanisms 5, at the midpoint between the pair of adjacent lower rotor mechanisms 5 in the horizontal direction, such that its top end is positioned at the central position of the lower pair of the rotor mechanisms 5, i.e., at approximately the same height (level) as that of the rotational axis of the wind turbine 30 of each lower rotor mechanism 5.

The support rods 7 configured to allow the support pole 3 to fixedly support the rotor mechanisms 5 include: a vertical support rod 7a, a horizontal support rod 7b, a pair of upper diagonal support rods 7c, and a pair of lower diagonal support rods 7d. The vertical support rod 7a is arranged such that it extends upward from the top end of the support pole 3. The vertical support rod 7a is connected to a rotational shaft unit 31 of the wind turbine 30 of the upper rotor mechanism 5C arranged above the support pole 3. The horizontal support rod 7b is arranged such that it extends from the top end of the support pole 3 toward both the left and right sides in the horizontal direction. The horizontal support rod 7b is connected to a rotational shaft unit 31 of the wind turbine 30 of each of the pair of lower rotor mechanisms 5A and 5B. That is to say, the horizontal support rod 7b is arranged such that it extends in the horizontal direction so as to connect the respective rotational shaft units 31 of the lower left and right rotor mechanisms 5A and 5B.

The pair of upper diagonal support rods 7c are each arranged with a slope so as to connect the rotational shaft unit 31 of the upper rotor mechanism 5C with those of the lower left and right rotor mechanisms 5A and 5B. With such an arrangement, the pair of upper diagonal support rods 7c and the horizontal support rod 7b are arranged so as to define a regular triangular shape that corresponds to the layout of the three rotor mechanisms 5. The pair of lower diagonal support rods 7d are arranged to have an upper-lower symmetrical layout with respect to that of the pair of upper diagonal support rods 7c. Specifically, the pair of lower diagonal support rods 7d are arranged such that they extend toward both the left and right sides with a positive slope from an intermediate portion of the support pole 3 extending along the vertical direction. The pair of lower diagonal support rods 7d are respectively connected to the rotational shaft units 31 of the lower left and right rotor mechanisms 5A and 5B.

Accordingly, as shown in FIG. 2, as viewed from the front side of the rotor mechanisms 5, the pair of upper diagonal support rods 7c and the pair of lower diagonal support rods 7d are arranged such that they define a rhombic shape having a pair of diagonal lines extending respectively in the horizontal direction and in the vertical direction. That is to say, the vertical support rod 7a and the horizontal support rod 5b are arranged such that they extend along the pair of diagonal lines of such a rhombic shape thus defined by the pair of upper diagonal support rods 7c and the pair of lower diagonal support rods 7d.

It should be noted that the support structure that allows the support pole 3 to support the three rotor mechanisms 5 is not restricted in particular. That is to say, various kinds of support structures may be employed as appropriate. Such a support structure that can be employed is required only to fixedly support the three rotor mechanisms 5 such that they are each mounted at a predetermined height above the installation base 2 in a state in which a relative position relation is maintained between them, in order to provide sufficient wind-resistance stability.

Next, description will be made regarding a configuration of each rotor mechanism 5 with reference to the drawings including FIGS. 3 through 5. The rotor mechanism 5 includes a ring-shaped or cylindrical wind conducting unit 20 and a wind turbine 30 arranged within the wind conducting unit 20, and configured as an electric power generation rotor that rotates around a predetermined rotational axis upon receiving the action of wind power.

The wind conducting unit 20 has an overall structure configured as a ring-shaped member having a cylindrical shape designed such that its axial-direction size is smaller than its radial-direction size. The wind conducting unit 20 has a wind inlet 20a defined as an opening on one side (left side in FIG. 5) along the rotor-axial direction defined in the cylindrical outer shape thereof, and has a wind outlet 20b defined as an opening on the other side thereof (right side in FIG. 5) along the rotor axial direction.

The wind conducting unit 20 has a structure for generating vortexes in the vicinity of the wind outlet 20b, so as to raise the speed of the wind that flows through the internal space of the wind conducting unit 20. The wind conducting unit 20 is configured to have a non-streamlined shape with respect to the wind flow direction, and to surround the wind turbine 30 such that the wind flow is separated into the inner flow and the outer flow. Specifically, the wind conducting unit 20 includes a main body portion 21 configured in a cylindrical shape and a flange portion 22 provided to the end of the main body portion 21 on the wind outlet 20b side.

The main body portion 21 is configured as a cylindrical or ring-shaped portion. As viewed in a longitudinal cross-sectional diagram (see FIG. 5) having a central axis aligned with the rotational axis of the wind turbine 30, the main body portion 21 has a curved face that protrudes toward the central axis side. The major portion of the main body portion 21 on the downwind side (wind outlet 20b side) has a tapered structure formed such that its diameter gradually increases from the upwind side (wind inlet 20a side) to the downwind side along the central axial direction of the wind conducting unit 20. Such a portion functions as a diffuser. That is to say, the wind conducting unit 20 is configured to define, in such a major portion of the main body portion 21 on the downwind side, a flow path having a cross-sectional shape that becomes gradually larger along the central axial direction from the wind inlet 20a side to the wind outlet 20b side. More specifically, such a downwind-side major portion of the main body portion 21 that functions as a diffuser corresponds to a portion thereof on the downstream side with respect to the blade faces of the multiple blades (impellers) 32 included in the wind turbine 30. It should be noted that, in the longitudinal cross-sectional view, such a downwind-side major portion of the main body portion 21 having a diameter that gradually increases along the central axial direction from the upwind side to the downwind side is not restricted to such a portion having a curved shape as shown in a longitudinal cross-sectional view as described in the present embodiment. Also, such a downwind-side major portion of the main body portion 21 may have a linear cross-sectional shape in such a longitudinal cross-sectional view. That is to say, such a downwind-side major portion of the main body portion 21 may have a conical structure.

In contrast, the upwind-side minor portion of the main body portion 21 has a structure having an opening diameter that gradually increases along the central axial direction from the downwind side to the upwind side, which is the reverse of that of the downwind-side major portion of the main body portion 21. That is to say, the upwind-side minor portion of the main body portion 21 has a structure having an opening diameter that becomes gradually narrower along the direction from the upwind side to the downwind side. With such an arrangement, in the first stage, the cross-section of the flow channel defined by the wind conducting unit 20 is narrowed, and accordingly, the wind speed is accelerated in this stage. It should be noted that the wind inlet 20a has an opening size that is smaller than that of the wind outlet 20b. Also, the upwind-side minor portion of the main body portion 21 having a diameter that gradually reduces along the central axial direction from the upwind side to the downwind side may be configured to have a conical face, as with the aforementioned downwind-side major portion of the main body portion 21.

The flange portion 22 is configured to generate vortexes in the vicinity of the wind outlet 20b. The flange portion 22 is configured as a ring-shaped flat plate member provided over the entire circumference of the wind outlet 20b such that it extends along a plane that is orthogonal to the central axis of the wind conducting unit 20 so as to surround the downwind-side end of the main body portion 21, i.e., so as to surround the outlet opening 20b. Accordingly, in the longitudinal cross-sectional view of the wind conducting unit 20, the flange portion 22 is configured to have a linear cross-sectional shape (see FIG. 5) extending outward in the radial direction of the wind conducting unit 20, i.e., in a direction that is orthogonal to the central axial direction of the wind conducting unit 20, from the downwind-side edge of the main body portion 21, so as to provide the main body portion 21 with a linear flange portion. The width of the flange portion 22, i.e., the height of a protrusion configured as the flange portion 22 formed such that it extends from the main body portion 21, is not restricted in particular. For example, the width of the flange portion 22 is set to a size ranging between several percent to 50% of the minimum inner diameter D1 of the wind conducting unit 20.

As described above, the wind conducting unit 20 includes the flange portion 22 configured as a vortex generating unit for generating vortexes in the vicinity of the wind outlet 20b. That is to say, the wind conducting unit 20 includes the flange portion 22 as a downwind-side edge, which allows the wind conducting unit 22 to have a non-streamlined structure as its overall structure.

The wind turbine 30 includes a cylindrical or spindle-shaped rotational shaft unit 31 having a rotational axis extending in the longitudinal direction, and multiple blades 32 arranged such that they extend radially from the circumferential face of the rotational shaft unit 31 as viewed from the rotor shaft direction. The rotational shaft unit 31 includes a hub that connects the base of each blade 32 with an unshown rotor shaft and a nacelle housing an accelerator, electric power generator, or the like, connected with the hub via the rotor shaft. With the present embodiment, the wind turbine 30 includes three blades 32 arranged around the circumference of the rotational shaft unit 31 at regular intervals. It should be noted that the number of blades 32 included in the wind turbine 30 and the structure of each blade 32 are not restricted in particular.

The wind turbine 30 is arranged within the wind conducting unit 20 such that the central axis of the rotational shaft unit 31, i.e., the rotational axis thereof is aligned with the central axis of the wind conducting unit 20. That is to say, the wind turbine 30 is arranged concentrically within the wind conducting unit 20. The wind turbine 30 is arranged such that each blade 32 is positioned closer to the wind inlet 20a side of the main body portion 21 of the wind conducting unit 20. More specifically, the wind turbine 30 is arranged such that each blade 32 is positioned in the vicinity of the minimum inner diameter position within the main body portion 21. Furthermore, the wind turbine 30 is arranged such that the tip of each blade 32 does not come in contact with the inner circumferential face 20c of the wind conducting unit 20. More specifically, the wind turbine 30 is arranged such that the blades 32 are able to rotate with a clearance with respect to the inner circumferential face 20c. It should be noted that, with the rotational shaft unit 31 of the wind turbine 30, a large part thereof on its front side is exposed to the exterior via the wind inlet 20a of the wind conducting unit 20.

With the rotor mechanism 5 having such a configuration as described above, each wind conducting unit 20 functions as a wind collector (wind lens). That is to say, each wind conducting unit 20 provides a function of concentrating the wind, thereby allowing the blades 32 of the wind turbine 30 to receive strong wind. With such an arrangement, the wind flows through the rotor mechanism 5 at a raised speed. Detailed description will be made with reference to FIG. 6 regarding such a function.

Figure 6:
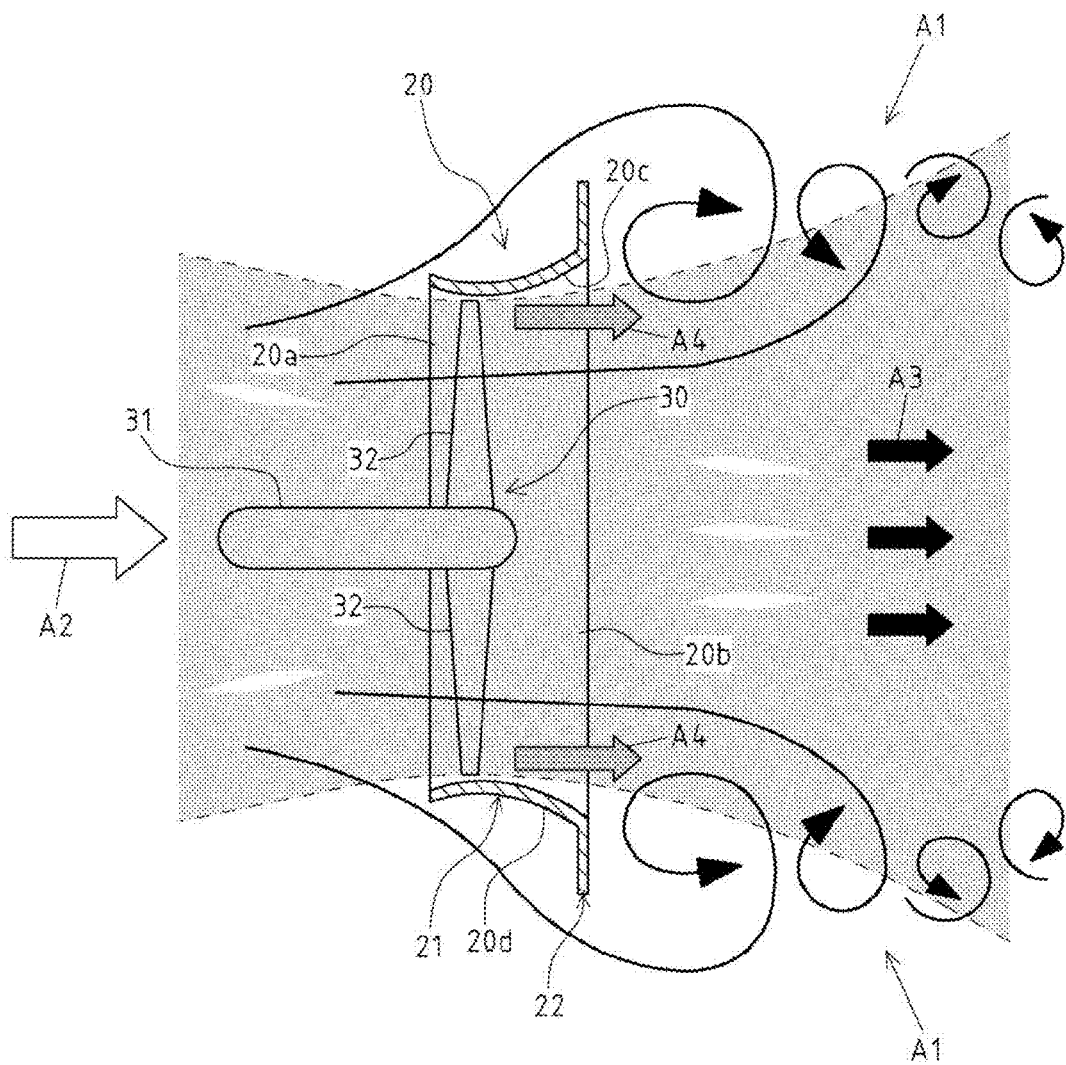
FIG. 6 is an explanatory diagram regarding the operation of the rotor mechanism according to the first embodiment of the present invention.

As shown in FIG. 6, the wind conducting unit 20 includes the cylindrical or ring-shaped main body portion 21 having a curved face as described above with reference to the longitudinal cross-sectional view, and the flange portion 22 provided to the end of the main body portion 21 on the wind outlet 20b side. With such an arrangement, the flange portion 22 mainly provides a function of separating the inner flow and the outer flow that passes through the wind conducting unit 20 over the entire outer circumference and the entire inner circumference of the wind conducting unit 20, which generate strong vortexes, i.e., so-called Karman vortexes, on the downstream side of the wind conducting unit 20 (see the arrow group A1). Such Karman vortexes are generated in an non-stationary manner (in an alternating manner, i.e., having a rotational direction that is alternately reversed) over the circumference of the wind conducting unit 20 on the downstream side thereof. This generates a partially strong vortex street.

Such a Karman vortex street thus generated provides a stable low-pressure region on the downstream side of the wind conducting unit 20 (in the vicinity of the wind outlet 20b). The low-pressure region thus generated provides a pressure difference, which draws the wind that flows through the rotor mechanism 5 (see the arrow A2). This raises the speed of the wind that flows through the inner space of the wind conducting unit 20 (see the arrow A3). In particular, such an arrangement provides the flow with a relatively higher speed in the vicinity of the tip of each blade 32 (see the arrow A4).

With such a mechanism in which the rotor mechanism 5 accelerates the inner flow, such an arrangement allows each wind turbine 30 to rotate with an increased rotational speed, which allows the rotor mechanism 5 to output high-torque driving power. As a result, such an arrangement provides improved electric power generation capacity, i.e., improved output capacity. The output (electric power) of wind power generation is proportional to the cube of the wind speed. In practice, it has been confirmed that, with an arrangement including the wind conducting unit 20 and the wind turbine 30 as with the rotor mechanism 5 according to the present embodiment, such an arrangement provides increased output which is two to three times the amount of that provided by an arrangement including only the wind turbine 30 having the same rotor diameter (with no wind conducting unit 20).

As described above, the rotor mechanism 5 according to the present embodiment is configured as a wind lens turbine. The rotor mechanism 5 includes the wind conducting unit 20 configured as a wind collector configured to concentrate the wind energy, thereby providing improved electric power generation efficiency. That is to say, with the rotor mechanism 5 according to the present embodiment, such an arrangement allows the wind flow to be accelerated with high efficiency, thereby providing high-efficiency electric power generation.

In addition, with the rotor mechanism 5 according to the present embodiment, such an arrangement allows aerodynamic noise to be dramatically reduced, as compared with the aforementioned configuration including only the wind turbine 30. This is based on the fact that the wind conducting unit 20 surrounding the wind turbine 30 suppresses or solves a problem of vortexes that occur around the tip of each blade of the wind turbine 30, which can be a cause of such noise. Furthermore, it has been found by frequency analysis that the rotor mechanism 5 according to the present embodiment provides improved low-frequency characteristics such as allowing infrasound low-frequency (1 to 3 Hz) noise to be dramatically reduced, or the like.

It should be noted that description has been made in the present embodiment regarding the wind conducting unit 20 including the flange portion 22 configured as a ring-shaped flat plate member arranged such that it extends along a plane that is orthogonal to the central axis of the wind conducting unit 20. However, the present invention is not restricted to such an arrangement. The flange portion 22 may be configured to have various kinds of structures so long as it allows the wind conducting unit 20 to have a non-streamlined shape so as to enable the occurrence of vortexes on the downstream side of the wind conducting unit 20. Accordingly, examples of structures that can be employed in the flange portion 22 include: regular or cyclic structures each configured such that its outer face extends over the circumference of the wind conducting unit 20 so as to define a square shape, a hexagonal shape or the like, elliptical structures, rectangular structures, rhombic structures, and irregular structures such as upper-lower asymmetrical structures, and the like. Also, in the longitudinal cross-sectional view of the wind conducting unit 20, the flange portion 22 may be configured as a member having a curved face that extends such that it smoothly connects to the main body portion 21, i.e., a member or the like that forms a flared structure together with the main body portion 21, or the like.

Figure 3:
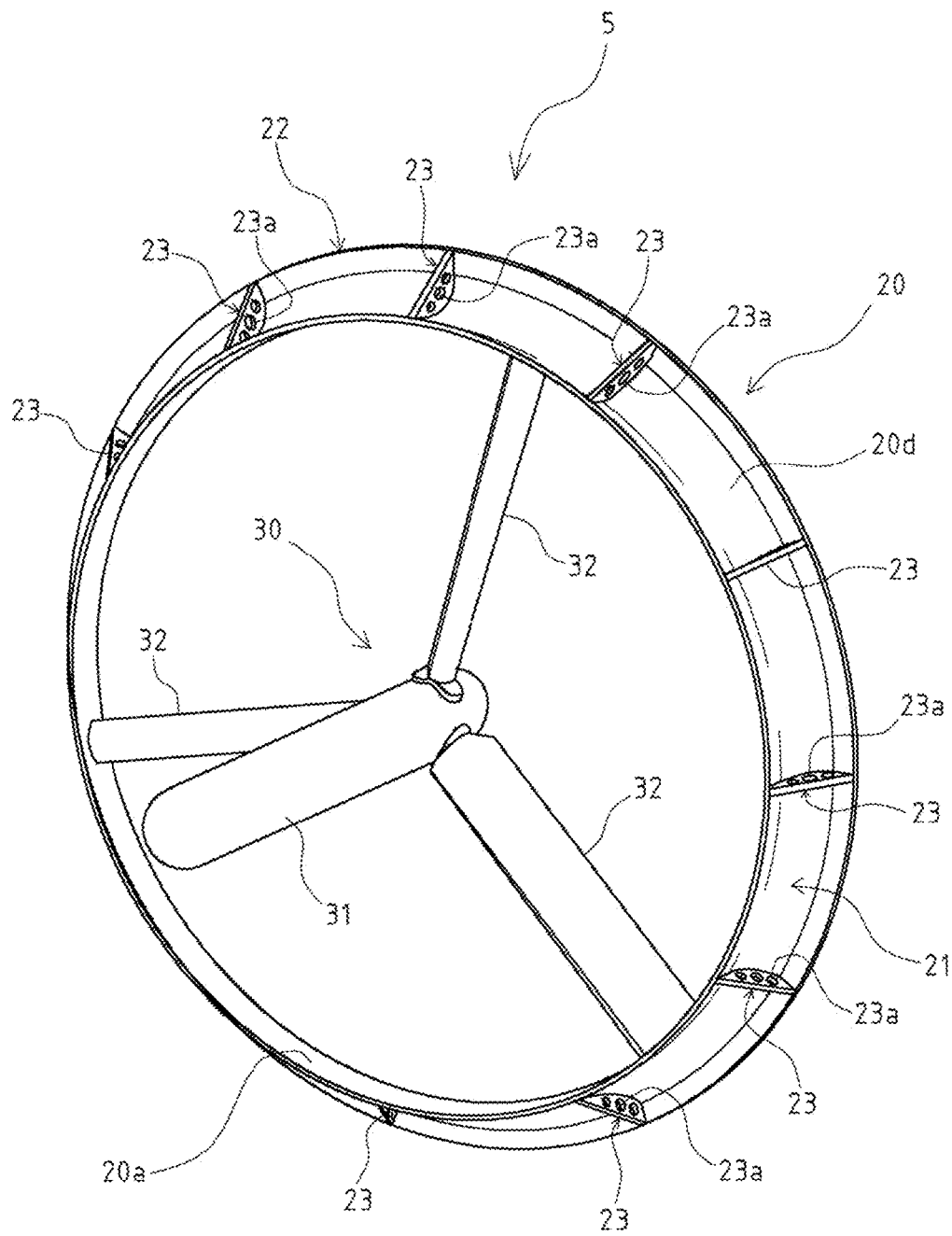
FIG. 3 is a perspective view from the front side showing a configuration of a rotor mechanism according to the first embodiment of the present invention.
Figure 4:
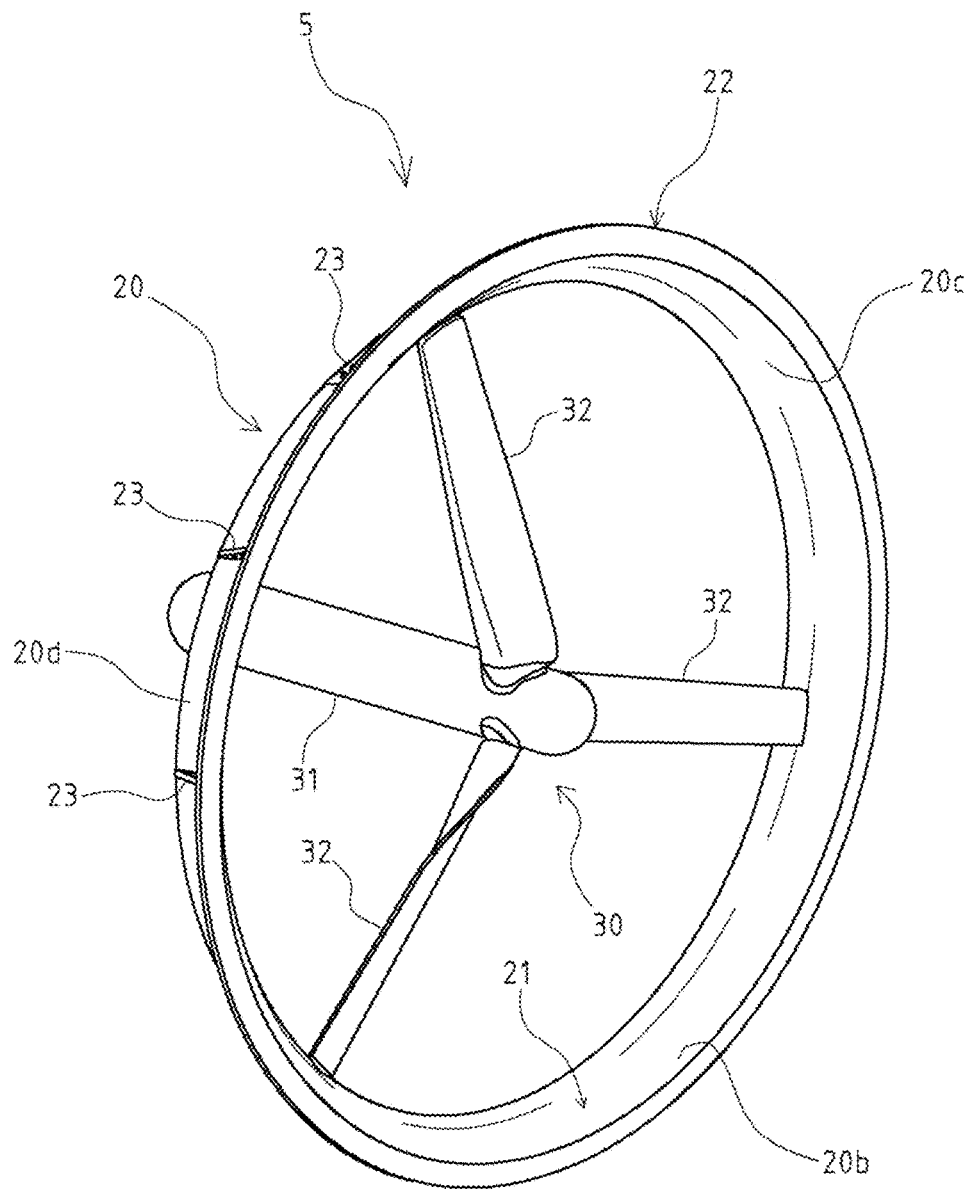
FIG. 4 is a perspective view from the back side showing the configuration of the rotor mechanism according to the first embodiment of the present invention.
Figure 5:
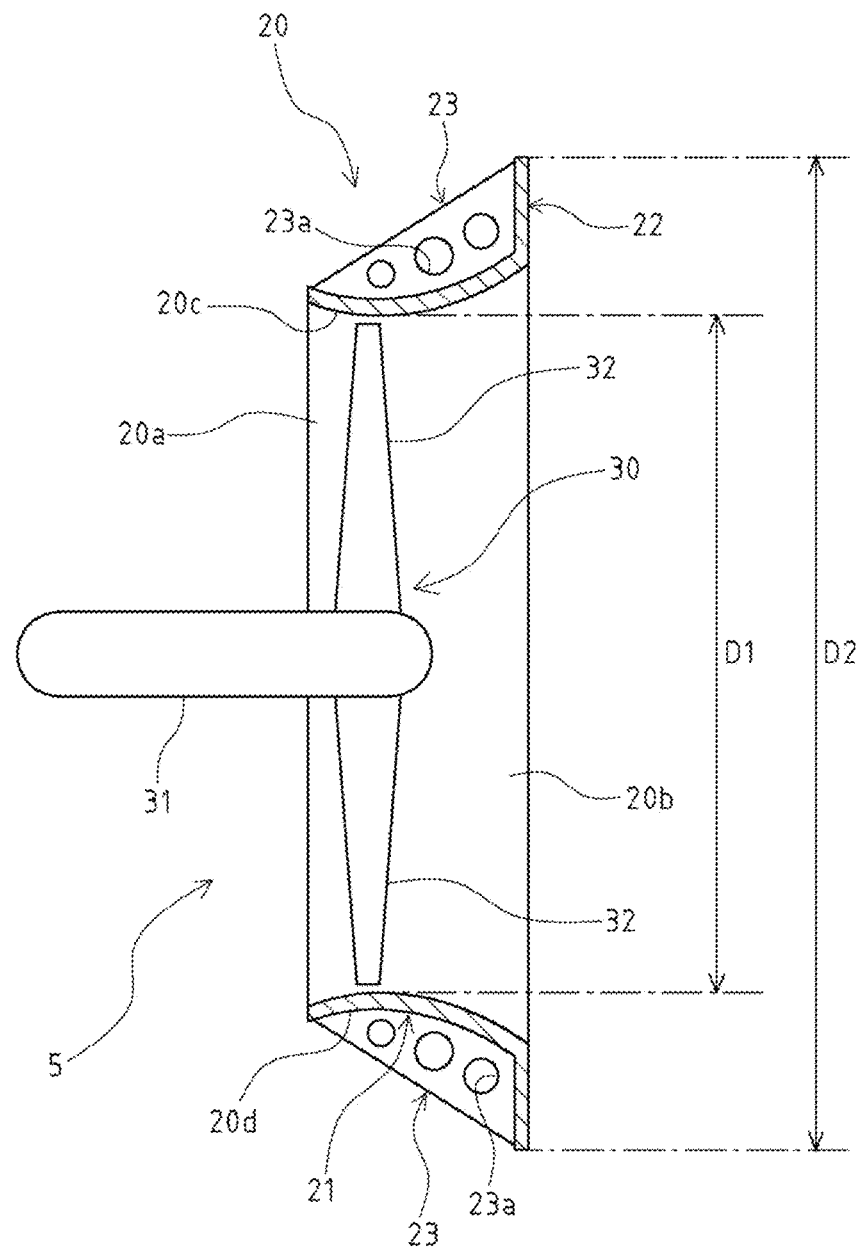
FIG. 5 is a longitudinal cross-sectional diagram showing the rotor mechanism according to the first embodiment of the present invention.

Furthermore, as shown in FIGS. 3 through 5, the wind conducting unit 20 includes multiple phase control plate portions 23. The phase control plate portions 23 are each configured as a plate-shaped portion having a thickness defined in the circumferential direction of the wind conducting unit 20. The phase control plate portions 23 are each arranged between the main body portion 21 and the flange portion 22, so as to form a rib-shaped structure. In the present embodiment, twelve phase control plate portions 23 are provided at approximately regular intervals along the circumference of the wind conducting unit 20.

In the longitudinal view of the wind conducting unit 20, each phase control plate portion 23 is structured such that its inner-side (wind conducting unit 20 side) edge matches the cross-sectional shape defined by a combination of the main body portion 21 and the flange portion 22. The phase control plate portions 23 are each mounted on the wind conducting unit 20 so as to form a single unit in a state in which its entire inner-side face is in contact with the outer circumferential face 20d of the wind conducting unit 20. Furthermore, the phase control plate portions 23 are each configured such that its outer-side (opposite side to the wind conducting unit 20 side) edge defines a straight-line slope having a height that changes according to a change in the diameter of the wind conducting unit along the central axial direction from the upwind side to the downwind side. Moreover, in order to reduce the overall weight or the like, each phase control plate portion 23 is provided with a multiple number of openings 23a (three openings 23a in the present embodiment).

As described above, with the Karman vortexes that occur on the downstream side of the wind conducting unit 20, there is variation (fluctuation) in strength between the vortexes that occur along the circumferential face of the wind conducting unit 20. In order to solve such a problem, the phase control plate portions 23 control the vortexes exhibiting such fluctuation around the circumferential direction of the wind conducting unit 20 so as to provide vortex phase matching, thereby allowing the flow in which the Karman vortexes occur to be strengthened and stabilized on the downstream side of the wind conducting unit 20. In a location where the wind power generation device 1 is installed, typically, the rotor mechanism 5 receives natural wind or the like, i.e., an irregular flow. The phase control plate portions 23 are configured to control such an irregular flow so as to supply a forcibly stabilized flow.

More specifically, with the phase control plate portions 23, such an arrangement provides phase matching for the vortexes generated on the downstream side of the wind conducting unit 20. As a result, such an arrangement strengthens the vortexes that occur on the downstream side of the wind conducting unit 20. Accordingly, static pressure is further reduced in the vicinity of such strong vortexes. That is to say, with the phase control plate portions 23, such an arrangement relaxes vortex strength variation (fluctuation) in the circumferential direction of the wind conducting unit 20, thereby stabilizing vortex formation in each region. With such an arrangement, in many cases, such an arrangement provides the occurrence of strong vortexes on the downstream side of the wind conducting unit 20. This further reduces the pressure on the downstream side of the wind conducting unit 20. Thus, such an arrangement provides a stable, strong low-pressure region on the downstream side of the wind conducting unit 20. As a result, the wind is drawn to the low-pressure region thus generated on the downstream side of the wind conducting unit 20, thereby improving the acceleration of the inner wind flow.

As described above, with such an arrangement in which the wind conducting unit 20 includes the phase control plate portions 23 arranged on its outer circumferential side, such an arrangement is capable of stabilizing a Karman vortex street as described above, which allows the flow based on the Karman vortex street to be stabilized. Furthermore, such an arrangement allows the speed of the wind that flows into the rotor mechanism 5 to be accelerated with high efficiency. This provides improved electric power generation efficiency.

It should be noted that, with the phase control plate portions 23 included in the wind conducting unit 20, the shape thereof, the number thereof, the presence or absence of the openings 23a, and the like, are not restricted in particular. Rather, such settings may be made as appropriate according to the size of the rotor mechanism 5 or the like. Examples that can be employed as such a phase control plate portion 23 include: a curved-shaped member having an edge on the outer side (opposite side to the wind conducting unit 20 side) that protrudes outward in the radial direction of the wind conducting unit 20; a member having a structure having an edge that protrudes from the upstream side of the flange portion 22 toward the downstream side of the flange portion 22 across the flange portion 22, and the like.

Furthermore, the wind power generation device 1 according to the present embodiment includes a power generation device as an electrical configuration that corresponds to each rotor mechanism 5. Upon receiving the rotational force supplied from the wind turbine 30 included in the corresponding rotor mechanism 5, each power generation device is driven so as to generate electric power, thereby supplying electric power to an external circuit. It should be noted that the electrical configuration of the wind power generation device 1 is not restricted in particular.

The three rotor mechanisms 5 each having the aforementioned configuration are arranged such that their rotor axial directions are approximately in parallel with each other, in a layout that corresponds to an isosceles triangular shape (or regular triangular shape, as an example, as described above) defined in a single plane that is orthogonal to the rotor axial direction. Furthermore, the three rotor mechanisms 5 arranged in such a layout are supported by means of the support pole 3 installed on the installation base 2. With such an arrangement, as shown in FIGS. 1, 2, and 7, the three rotor mechanisms 5 are arranged such that the adjacent rotor mechanisms 5 are separated by the wind turbine gap space 10 having a predetermined size.

As viewed from the back of the wind power generation device 1, the wind turbine gap space 10 corresponds to the size of the minimum space between the adjacent rotor mechanisms 5 along a direction that extends between the central positions (which will be referred to as the "rotor central positions" hereafter) of the rotor mechanisms 5 that are each aligned with the rotational axis of the corresponding wind turbine 30 and the central axis of the corresponding wind conducting unit 20. With the present embodiment, the three rotor mechanisms 5 are arranged such that their rotor axes are aligned with the same direction. Furthermore, the flange portions 22, each of which provides the corresponding wind conducting unit 20 with a maximum outer diameter, are positioned in the same plane that is orthogonal to the rotor axial direction. With such an arrangement, the wind turbine gap space 10 corresponds to a space between the flange portions 22 of the adjacent rotor mechanisms 5. It should be noted that, with the wind conducting unit 20 including the main body portion 21 having a diameter that gradually increases in the central axial direction from the wind inlet 20a to the wind outlet 20b, and the flange portion 22 that protrudes toward the outer circumferential side of the wind outlet 20b, the position of the flange portion 22 matches the position at which the rotor mechanism 5 has its maximum diameter.

With such an arrangement as described in the present embodiment in which the three rotor mechanisms 5 are arranged in a regular triangular layout, three wind turbine gap spaces 10 are defined. That is to say, such an arrangement includes a wind turbine gap space 10X defined between the upper rotor mechanism 5C and the lower-left rotor mechanism 5A, a wind turbine gap space 10Y defined between the lower-left rotor mechanism 5A and the lower-right rotor mechanism 5B, and a wind turbine gap space 10Z defined between the lower-right rotor mechanism 5B and the upper rotor mechanism 5C (see FIG. 7). Typically, the three wind turbine gap spaces 10 are designed to have the same size.

With the present embodiment, the wind turbine gap space 10 is designed to have a size that is smaller than the maximum outer diameter D2 of the wind conducting unit 20 in the direction that extends in a plane that is orthogonal to the rotational axis of the wind turbine 30. With such an arrangement, the maximum outer diameter D2 of the wind conducting unit 20 corresponds to the diameter at the position of the flange portion 22 having the maximum outer diameter in the wind conducting unit 20 as described above (see FIG. 5). That is to say, with the wind power generation device 1 according to the present embodiment, with the size of the wind turbine gap space 10 as "s", the relation s (wind turbine gap space 10)<D2 (maximum outer diameter D2) holds true.

As described above, the three rotor mechanisms 5 are arranged such that the adjacent rotor mechanisms 5 are separated by the wind turbine gap space 10 having a size that is smaller than the maximum outer diameter D2 of the wind conducting unit 20. Furthermore, the three rotor mechanisms 5 are supported by means of the support pole 3 via a support structure including multiple support rods 7 as described above. In addition, such an arrangement is supported by an additional support structure (inter-wind-turbine support structure) configured to maintain the position relation between the three rotor mechanisms 5. That is to say, the wind power generation device 1 according to the present embodiment further includes an inter-wind-turbine support structure configured to maintain a relative position relation between the three rotor mechanisms 5. Description will be made with reference to FIG. 2 regarding such an inter-wind-turbine support structure.

The inter-wind-turbine support structure is mounted using the flange portions 22 of the wind conducting units 20 of the rotor mechanisms 5. As shown in FIG. 2, the wind generation device 1 according to the present embodiment is provided with multiple support members 40 as such an inter-wind-turbine support structure. The support members 40 are each configured as a rod-shaped member. Each support member 40 is arranged between the adjacent rotor mechanisms 5 such that it is mounted on the flange portions 22 thereof.

Specifically, as shown in FIG. 2, with the present embodiment, a pair of support members 40, i.e., an outer-side support member 40a and an inner-side support member 40b, are arranged between the adjacent rotor mechanisms 5. The outer-side support member 40a and the inner-side support member 40b are each arranged between the adjacent rotor mechanisms 5 such that they extend in parallel with the support rod 7 that connects the rotational shaft units 31 of the wind turbines 30 of the same adjacent rotor mechanisms 5.

That is to say, a pair of the outer-side support member 40a and the inner-side support member 40b are arranged between the upper rotor mechanism 5C and the lower-left rotor mechanism 5A such that they are each arranged in parallel with the corresponding upper diagonal support rod 7c. Furthermore, another pair of the outer-side support member 40a and the inner-side support member 40b are arranged between the upper rotor mechanism 5C and the lower-right rotor mechanism 5B in the same manner as between the upper rotor mechanism 5C and the lower-left rotor mechanism 5A. Moreover, the outer-side support member 40a and the inner-side support member 40b are arranged between the lower-left rotor mechanism 5A and the lower-right rotor mechanism 5B such that they are arranged in parallel with the horizontal support rod 7b.

With such an arrangement, the outer-side support members 40a are provided to the outer circumference side of the three rotor mechanisms 5 arranged in a regular triangular layout. Each outer-side support member 40a is mounted such that it extends between the flange portions 22 of the adjacent rotor mechanisms 5 in a state in which it defines a tangent line that is in contact with the circular shapes defined by the wind conducting units 20. On the other hand, each inner-side support member 40b is mounted such that it extends between the flange portions 22 of the adjacent rotor mechanisms 5 and such that it is positioned closer to the inner side than the outer-side support member 40a across the upper diagonal support rod 7c or otherwise the horizontal support rod 7b. The outer-side support members 40a and the inner-side support members 40b are each mounted such that both ends thereof are fixed to the flange portions 22 of the rotor mechanisms 5 by welding, screwing, or the like, thereby allowing the outer-side support members 40a and the inner-side support members 40b to be fixedly mounted on the wind conducting unit 20 of each rotor mechanism 5.

As described above, by providing such an inter-wind-turbine support structure in order to maintain the relative position relation between the three rotor mechanisms 5, such an arrangement is capable of maintaining the relative position relation in a sure manner with respect to the three rotor mechanisms 5 supported by the support pole 3 via the support structure including the multiple support rods 7. Such an arrangement is capable of preventing the relative position relation between the three rotor mechanisms 5 from changing. This allows the size of each wind turbine gap space 10 defined between the corresponding pair of adjacent rotor mechanisms 5 to be maintained at the same size.

It should be noted that the configuration of the inter-wind-turbine support structure is not restricted to such an arrangement described in the present embodiment. Various kinds of arrangements may be employed as appropriate as such a configuration of the inter-wind-turbine support structure so long as it is capable of maintaining the relative position relation between the three rotor mechanisms 5 supported by the support pole 3 in order to provide sufficient wind-resistance stability.

As described above, the wind power generation device 1 according to the present embodiment has been researched and developed as a multi-rotor system comprising basic units each configured as a wind lens turbine including the wind conducting unit 20 configured as a wind collector arranged so as to surround the wind turbine 30 configured as a rotor. The multi-rotor system is configured such that the wind turbines each configured as a basic unit are supported by means of a tower structure such that they are arranged in a layout defined in a plane that is orthogonal to the rotational axis. The multi-rotor system configured as such an assembled system is capable of providing a great output capacity.

With the wind power generation device 1 according to the present embodiment, such an arrangement allows the weight thereof to be dramatically reduced as compared with ordinary wind turbines. This provides reduced costs, improved efficiency of maintenance, and an improved availability ratio, as well as synergistic operation of the multiple rotors, thereby providing improved output capacity with high efficiency. Detailed description will be made below regarding such effects.

First, by employing such a multi-rotor system, in principle, such an arrangement can be configured with a small weight, i.e., $1/\sqrt{n}$ of the weight of an ordinary single-unit wind turbine (which will be referred to as the "ordinary wind turbine" hereafter) having the same output capacity. Detailed description thereof will be made below.

With the diameter of such an ordinary wind turbine as "D", and with the diameter of such a multi-rotor system as "d", in a case in which the ordinary wind turbine and the multi-rotor system have the same overall wind turbine area, the following Expression (1) holds true.

$$D^2 = n \cdot d^2 \quad (1)$$

In this Expression, n represents the number of the wind turbines.

Furthermore, with the weight of the ordinary wind turbine as "M", and with the weight of each wind turbine of the multi-rotor system as "m", the following Expressions (2) and (3) hold true.

$$M = k \cdot D^3 \quad (2)$$

$$m = k \cdot d^3 \quad (3)$$

Here, k represents a proportional constant.

Based on the aforementioned Expressions (1) through (3), with the weight ratio between the multi-rotor system including n wind turbines and the ordinary wind turbine as "R", the following Expression (4) is derived.

$$R = n \cdot m/N = 1/\sqrt{n} \quad (4)$$

Based on the above, by employing such a configuration including the three rotor mechanisms 5 as described in the present embodiment, such an arrangement allows the weight thereof to be reduced to $1/\sqrt{3}$ of that of the ordinary wind turbine. That is to say, such an arrangement allows the weight of the wind turbine to be dramatically reduced.

In addition to such a reduced weight thereof, by employing such a multi-rotor system, such an arrangement allows the wind turbine to be designed with a reduced size. Thus, by employing mass-produced basic units, i.e., by employing mass-produced rotor mechanisms 5 having such a compact size, such an arrangement provides reduced costs. That is to say, such compact-size rotor mechanisms 5 are suitable for mass production. Thus, such an arrangement allows the cost required for each wind power generation device 1 to be reduced.

In addition, in a case of employing such a multi-rotor system, each basic unit has a smaller size than those of ordinary wind turbines. Such an arrangement provides ease of maintenance. From this viewpoint, in particular, in a case in which such a wind power generation device is installed on the ocean, such an arrangement allows the maintenance efficiency to be dramatically improved as compared with large-size ordinary wind turbines.

In addition, in a case of employing such a multi-rotor system, even if a malfunction occurs in one rotor mechanism, such a malfunction is confined to the particular rotor mechanism, thereby providing an improved availability ratio. In contrast, with an arrangement including only a single-unit wind turbine, in a case in which a malfunction occurs in the single wind turbine, this leads to an unavailable state in which all the power generation operations of the apparatus are stopped. With the wind power generation device 1 according to the present embodiment, even if a malfunction has occurred in a part of the multiple rotor mechanisms 5, such a malfunction is confined to a particular rotor mechanism 5. Accordingly, even in this state, this does not lead to such an unavailable state in which all the power generation operations are stopped. That is to say, such an arrangement allows the equipment to continue its operations, thereby providing an improved availability ratio.

In addition to such effects of the multi-rotor system as described above, the wind power generation device 1 according to the present embodiment provides a synergistic effect based on the interaction between the three rotor mechanisms 5, thereby providing improved output capacity with high efficiency. That is to say, with conventional multi-rotor systems including multiple typical and ordinary single-unit wind turbines, the overall output of multiple wind turbines arranged as a system is equal to or slightly (1% to 3%) greater than the sum total of the outputs of the wind turbines that form the multi-rotor system in a case in which they operate separately. That is to say, in a case of employing a multi-rotor system including the three wind turbines, the overall output of the system is equal to or slightly greater than the sum total of the outputs of the three wind turbines in a case in which they operate separately. In a case of employing another conventional arrangement in which ordinary wind turbines each having a duct are arranged so as to form a system, each duct acts as a barrier that interferes with the wind flow. Accordingly, it can be considered that such a conventional system provides only overall output that is smaller than the sum total of the outputs of the wind turbines when they operate separately. In contrast, with the wind power generation device 1 according to the present embodiment, such an arrangement provides overall output that is greater than the sum total of the outputs of the three rotor mechanisms 5 when they operate separately. This is based on the following mechanism.

With the rotor mechanism 5 according to the present embodiment, as described above, the wind conducting unit 20 functions as a wind collector (wind lens). By providing such a wind concentration function of the wind conducting unit 20, such an arrangement allows the speed of the wind that passes through the rotor mechanism 5 via the wind turbine 30 to be accelerated. That is to say, with such a rotor mechanism 5, such an arrangement generates vortexes so as to provide a stable low-pressure region on the downstream side of the wind conducting unit 20. The wind is drawn to the low-pressure region thus generated, thereby accelerating the speed of the inner flow that passes through the wind conducting unit 20 (see FIG. 6).

The rotor mechanisms 5, each of which is configured to have such an inner flow acceleration function, are arranged as a set in a layout defined in a plane that is orthogonal to the rotational axis such that a predetermined inter-wind-turbine space 10 is interposed between the adjacent rotor mechanisms 5 as described above. Such an arrangement accelerates the wind flow that passes through the gaps each defined as a space between two adjacent rotor mechanisms 5 from among the three rotor mechanisms 5, thereby strengthening the vortexes generated on the downstream side of the wind conducting unit 20. Such an arrangement further lowers the pressure of the low-pressure region generated on the downstream side of the wind conducting unit 20, and in particular, the pressure on the downstream side of each blade 32. This improves the wind drawing function. As a result, such an arrangement is capable of increasing the amount of wind flow supplied to the downstream side of each wind conducting unit 20.

Based on the hydrodynamic mechanism as described above, the multiple rotor mechanisms 5, each of which exhibits higher output efficiency as a single-unit wind turbine than that of a conventional wind turbine, are arranged as a wind turbine arrangement such that an inter-wind-turbine space 10 is interposed between the adjacent rotor mechanisms 5. Based on the basic principle for providing a high-efficiency wind lens turbine mechanism, the wind conducting unit 20 configured as a wind collector ring generates vortexes so as to provide a low-pressure region on the downstream side, thereby providing a wind flow drawing function. With the multi-rotor system, an interaction occurs between the wind drawing operations of such multiple wind lens turbines, thereby providing a synergistic effect. That is to say, with the wind power generation device 1 according to the present embodiment, such an arrangement allows the rotor mechanisms 5 each configured as a high-efficiency wind lens turbine to be operated with higher efficiency. That is to say, such an arrangement provides a synergistic effect. Such an arrangement allows the overall output capacity of the wind power generation device 1 as a system to be raised, thereby providing high-efficiency electric power generation. As described above, the wind power generation device 1 according to the present embodiment is based on the idea of controlling the air flow that flows through the exterior of the wind conducting unit 20 of each rotor mechanism 5 so as to generate vortexes, thereby generating a low-pressure region. Specifically, by providing the inter-wind-turbine space 10 between each adjacent pair of the multiple rotor mechanisms 5, such an arrangement provides improved output capacity.

With respect to such a synergistic effect provided by the wind power generation device 1, numerical data obtained by experiment indicate that, with a system having the same configuration as that of the wind power generation device 1 according to the present invention in which three rotor mechanisms 5 are arranged in a regular triangular layout such that an inter-wind-turbine space 10 is interposed between the rotor mechanisms 5, such a system provides overall output that is on the order of 10% greater than the sum total of the outputs of the three rotor mechanisms 5 obtained when they are operated separately. Description will be made with reference to FIGS. 7 and 8 regarding the experimental results.

In the present experiment, the change of the overall output of the wind power generation device 1 was measured according to a change in the size of each inter-wind-turbine space 10, with the sum total of the measurement values of the outputs of the three rotor mechanisms 5A, 5B, and 5C obtained when they are operated separately as a reference value. The graph in FIG. 8 shows the overall output (Total Power Output of three WLTs (Wind Lens Turbines) in multi rotor arrangement) of an arrangement in which the three rotor mechanisms 5A, 5B, and 5C each having a predetermined size are arranged in a regular triangular layout defined in a single plane that is orthogonal to the rotational axis as with the wind power generation device 1 according to the present embodiment, i.e., in a layout in which lines each defined between the adjacent rotor central positions define a regular triangular shape, such that an inter-wind-turbine space 10 is interposed between the adjacent rotor mechanisms (which will be referred to as the "multi-rotor system arrangement" hereafter).

Figure 8:
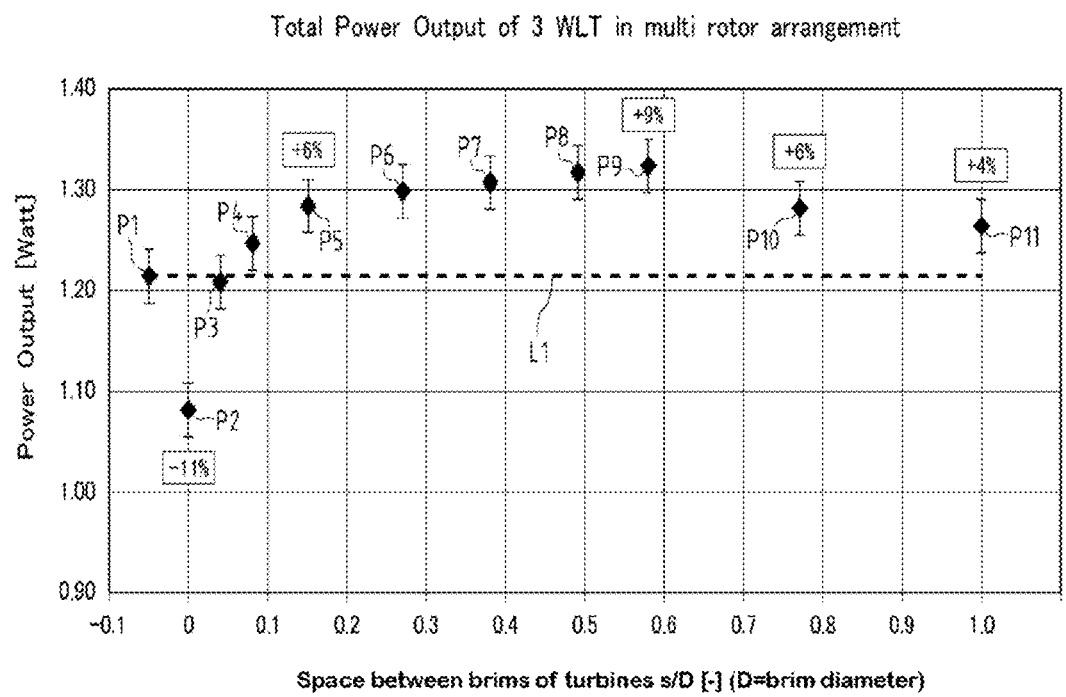
FIG. 8 is a diagram showing an example of the relation between the measurement value of the overall output of the wind power generation device according to the first embodiment of the present invention and the size of a space defined between an adjacent pair of rotor mechanisms included in the wind power generation device.

In the graph shown in FIG. 8, with the size of the inter-wind-turbine space 10 as "s", and with the diameter of the flange portion 22 configured as a maximum-diameter portion of the wind conducting portion 20 as "D", the horizontal axis represents s/D (s=space between brims of turbines, D=brim diameter). That is to say, the horizontal axis represents the ratio of the size s of the inter-wind-turbine space 10 with respect to the maximum outer diameter D2 of the wind conducting unit 20 (which will be referred to as the "space/diameter ratio" hereafter). Moreover, the vertical axis represents the output (Power Output [Watts]). It should be noted that, in the present experiment, as shown in FIG. 7, description will be made assuming that only the upper rotor mechanism 5C is configured to rotate in the right-hand rotating direction (clockwise direction), and the two lower rotor mechanisms 5A and 5B are each configured to rotate in the left-hand rotating direction (counterclockwise direction) as viewed from the front of the three rotor mechanisms 5.

In the graph shown in FIG. 8, the diamond-shaped dots (P1 through P11) each represent a measurement value of the output of the multi-rotor system arrangement comprising the three rotor mechanisms 5A, 5B, and 5C. It can be estimated that each measurement value was measured with a margin of error of approximately ±2%. Furthermore, in the graph shown in FIG. 8, the broken line L represents the reference measurement value as described above. Specifically, the broken line L represents the sum total of the measurement values of the outputs of the three separate (standalone) rotor mechanisms 5A, 5B, and 5C (which will be referred to as the "sum total of the separate measurement output values" hereafter). In the present experiment, the sum total of the separate measurement output values thus measured was approximately 1.21 [Watts].

As shown in FIG. 8, in a case in which measurement was performed with a space/diameter ratio s/D of 0, a measurement value of approximately 1.08 [Watts] was obtained (see point P2). The measurement value thus obtained is approximately 11% smaller than the sum total of the separate measurement output values represented by the line L1. In this case, the size of each inter-wind-turbine space 10 is zero. That is to say, the rotor mechanisms 5 are arranged such that each adjacent pair of the flange portions 22 are directly in contact with each other. As described above, it can be observed that, in a case in which the inter-wind-turbine space 10 has a size of zero, such a multi-rotor system arrangement provides output that is smaller than the sum total of the outputs of the wind turbines when they operate separately.

In a case in which measurement was performed with a space/diameter ratio s/D of 0.04, the measurement value thus obtained is approximately the same as the sum total of the separate measurement output values represented by the line L1 (see point P3). In contrast, in a case in which measurement was performed with an increased space/diameter ratio s/D of 0.15, a measurement value of approximately 1.28 [Watts] was obtained (see point P5). The measurement value thus obtained is 6% greater than the sum total of the separate measurement output values represented by the line L1. In a case in which measurement was performed with a further increased space/diameter ratio s/D of 0.58, a measurement value of approximately 1.32 [Watts] was obtained (see point P9). The measurement value thus obtained is 9% greater than the sum total of the separate measurement output values represented by the line L1.

In a case in which measurement was performed with a further increased space/diameter ratio s/D of 0.77, a measurement value of approximately 1.28 [Watts] was obtained (see point P10). The measurement value thus obtained is 6% greater than the sum total of the separate measurement output values represented by the line L1. In a case in which measurement was performed with a space/diameter ratio s/D of 1, a measurement value of approximately 1.26 [Watts] was obtained (see the point P11). The measurement value thus obtained is 4% greater than the sum total of the separate measurement output values represented by the line L1.

It can be understood based on the aforementioned measurement results that, by providing the multi-rotor system arrangement comprising the rotor mechanisms 5 with such inter-wind-turbine spaces 10, such an arrangement provides the multi-rotor system arrangement with improved overall output as compared with the sum total of the outputs of the wind turbines when they operate separately. In particular, it can be understood based on the present experimental results that the increase ratio of the output of the multi-rotor system arrangement with respect to the sum total of the separate measurement output values has a peak in a space/diameter ratio s/D range of 0.5 to 0.6. In contrast, in a case in which the space/diameter ratio s/D is zero, i.e., in a case in which there is no inter-wind-turbine space 10, the output of the multi-rotor system arrangement is smaller than the sum total of the separate measurement output values.

These experimental results mean that each inter-wind-turbine space 10 defined between the corresponding pair of the rotor mechanisms 5 contributes to the improved output capacity of the multi-rotor system arrangement. That is to say, in a case in which there is no inter-wind-turbine space 10, such inner flow acceleration effects of the respective rotor mechanisms 5 interfere with each other. As a result, the output of the multi-rotor system arrangement is smaller than the sum total of the outputs of the wind turbines when they operate separately. It can be understood that, in a case in which the size of the inter-wind-turbine space 10 is increased from such an arrangement, an interaction occurs between such inner flow acceleration effects of the respective rotor mechanisms 5 so as to provide a synergistic effect. The synergistic effect is strengthened according to an increase in the size of each inter-wind-turbine space 10. In this state, the output of the multi-rotor system arrangement becomes greater than the sum total of the outputs of the wind turbines when they operate separately. In a case in which the inter-wind-turbine space 10 is greater than a particular size, the synergistic effect gradually weakens according to an increase in the size of the inter-wind-turbine space 10. In the present experiment, in a case in which the inter-wind-turbine space is 1, an increase ratio of +4% was obtained with respect to the output of the multi-rotor system arrangement. It can be estimated that the increase ratio of the output of the multi-rotor system arrangement gradually drops according to an increase in the inter-wind-turbine space 10 from that obtained in a case of a space/diameter ratio s/D of 1. It can be considered that, eventually, the output of the multi-rotor system arrangement converges with the sum total of the separate measurement output values represented by the line L1.

As described above, it has been confirmed based on the present experimental results that, by arranging the rotor mechanisms 5 each configured as a wind lens turbine in a multi-rotor system layout such that an inter-wind-turbine space 10 is interposed between the corresponding pair of the rotor mechanisms 5, such an arrangement provides overall output that is on the order of 5% to 10% greater than the total sum of the outputs of the rotor mechanisms obtained when they are operated separately.

Based on the experimental results as described above, with the wind power generation device 1 according to the present embodiment, each inter-wind-turbine space 10 defined between the adjacent pair of the rotor mechanisms 5 is employed with a size that is smaller than twice the maximum outer diameter D2 of the wind conducting unit 20.

In particular, the inter-wind-turbine space 10 is preferably designed to have a size of 0.05 to 1.5 times the maximum outer diameter D2 of the wind conducting unit 20. In a case in which the inter-wind-turbine space 10 has a size that is smaller than 0.05 times the maximum outer diameter D2 of the wind conducting unit 20, such an arrangement does not allow the rotor mechanisms 5 to provide a synergistic effect for accelerating the inner flow. In this case, it is difficult to enable such an arrangement layout of the rotor mechanisms 5 to provide the effect of raising the output capacity. Conversely, in a case in which the inter-wind-turbine space 10 has a size that is greater than 1.5 times the maximum outer diameter D2 of the wind conducting unit 20, such an arrangement becomes almost the same as a state in which the rotor mechanisms 5 are operated separately. In this case, such an arrangement mostly does not enable the rotor mechanisms 5 to provide the synergistic effect for accelerating the inner flow. In this case, it is difficult to enable such an arrangement layout of the rotor mechanisms 5 to provide the effect of raising the output capacity.

Furthermore, based on the experimental results described above, the inter-wind-turbine space 10 is preferably designed to have a size that is 0.4 to 0.7 times the maximum outer diameter D2 of the wind conducting unit 20. More preferably, the inter-wind-turbine space 10 is preferably designed to have a size that is 0.5 to 0.6 times the maximum outer diameter D2 of the wind conducting unit 20. It should be noted that the size of the inter-wind-turbine space 10 is designed as appropriate based on the relation between it and the height (width) of the flange portion 22, the maximum diameter and the minimum diameter of the main body portion 21, the length of the wind conducting unit 20 along the flow direction (flow-direction length of the wind conducting unit 20), the minimum inner diameter D1, or the like, or a combination of two or more of the aforementioned relations, in addition to the relation between it and the maximum outer diameter D2.

Furthermore, with the wind power generation device 1 according to the present embodiment, the wind conducting unit 20 employs a structure including the flange portion 22 configured as a ring-shaped flat plate member for generating vortexes in the vicinity of the circumference of the wind outlet 20b. With such an arrangement, the inter-wind-turbine support structure may be mounted using the flange portions 22 thus employed, in order to maintain the relative position relation between the three rotor mechanisms 5 as described above. Thus, such an arrangement allows the inter-wind-turbine support structure to be mounted in a relatively simple manner. That is to say, each flange portion 22 is configured as a flat plate member configured such that it extends along a plane that is orthogonal to the rotor axis. Accordingly, in a case in which a component member of the inter-wind-turbine support structure such as the support member 40 or the like is arranged between the adjacent rotor mechanisms 5, the flange portions 22 are suitably employed as a portion for supporting the support member.

As described above, with the wind power generation device 1 according to the present embodiment, the wind conducting unit 20, which is configured as an outer housing of the rotor mechanism 5 so as to surround the circumference of the wind turbine 30, includes the flange portion 22. Such an arrangement allows the flange portions 22 to be used as fixing members to join and connect the wind conducting units 20 with each other in a predetermined layout. In a case in which multiple rotor mechanisms 5 are mounted so as to form a multi-rotor system arrangement, such an arrangement allows a connecting structure to be provided in a simple manner in order to connect the adjacent rotor mechanisms 5. Such an arrangement allows the connecting structure to be designed and manufactured in a relatively simple manner as a wind turbine structure component having sufficient structural strength.

Second Embodiment

Description will be made with reference to FIGS. 9 and 10 regarding a second embodiment of the present invention. It should be noted that the same components as those in the first embodiment are denoted by the same reference numerals, and redundant description thereof will be omitted as appropriate. As a point in common with the wind power generation device 1 according to the first embodiment, a wind power generation device 51 according to the present embodiment includes three rotor mechanisms 5 arranged in an isosceles triangular layout (FIGS. 9 and 10 show a regular triangular layout as an example of such an isosceles triangular layout, as described above) defined in a plane that is orthogonal to the rotational axis. The point of difference is that the wind power generation device 51 according to the present embodiment includes a different support structure that supports the three rotor mechanisms 5.

As shown in FIGS. 9 and 10, in the wind power generation device 51 according to the present embodiment, the rotor mechanisms 5 are supported by a support pole structure mechanism arranged such that it stands erect on a predetermined installation base configured as a support base or the like installed on the Earth's surface. The support pole structure mechanism includes a base unit 60 arranged on the upwind side with respect to the three rotor mechanisms 5 and fixedly installed on the installation base, and a turning support unit 70 supported by the base unit 60 such that it can be rotated (turned) with the vertical direction (upper-lower direction) as its rotational axial direction, and configured to support the three rotor mechanisms 5 in a predetermined layout.

The base unit 60 includes a disk-shaped base portion 61 and a projecting support portion 62 having a circular truncated cone shape having a diameter that is reduced in a tapered manner from the lower side to the upper side. The turning support unit 70 is rotatably supported on the upper side of the projecting support portion 62. The turning support unit 70 is mounted on the projecting support portion 62 via a predetermined turning mechanism. That is to say, such a turning mechanism is arranged between the base portion 70a of the turning support unit 70 and the projecting support portion 62 so as to support the turning support unit 70 such that it can be rotated with respect to the base unit 60.

The turning support unit 70 includes: a vertical support portion 71 configured such that it extends upward from the top end of the base portion 70a; a horizontal support portion 72 configured such that it extends in the horizontal direction so as to cross the central portion of the vertical support portion 71 defined along its longitudinal direction, and arranged in a cross-shaped layout together with the vertical support portion 71; a pair of upper diagonal support portions 73; and a pair of lower diagonal support portions 74. Such support portions are each configured as a linear portion. The pair of upper diagonal support portions 73 and the pair of lower diagonal support portions 74 are arranged such that they define a rhombic shape having a pair of diagonal lines extending respectively in the horizontal direction and in the vertical direction in a plane defined in parallel with a vertical plane on which the layout of the three rotor mechanisms 5 is designed. With such an arrangement, the vertical support portion 71 and the horizontal support portion 72 are arranged such that they extend along the diagonal lines.

The top end of the vertical support portion 71 is connected to the rotational shaft unit 31 of the wind turbine 30 configured as a component of the upper rotor mechanism 5C. Furthermore, the left end and the right end of the horizontal support portion 72 are connected to the rotational shaft units 31 of the lower rotor mechanisms 5A and 5B, respectively. Moreover, from among the pair of upper diagonal support portions 73, one is arranged such that its top end is connected to the rotational shaft unit 31 of the upper rotor mechanism 5C and its bottom end is connected to the rotational shaft unit 31 of one of the lower rotor mechanisms 5A, and the other is arranged such that its top end is connected to the rotational shaft unit 31 of the upper rotor mechanism 5C and its bottom end is connected to the rotational shaft unit 31 of the other lower rotor mechanism 5B. Furthermore, from among the pair of lower diagonal support portions 74, one is arranged such that its top end is connected to the rotational shaft unit 31 of one of the lower rotor mechanisms 5A and its bottom end is connected to the base portion 70a positioned below the vertical support portion 71, and the other is arranged such that its top end is connected to the rotational shaft unit 31 of the other lower rotor mechanism 5B and its bottom end is connected to the base portion 70a.

Such support portions each configured as a component of the turning support unit 70 are each arranged such that a part thereof is positioned on the upstream side of the rotor mechanisms 5. Accordingly, such support portions are each designed to have a streamlined cross-section shape giving consideration to the wind flow that flows through the rotor mechanisms 5.

Specifically, the vertical support portion 71 is arranged such that it extends in the vertical direction, and such that it defines a central line that defines the left and right regions of the layout of the three rotor mechanisms 5. With such an arrangement, the vertical support portion 71 is arranged such that its upper-end portion is positioned on the upstream side of the upper rotor mechanism 7C. Accordingly, an upper-half portion 71a of the vertical support portion 71 is configured to have a streamlined cross-section shape. More specifically, the upper-half portion 71a of the vertical support portion 71 is configured as an approximately plate-shaped member having such a cross-section with the rotor axial direction (front-back direction) as its longitudinal direction and with the horizontal direction as its thickness direction. On the other hand, a lower-half portion 71b of the vertical support portion 71 is configured as a cylindrical portion having a circular cross-section. A rib portion 71c configured as a plate-shaped member is provided to the lower-half portion 71b such that it extends along the longitudinal direction of the vertical support portion 71 such that its thickness direction matches the horizontal direction.

Furthermore, the horizontal support portion 72 is arranged along the horizontal direction such that both its ends are respectively positioned on the upstream side of the lower left and right rotor mechanisms 5A and 5B. Accordingly, as with the upper-half portion 71a of the vertical support portion 71, the horizontal support portion 72 is configured, as an overall structure, to have a streamlined cross-section shape. More specifically, the horizontal support portion 72 is configured as an approximately plate-shaped member having such a cross-section having a longitudinal axis that extends in the rotor axial direction and having its thickness direction in the vertical direction.

Furthermore, the pair of the upper diagonal support portions 73 are arranged such that their upper portions are positioned on the upstream side of the upper rotor mechanism 5C, and such that their lower portions are respectively positioned on the upstream sides of the lower rotor mechanisms 5A and 5B. Accordingly, the upper diagonal support portions 73 are each configured, as an overall structure, to have a streamlined cross-section shape. More specifically, as with the horizontal support portion 72 or the like, the upper diagonal support portions 73 are each designed to have a streamlined cross-section shape based on the wind flow that passes through the rotor mechanisms 5. The pair of the lower diagonal support portions 74 are arranged such that their lower portions are respectively positioned on the upstream sides of the lower rotor mechanisms 5A and 5B. Accordingly, as with the upper diagonal support portions 73, the lower diagonal support portions 74 are each designed, as an overall structure, to have a streamlined cross-section shape.

Furthermore, a central support rod 75 is provided to the turning support unit 70 such that it protrudes toward the front side from the crossing portion thereof at which the vertical support portion 71 and the horizontal support portion 72 cross each other. The central support rod 75 is configured to have an approximately oblong conical shape having a diameter that is gradually reduced along a direction from the back side to the front side. With such an arrangement, four wire (thin wire) shaped support wire portions 76 are respectively arranged between the front end of the central support rod 75 and the four apexes of a rhombic shape defined by the pair of the upper diagonal support portions 73 and the pair of the lower diagonal support portions 74. Each support wire portion 76 is mounted such that its end is connected to the front end of the central support rod 75, and such that the other end thereof is connected to the rotational shaft unit 31 of the corresponding rotor mechanism 5 or otherwise the base portion 70a. The four support wire portions 76 are arranged in an approximately four-sided pyramid-shaped layout together with the pair of the upper diagonal support portions 73 and the pair of the lower diagonal support portions 74.

Furthermore, in the support pole structure mechanism included in the wind power generation device 51 according to the present embodiment, each rotor mechanism 5 is provided with support arms 66 and support wire portions 67 configured to connect the rotational shaft unit 31 of the wind turbine 30 and the wind conducting unit 20. The support arms 66 and the support wire portions 67 are each configured as a linear support rod arranged such that it extends along the radial direction of the wind conducting unit 20 as viewed along the rotor axial direction.

Each support arm 66 is mounted between the rotational shaft unit 31 and the wind conducting unit 20 on the front side of the wind conducting unit 20 such that it extends from the rotational shaft unit 31, and such that its end is connected to the opening edge of the wind inlet 20a side of the wind conducting unit 20. With the present embodiment, each support arm 66 is mounted such that its end is connected to the front end of the phase control plate portion 23. As with the support portions each configured as a component of the turning support unit 70, each support arm 66 is designed, as an overall structure, to have a streamlined cross-section shape.

Each support wire portion 67 is mounted such that it extends from a front-side portion of the rotational shaft unit 31 that is closer to the front side than the support arm 66, and such that its end is connected to the end of the support arm 66. The support wire portion 67 is configured as a wire (thin wire) shaped member.

The support arms 66 and the support wire portions 67 are provided to each rotor mechanism 5 on a side that is opposite to the side on which the turning support structure 70 is provided across the rotational shaft unit 31 provided as a central portion. Specifically, in the upper rotor mechanism 5C, the support arms 66 and the support wire portions 67 are mounted on the upper side with respect to the rotational shaft unit 31. With the present embodiment, the upper rotor mechanism 5C is provided with four support arms 66 and four support wire portions 67 around the circumference of the wind conducting unit 20 at approximately regular intervals (approximately regular angle intervals). Furthermore, the lower left and right rotor mechanisms 5A and 5B are each provided with such support arms 66 and such support wire portions 67 on the outer side across the rotational shaft unit 31 along the horizontal direction. In the present embodiment, the lower rotor mechanisms 5A and 5B are each provided with three support arms 66 and three support wire portions 67 around the circumference of the wind conducting unit 20 at approximately regular intervals (approximately regular angle intervals).

The wind power generation device 51 according to the present embodiment has been described as an explanation of an example of the support structure mechanism configured to support the three rotor mechanisms 5. That is to say, as with the wind power generation device 1 according to the first embodiment, with the wind power generation device 51 according to the present embodiment, the three rotor mechanisms 5 are arranged so as to provide a multi-rotor system arrangement such that the inter-wind-turbine space 10 is defined between the wind turbines so as to provide improved output capacity effects. In addition, with such a support structure mechanism for supporting the three rotor mechanisms 5 of the wind power generation device 51 according to the present embodiment, each portion thereof is configured to have a streamlined shape such that it does not interfere with the outer wind flow and the inner wind flow that pass through the rotor mechanisms 5. The support structure mechanism is designed so as to allow each rotor mechanism 5 to provide an inner flow acceleration function and a synergistic effect based on the interaction between the three rotor mechanisms 5, and to maintain the layout relation between the three rotor mechanisms 5 in a stable manner.

Furthermore, with the support structure mechanism for supporting the rotor mechanisms 5 according to the present embodiment, by providing the turning support unit 70 configured to support the three rotor mechanisms 5 such that they can be rotated with respect to the base unit 60, such an arrangement allows the orientations of the three rotor mechanisms 5 to be changed as a single unit. Accordingly, for example, such an arrangement allows the three rotor mechanisms 5 to be turned such that the wind inlet 20a side of each wind conducting unit 20 faces the upwind side. By employing such a structure, such an arrangement allows the orientations of the three rotor mechanisms 5 to be automatically adjusted so as to provide their maximum output. It should be noted that, with such a rotating (turning) mechanism for adjusting the orientation of each of the three rotor mechanisms 5, a mechanical rotation suppressing mechanism may be provide in order to suppress an extremely sensitive adjustment according to a slight change in the wind flow. Also, a control apparatus may be provided in order to suppress such an extremely sensitive adjustment.

The wind power generation devices according to the present invention as described above with reference to the embodiments are not restricted to the aforementioned embodiments. Rather, various kinds of embodiments may be employed without departing from the spirit and technical scope of the present invention.

For example, description has been made in the aforementioned embodiment regarding an arrangement in which each wind conducting unit 20 is configured, as its overall structure, to have a diameter that is greater than the size in the rotor axial direction. However, the present invention is not restricted to such an arrangement. That is to say, as shown in FIG. 11A, the wind conducting unit 20 may be configured to have a diameter-direction size B1 that is smaller than a rotor-axial-direction size B2. Also, as shown in FIG. 11B, the wind conducting unit 20 may be configured to have a diameter-direction size B1 that is on the same order as the rotor-axial-direction size B2. Also, as shown in FIG. 5, the wind conducting unit 20 may be configured such that B2 is greatly smaller than B1.

Also, the height of the flange portion 22 included in each wind conducting unit 20 is not restricted in particular regardless of the diameter-direction size and the rotor-axial-direction size of the wind conducting unit 20. Accordingly, for example, the flange portion 20 may be configured with a height that is on the same order as the radius of the wind conducting unit 20. Also, the flange portion 20 may be configured with a height that is larger than the radius of the wind conducting unit 20.

The rotor mechanisms 5, which are each configured as a basic unit of the wind turbine arrangement, preferably have the same configuration in order to enable mass production, thereby allowing the cost to be reduced. However, the present invention is not restricted to such an arrangement. Also, various kinds and various sizes of rotor mechanisms 5 having different wind conducting unit 20 scales, different wind turbine 30 scales, or the like, may be arranged so as to form a multi-rotor system arrangement.

Conceivable examples of the rotational directions of the multiple rotor mechanisms 5 included in the wind power generation device 1 include: an arrangement in which all the rotor mechanisms 5 are designed to rotate in the same direction; and an arrangement in which there is a difference in the rotational direction between a part of the rotor mechanisms 5 and the other rotor mechanisms 5 as described with reference to the experiment results. For example, in a case in which multiple rotor mechanisms 5 are installed underwater so as to provide a water power generation device, suitable arrangements may be employed as appropriate giving consideration to various kinds of effects such as a gyro effect or the like. Examples of such suitable arrangements that can be employed include: an arrangement in which the rotor mechanisms 5 are arranged such that adjacent pair of rotor mechanisms 5 are designed to have rotational directions that are the reverse of each other; and an arrangement in which an even number of rotor mechanisms 5 are arranged in an upper-lower symmetrical layout or otherwise a left-right symmetrical layout such that pair of the symmetrically arranged rotor mechanisms 5 are designed to have rotational directions that are the reverse of each other.

Figure 12:
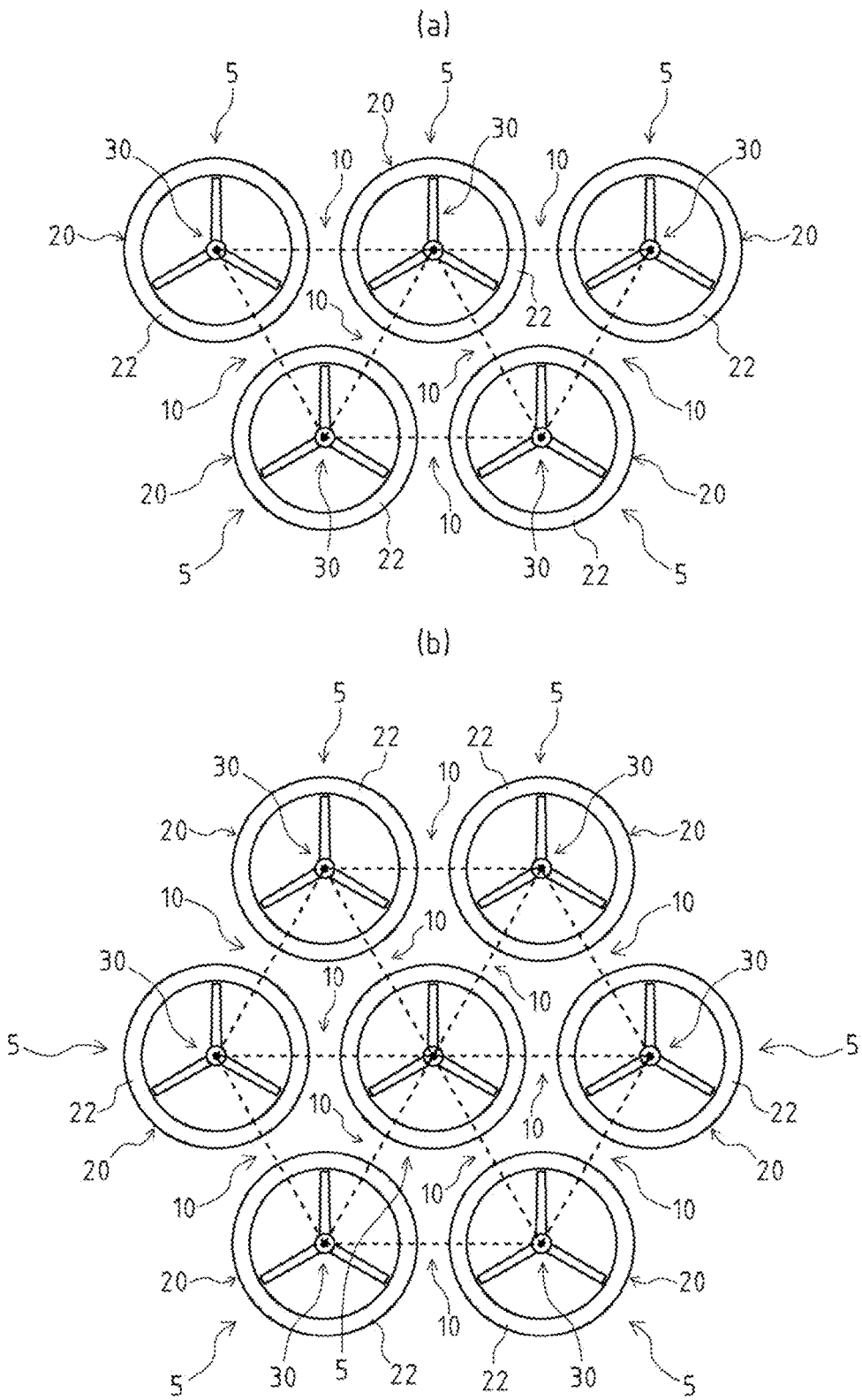
FIG. 12 is a diagram showing a modification of a layout of the multiple rotor mechanisms according to each embodiment of the present invention.

The number of the rotor mechanisms arranged as a multi-rotor system in a predetermined layout is not restricted to three as described in the aforementioned embodiment. In a case in which five rotor mechanisms 5 are arranged as a multi-rotor system, for example, as shown in FIG. 12A, the five rotor mechanisms 5 are arranged in a layout defined in a predetermined plane that is orthogonal to the rotor axial direction, such that three rotor mechanisms 5 are each arranged as an upper rotor mechanism such that they are aligned in the horizontal direction, and such that the remaining two rotor mechanisms 5 are each arranged as a lower rotor mechanism such that they are aligned in the horizontal direction and such that they are positioned immediately below the upper rotor mechanisms 5 and between them in the horizontal direction. With such an arrangement, an inter-wind-turbine space 10 with a predetermined size is defined between adjacent rotor mechanisms 5. It should be noted that it has been confirmed by experiment that, by arranging such five rotor mechanisms 5 as a multi-rotor system with a space/diameter ratio s/D of 0.1, such an arrangement provides overall output on the order of 12% greater than the sum total of the outputs of the rotor mechanisms 5 when they are operated separately.

Also, in a case in which seven rotor mechanisms 5 are arranged so as to form a multi-rotor system, for example, as shown in FIG. 12B, two rotor mechanisms 5 are further arranged in addition to the layout of the five rotor mechanisms 5 shown in FIG. 12A, such that the additional two rotor mechanisms 5 are arranged along the horizontal direction above the three rotor mechanisms 5 arranged along the horizontal direction, such that they have an upper-lower symmetrical relation with the lower pair of rotor mechanisms 5 arranged in the horizontal direction. It should be noted that it has been confirmed by experiment that, by arranging such seven rotor mechanisms 5 as a multi-rotor system with a space/diameter ratio s/D of 0.1, such an arrangement provides overall output on the order of 14% greater than the sum total of the outputs of the rotor mechanisms 5 when they are operated separately.

Figure 13:
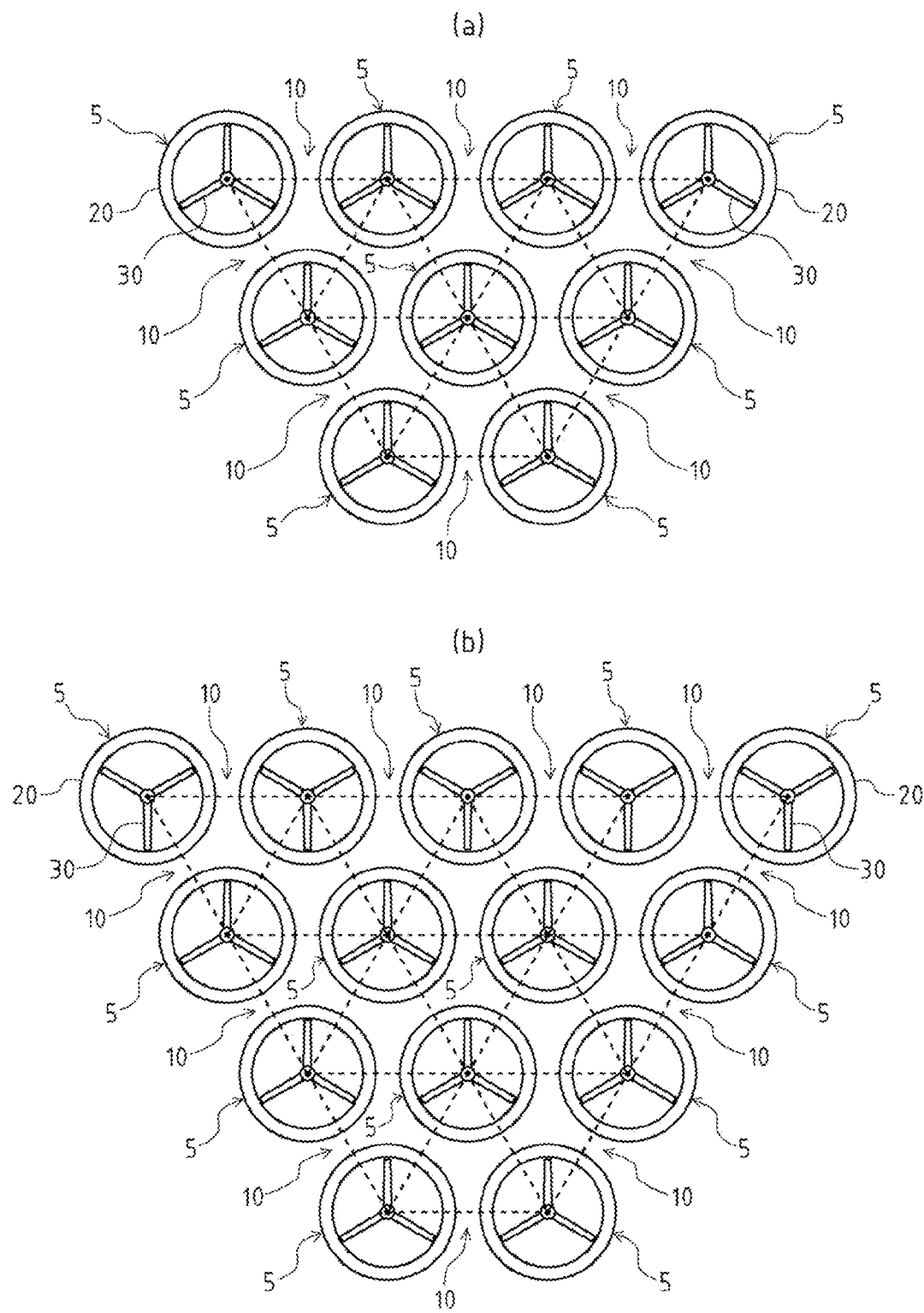
FIG. 13 is a diagram showing another modification of the layout of the multiple rotor mechanisms according to each embodiment of the present invention.

Furthermore, in a case in which nine rotor mechanisms 5 are arranged so as to form a multi-rotor system, for example, as shown in FIG. 13A, a pair of rotor mechanisms 5 are further arranged in addition to the layout of the seven rotor mechanisms 5 shown in FIG. 12B, such that they are respectively configured as an upper-left rotor mechanism 5 and an upper-right rotor mechanism 5, and such that they have a left-right symmetrical relation. Also, in a case in which fourteen rotor mechanisms 5 are arranged so as to form a multi-rotor system, for example, as shown in FIG. 13B, in addition to the layout of the nine rotor mechanisms 5 shown in FIG. 13A, five rotor mechanisms 5 are further arranged along the horizontal direction above the four rotor mechanisms 5 arranged along the horizontal direction, such that they have a left-right symmetrical relation.

It can be said that such multi-rotor systems respectively comprising five, seven, nine, and fourteen rotor mechanisms 5 respectively shown in FIGS. 12A, 12B, 12C, and 12D, can each be configured as a combination of the multi-rotor systems each including the three rotor mechanisms 5 arranged in a regular triangular layout as described in the aforementioned embodiment. That is to say, the layouts of the multi-rotor systems may each be configured with a regular triangular layout as a minimum unit of layout having apexes each defined as the position of the rotational axis (rotor center position) of the corresponding wind turbine 30 as viewed along the rotor axial direction. It can be said that, with such a layout arrangement, two rotor mechanisms 5 are shared between the adjacent regular triangular layouts.

Figure 14:
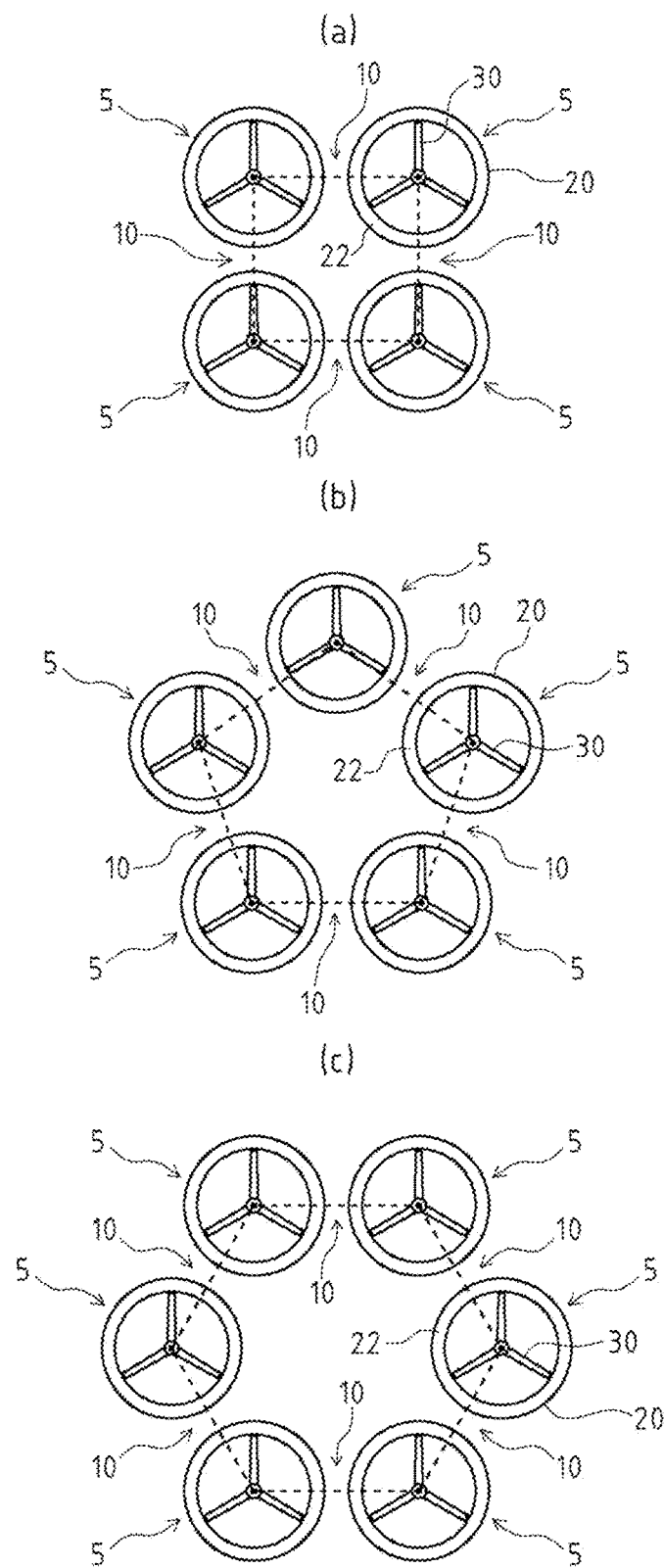
FIG. 14 is a diagram showing yet another modification of the layout of the multiple rotor mechanisms according to each embodiment of the present invention.

Furthermore, examples of such layout arrangements comprising the rotor mechanisms 5 include: an arrangement as shown in FIG. 14A in which four rotor mechanisms 5 are arranged in a rectangular layout (in FIG. 14A, a square layout as an example of such a rectangular layout); an arrangement as shown in FIG. 14B in which five rotor mechanisms 5 are arranged in a pentagonal layout (in FIG. 14B, a regular pentagonal layout as an example of such a pentagonal layout); and an arrangement as shown in FIG. 14C in which six rotor mechanisms 5 are arranged in a hexagonal layout (in FIG. 14C, a regular hexagonal layout as an example of such a hexagonal layout).

Regarding such layout arrangements each comprising the rotor mechanisms 5 as described above for exemplary purposes, it can be said that the layout arrangements described in the aforementioned embodiments or otherwise those shown in FIGS. 14A, 14B, and 14C can each be obtained by arranging the rotor mechanisms 5 such that their rotor center positions are arranged along the circumference of a predetermined circular layout at regular intervals as viewed along the rotor axial direction. Also, it can be said that the layout arrangement as shown in FIG. 12B can be obtained by further arranging a single rotor mechanism in addition to the aforementioned arrangement of the rotor mechanisms 5 arranged along a predetermined circle at regular intervals, such that its rotor center position matches the center of the predetermined circle. Furthermore, examples of such layout arrangements each comprising multiple rotor mechanisms 5 include: arrangements obtained as the reverse of the aforementioned layout arrangements in the vertical direction; arrangements each configured as an array of the rotor mechanisms 5 in the vertical direction (upper-lower direction) or otherwise in the horizontal direction (left-right direction); and arrangements each configured as a matrix of the rotor mechanisms 5 arranged in the horizontal direction and in the vertical direction. Also, the number of the rotor mechanisms 5 to be arranged so as to form a multi-rotor system may be several dozen or the like. As described above, various kinds of layout arrangements are conceivable so as to form a multi-rotor system comprising the rotor mechanisms 5.

Figure 15:
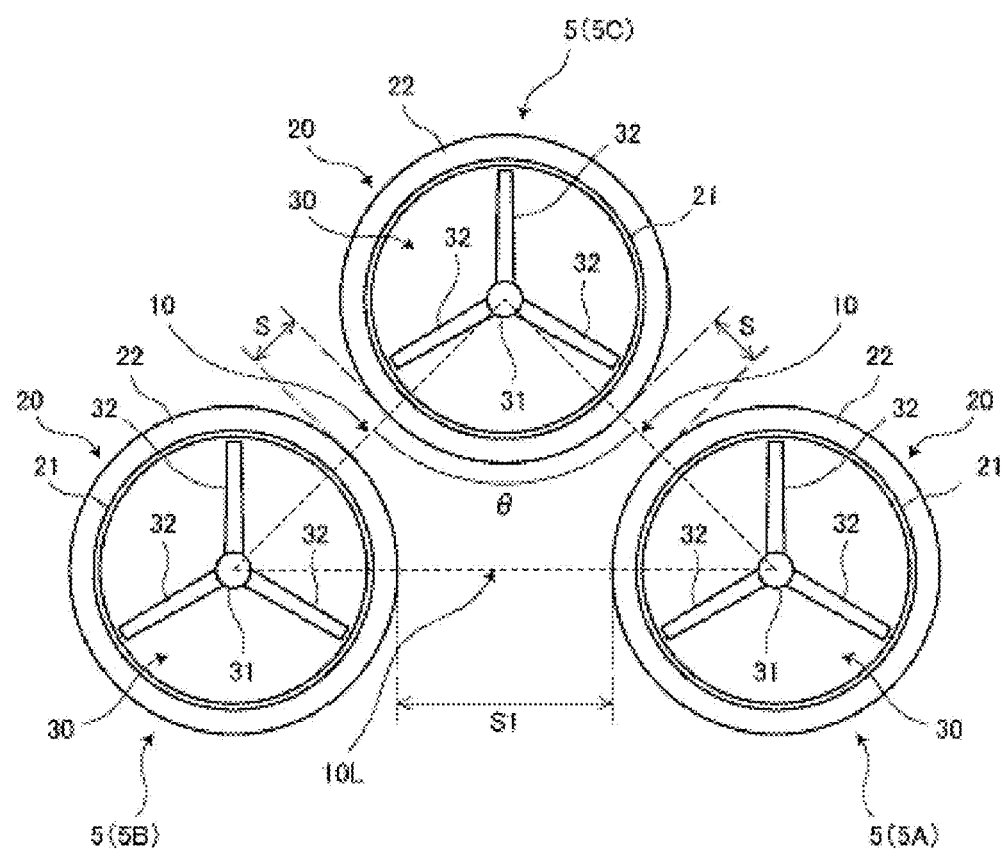
FIG. 15 is a diagram showing a generalized example of the layout of the three rotor mechanisms according to each embodiment of the present invention.

It should be noted that, with the present embodiment, in a case in which three rotor mechanisms 5 are arranged to form a multi-rotor system, as shown in FIG. 15, a single rotor mechanism 5 (5C) configured as an upper rotor mechanism and a pair of rotor mechanisms 5 (5A, 5B) each configured as a lower rotor mechanism are arranged in an isosceles triangular layout having an angle θ (60°≤θ≤180°). With such an arrangement, the inter-wind-turbine spaces 10 are respectively defined between the upper rotor mechanism 5C and the lower rotor mechanism 5A, and between the upper rotor mechanism 5C and the lower rotor mechanism 5B. Furthermore, an inter-wind-turbine space 10L (inter-wind-turbine space 10L≥inter-wind-turbine space 10) is defined between the lower pair of rotor mechanisms 5A and 5B).

That is to say, the layout arrangements described above with reference to FIGS. 1, 2, 7, 9, and 10, are each equivalent to an arrangement shown in FIG. 15 with an angle θ of 60 degrees, and with the inter-wind-turbine space 10L and the inter-wind-turbine space 10 of the same size. In particular, in a case in which the angle θ=1800, the three rotor mechanisms 5 are arranged in the form of an array. It has been confirmed based on experimental results that, with such a layout arrangement, as the angle θ becomes greater, the overall power output from the system becomes greater. Description will be made with reference to FIG. 16 regarding such experimental results.

In the present experiment, the change in the overall output of the wind power generation device 1 was measured for each of a case of an angle θ of 900 and a case of an angle θ of 1800, and with the sum total of the measurement values of the outputs of the three rotor mechanisms 5A, 5B, and 5C when they were operated separately as a reference. The graph shown in FIG. 16 shows the overall power output from a multi-rotor system comprising the three rotor mechanisms 5A, 5B, and 5C, each having a predetermined size, and arranged in such a layout with an angle θ of 90° or 180° and with such inter-wind-turbine spaces 10 between them (which will be referred to as the "multi-rotor system arrangement" hereafter).

In the graph shown in FIG. 16, the horizontal axis represents s/D (s=space between brims of turbines s/D, D=brim diameter) with the size of the inter-wind-turbine space 10 as "s", and with the diameter of the flange portion 22 configured as a maximum outer diameter portion of the wind conducting unit 20 as "D". That is to say, the horizontal axis represents the ratio (which will be referred to as the "space/diameter ratio" hereafter) of s (size of the inter-wind-turbine space 10) with respect to D2 (maximum outer diameter size of the wind conducting unit 20). On the other hand, the vertical axis represents the output (Power Output [Watts]). It should be noted that, in the present experiment, the upper rotor mechanism C was configured to rotate in a right-hand rotating manner (in a clockwise manner), and the lower pair of rotor mechanisms 5A and 5B were each configured to rotate in a left-hand rotating manner (in a counterclockwise manner) as viewed from the front of the three rotor mechanisms 5 shown in FIG. 15.

In the graph shown in FIG. 16, the points R1 through R14 show the measurement values of the outputs from the multi-rotor system arrangement comprising the three rotor mechanisms 5A, 5B, and 5C (each including the flange portion 22 having a height that is 7.5% of the maximum outer diameter D2 of the wind conducting unit 20) arranged with an angle θ of 90°. In contrast, the points S1 through S14 show the measurement values of the outputs from the same multi-rotor system arrangement except that the three rotor mechanisms 5A, 5B, and 5C are arranged with an angle θ of 180°. The estimated measurement error involved in the measurement values is approximately ±2%. In the graph shown in FIG. 16, the broken line L2 represents the reference measurement value as described above. Specifically, the broken line L2 represents the sum total of the measurement values of the outputs of the three (standalone) rotor mechanisms 5A, 5B, and 5C when they are operated separately (which will be referred to as the "sum total of the separate measurement output values" hereafter).

As shown in FIG. 16, as the angle θ becomes larger, from 900 to 1800, the increase ratio of the overall output of the multi-rotor system arrangement becomes larger. For example, in a case in which the space/diameter ratio s/D=0.15, and in a case in which the angle θ=90°, the overall output increase ratio is +6 to +7%. In a case in which the angle θ=180°, the overall output increase ratio is +8 to +10%.

Based on the measurement results as described above, it can be understood that, with the multi-rotor system arrangement comprising the three rotor mechanisms 5, as the angle θ becomes larger, the output ratio of the multi-rotor system arrangement becomes higher with respect to the sum total of the outputs of the wind turbines when they are operated separately. In particular, based on the present experimental results, it has been found that, with such a multi-rotor system arrangement in which the space/diameter ratio s/D=0, in a case in which the angle θ=60°, the output of the multi-rotor system arrangement is smaller than the sum total of the outputs of the wind turbines when they are operated separately. In contrast, with such a multi-rotor system arrangement, in a case in which the angle θ=90° or 180°, the output of the multi-rotor system arrangement is greater than the sum total of the outputs of the wind turbines when they are operated separately, which is a notable feature.

Description will be made below regarding the reason for the relation between the angle θ and the output of the multi-rotor system arrangement as described above.

That is to say, in a case in which the angle θ=90° or 180° (in a case in which the angle θ is greater than 60°), and in a case in which the space/diameter ratio s/D is set to a small value, the overall structure of the three rotor mechanisms 5 becomes closer to an arrangement configured in a two-dimensional layout such that such that the three rotor mechanisms 5 are aligned along a single direction as viewed from the side. In this case, it can be considered that, in addition to the synergistic effect based on the interaction between the inner flows of the rotor mechanisms 5 (which will also be referred to as the "interaction effect" in this specification), such vortexes are generated in a two-dimensional manner due to the overall structure having such an approximately two-dimensional layout, which increases the output.

In contrast, it can be considered that, in a case in which the angle θ=60° and the space/diameter ratio s/D is set to a low value, it is difficult for a fluid to flow through a space between the three rotor mechanisms 5, i.e., a space defined in a central portion of the layout of the three rotor mechanisms 5, leading to a reduction in the output.

As described above, it can be considered that, as the angle θ becomes larger, the inner-flow interaction effect becomes dominant between adjacent rotor mechanisms 5 (5A and 5C, or 5A and 5B) as compared with the inner-flow interaction effect between the three rotor mechanisms 5. In this case, there is no space having high fluid flow resistance. Thus, it can be considered that such an arrangement provides increased output. Accordingly, with the present embodiment, in a case in which the three rotor mechanisms 5 are arranged so as to form a multi-rotor system arrangement, the rotor mechanisms 5 are preferably arranged in an isosceles triangular layout other than a regular triangular layout that is as close to a linear array layout as possible (with an angle θ having a large value). Such an arrangement allows the multi-rotor system arrangement to provide improved output in a stable manner even in a case in which the inter-wind-turbine space 10 is set to a small value.

It should be noted that, based on the present experimental results, it can be understood that, in a case in which the angle θ=90°, there is a peak in a range of the space/diameter ratio s/D of 0.1 to 0.25 with respect to the increase ratio of the output of the multi-rotor system arrangement with respect to the sum total of the outputs of the wind turbines when they are operated separately. Furthermore, it can be understood that, in a case in which the angle θ=180°, there is such a peak in a range of the space/diameter ratio s/D of 0.3 to 0.5.

FIG. 16 shows the measurement results for an example in a case in which the flange portion 22 has a height that is 7.5% of the maximum outer diameter D1 of the wind conducting unit 20. Furthermore, based on different experimental results, it has been found that such an arrangement provides improved overall output as compared with that provided by an arrangement in which the flange portion 22 has a height that is 3% of the maximum outer diameter D2 of the wind conducting unit 20. Accordingly, it can be said that, by designing the flange portion 22 with an increased height, such an arrangement allows the aforementioned interaction between the rotor mechanisms 5 to be strengthened, thereby allowing the output of such a multi-rotor system arrangement to be raised.

Description has been made with reference to FIG. 16 regarding the relation between the multi-rotor system arrangement comprising the three rotor mechanisms 5 and the output of such a multi-rotor system arrangement. Based on the aforementioned analysis results, it can be said that, in a case in which four or more rotor mechanism 5 are arranged in the same manner, by designing the layout of the rotor mechanisms 5 such that each space exhibits as low a flow resistance as possible, such a layout allows the multi-rotor system arrangement to provide improved output in a stable manner even in a case in which the inter wind space 10 has a small size.

It should be noted that such multi-rotor systems respectively comprising five, seven, nine, and fourteen rotor mechanisms 5 respectively shown in FIGS. 12A, 12B, 12C, and 12D, may each be configured as a combination of the multi-rotor systems each including the three rotor mechanisms 5 arranged in an isosceles triangular layout as described with reference to FIG. 15. In this case, the layouts of the multi-rotor systems may each be designed with an isosceles triangular layout as a minimum unit of layout having apexes each defined as the position of the rotational axis (rotor center position) of the corresponding wind turbine 30 as viewed along the rotor axial direction. It can be said that, with such a layout, two rotor mechanisms 5 are shared between the adjacent isosceles triangular layouts.

In particular, the layout of the multiple rotor mechanisms 5 is designed with an isosceles triangular layout (other than a regular triangular layout) as a minimum unit of layout having apexes each defined as the position of the rotational axis of the corresponding wind turbine 30 as viewed along the rotor axial direction. Such a layout allows the multi-rotor system arrangement to provide improved output in a stable manner even in a case in which the inter-wind-space 10 has a small size.

Also, such multiple rotor mechanisms 5 may be arranged in a layout obtained as the reverse of the aforementioned layout arrangements in the vertical direction. Also, the number of the rotor mechanisms 5 to be arranged so as to form a multi-rotor system may be several dozen or the like. As described above, various kinds of layout arrangements are conceivable so as to form a multi-rotor system comprising the rotor mechanisms 5.

Third Embodiment

Figure 17:
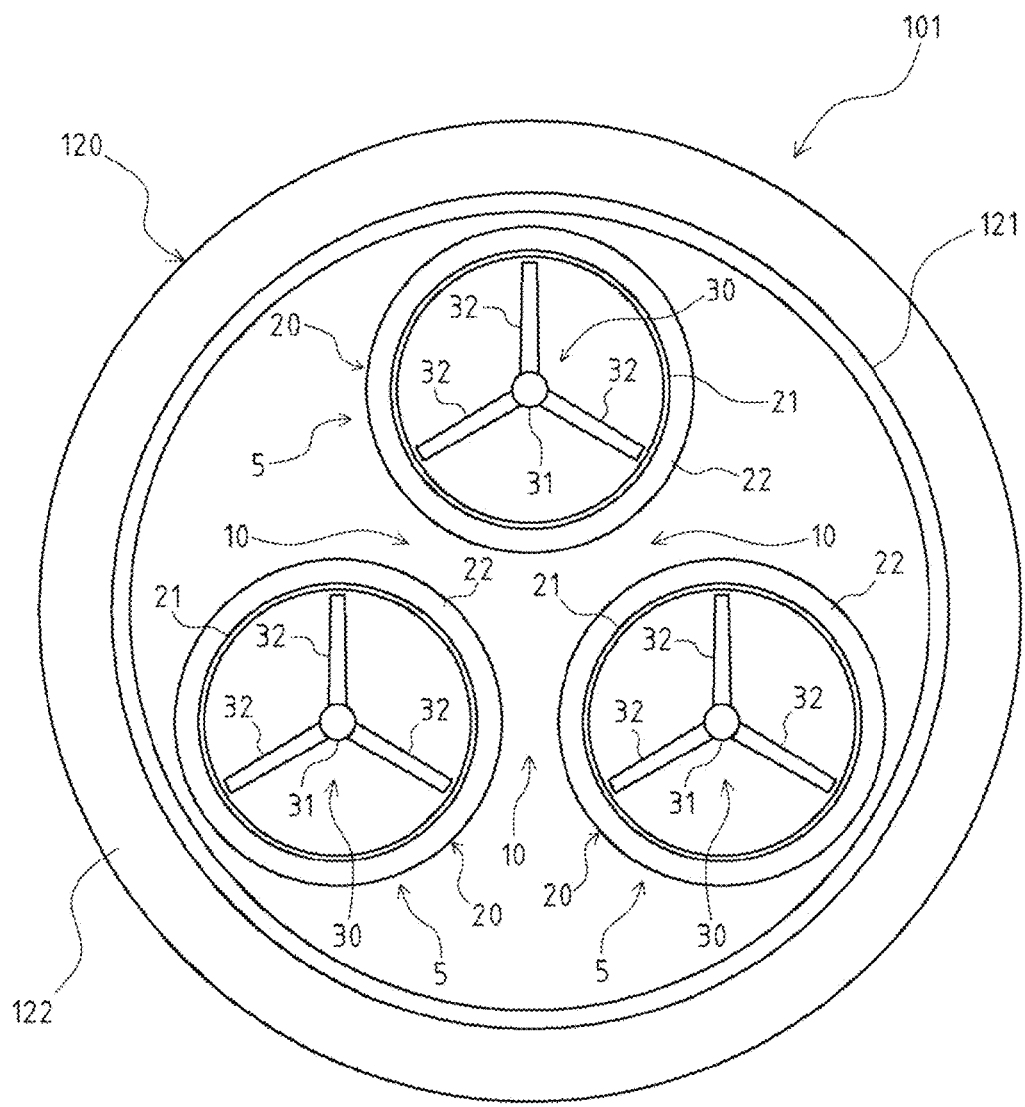
FIG. 17 is a front view showing a configuration of a wind power generation device according to a third embodiment of the present invention.

Description will be made with reference to FIG. 17 regarding a third embodiment of the present invention. It should be noted that the same components as those described in each of the aforementioned embodiments are denoted by the same reference numerals, and redundant description thereof will be omitted as appropriate. A wind power generation device 101 according to the present embodiment includes a casing member 120 configured to surround the overall arrangement of the three rotor mechanisms 5 arranged in an isosceles triangular layout (in FIG. 17, in a regular triangular layout as an example of such an isosceles triangular layout) defined in a predetermined plane that is orthogonal to the rotor axial direction.

The casing member 120 may have the same basic structure as that of the wind conducting unit 20 of each rotor mechanism 5. That is to say, the casing member 120 is configured as a circular and tubular overall structure having a length (in the tubular axial direction) that is smaller than its diameter. With such an arrangement, an opening formed on one side of the tubular structure is designed as the wind inlet. Another opening formed on the other side along the rotor axial direction is designed as the wind outlet.

Furthermore, the casing member 120 is designed to have a structure for allowing vortexes to be generated in the vicinity of the wind outlet, thereby increasing the speed of the inner flow of the wind that flows through the internal space of the casing member 120. The casing member 120 is configured to have a non-streamlined shape with respect to the wind flow direction, and to surround the multiple rotor mechanisms 5 so as to separate the inner flow and the outer flow from each other. Specifically, the casing member 120 includes a main body portion 121 having a tubular structure and a flange portion 122 provided to the end of the wind outlet side of the main body portion 121.

The main body portion 121 is configured as a tubular or a ring-shaped portion having a curved face that protrudes toward the center axial side in the longitudinal cross-sectional view. That is to say, the major portion of the main body portion 121 on the downwind side (wind outlet side) is configured to have a diameter that gradually increases along the center axial direction of the casing member 120 from the upwind side (wind inlet side) to the downwind side. Such a major portion functions as a diffuser. That is to say, the downwind-side major portion of the main body portion 121 of the casing member 120 has a flow cross-section that gradually increases along the central axial direction from the wind inlet side to the wind outlet side. It should be noted that such a downwind-side major portion of the main body portion 121 having a diameter that increases along the central axial direction from the upwind side to the downwind side is not restricted to such a curved structure in such a longitudinal cross-sectional view. That is to say, such a downwind-side major portion may be configured as a linear structure, i.e., may be configured as a part of a conical structure.

In contrast, the upwind-side portion of the main body portion 121 of the casing member 120 is configured as a structure having a diameter that gradually increases along a center axial direction from the downwind side to the upwind side, i.e., as a structure having a diameter that gradually reduces along a center axial direction from the upwind side to the downwind side, which is the reverse of that of the downwind-side major portion of the main body portion 121. With such an arrangement, the flow cross-section of the casing member 120 tightens once along a center axial direction from the wind inlet, which provides a function of accelerating the wind flow. It should be noted that the upwind-side portion of the main body portion 121 that gradually reduces along the center axial direction from the upwind side to the downwind side may be configured as a part of a conical structure, as with the downwind-side major portion of the main body portion 121.

The flange portion 122 is configured to generate vortexes in the vicinity the wind outlet of the casing member 120, as with the flange portion 22 of the wind conducting unit 20. That is to say, the flange portion 122 is configured as a ring-shaped flat-plate portion provided over the entire circumference of the wind outlet such that it extends along a plane that is orthogonal to the center axial direction of the casing member 120. Accordingly, in the longitudinal cross-sectional view of the casing member 120, the flange portion 122 is configured to have a linear cross-sectional shape extending outward in the radial direction of the casing member 120, i.e., in a direction that is orthogonal to the central axial direction of the casing member 120, from the downwind-side edge of the main body portion 21, so as to provide the casing member 120 with a linear flange portion. The width of the flange portion 122, i.e., the height of a protrusion configured as the flange portion 122 formed such that it extends from the main body portion 121, is not restricted in particular. For example, the width of the flange portion 122 is set to a size ranging between several percent to 50% of the minimum inner diameter of the casing member 120.

As described above, the casing member 120 includes the flange portion 122 configured as a vortex generating unit for generating vortexes in the vicinity of the wind outlet. The flange portion 122 is provided to the downwind-side end of the casing member 120. Accordingly, the casing member 120 has an overall structure that is non-streamlined.

It should be noted that the shape or the like of the casing member 120 to be employed in the wind power generation device 101 according to the present embodiment is not restricted in particular so long as the casing member 120 is structured to surround the overall arrangement of the multiple rotor mechanisms 5. For example, the casing member 120 may be configured as a polygonal member such as a triangular tubular member or a square tubular member, an elliptical tubular member, or the like, according to the layout of the multiple rotor mechanisms 5 housed within the casing member 120. Also, description has been made in the present embodiment regarding an arrangement in which three rotor mechanisms 5 are housed within the casing member 120. However, the number and the layout of the rotor mechanisms 5 housed within the casing member 120 are not restricted in particular.

Fourth Embodiment

Description will be made with reference to FIG. 18 regarding a fourth embodiment of the present invention. It should be noted that the same components as those described in each of the aforementioned embodiments are denoted by the same reference numerals, and redundant description thereof will be omitted as appropriate. A wind power generation device 201 according to the present embodiment includes multiple rotor mechanisms 5 arranged in a predetermined layout, each of which includes multiple wind turbines 30.

Figure 18:
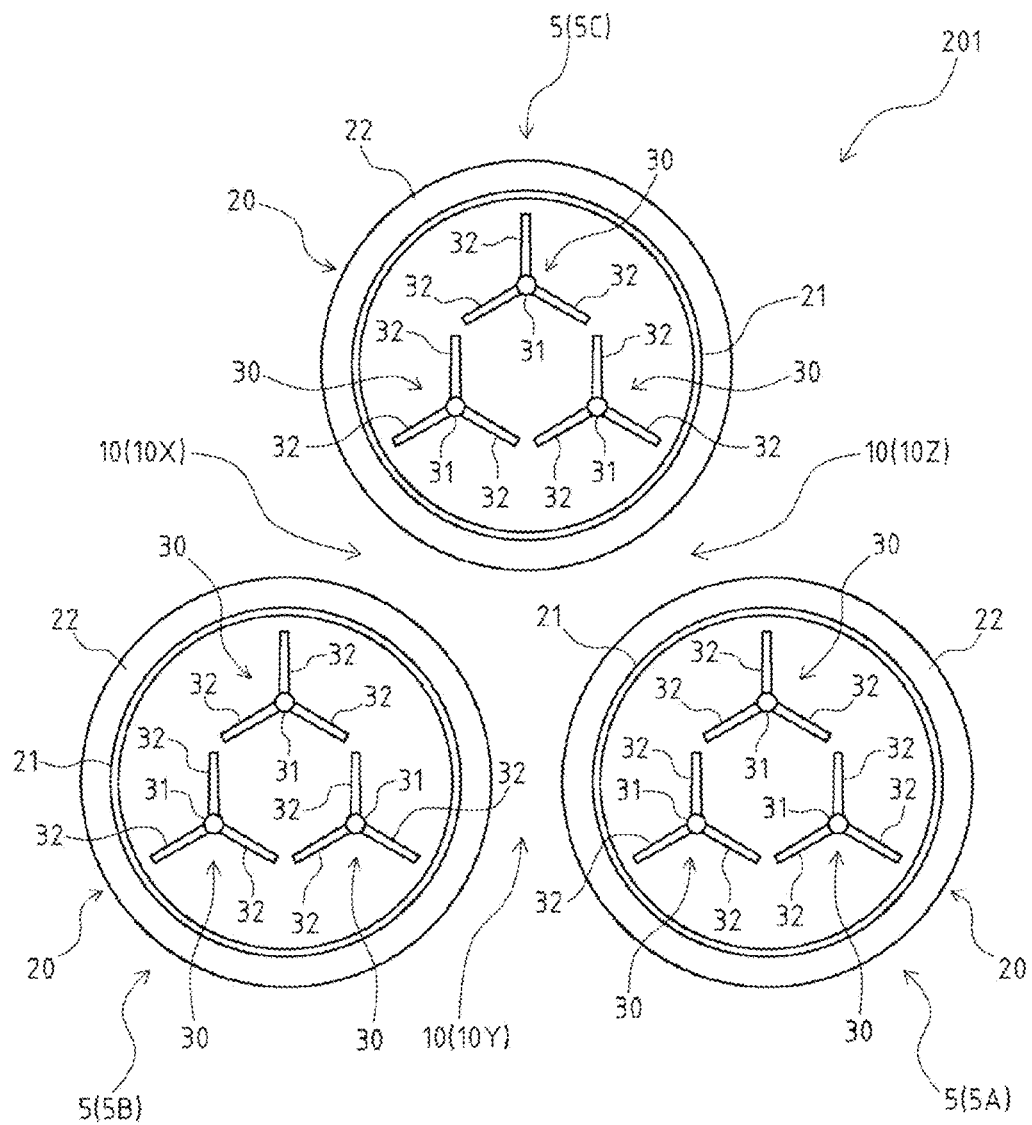
FIG. 18 is a front view showing a rotor mechanism according to a fourth embodiment of the present invention.

In an example shown in FIG. 18, the rotor mechanisms 5 are arranged in an isosceles triangular layout (FIG. 18 shows a regular triangular layout as an example of such an isosceles triangular layout) defined in a predetermined vertical plane that is orthogonal to the rotor axial direction. Furthermore, three wind turbines 30 are arranged within the wind conducting unit 20 of each rotor mechanism 5. The three wind turbines 30 are arranged such that their rotor axial directions are aligned with the same direction. Furthermore, the three wind turbines 30 are arranged in a layout defined in the same vertical plane. That is to say, the three wind turbines 30 are arranged at the same position along the rotor axial direction (front-back direction). It should be noted that the layout of the three wind turbines 30 is not restricted to such an arrangement in which the three wind turbines 30 are arranged at the same position along the rotor axial direction.

Also, the three wind turbines 30 may be arranged such that adjacent wind turbines 30 have an offset along the rotor axial direction (in a staggered layout).

The three wind turbines 30 are arranged in a regular triangular layout. That is to say, the three wind turbines 30 are arranged such that the positions of the rotational axes thereof match the apexes of a regular triangular layout with one side thereof extending along the horizontal direction, as viewed along the rotor axial direction. Accordingly, from among the three wind turbines 30, two wind turbines 30 are arranged at the same height. Furthermore, the remaining wind turbine 30 is arranged between and above the other pair of wind turbines 30.

As described in the present embodiment, multiple power generation wind turbines 30 may be provided within the internal space of the wind conducting unit 20 of each rotor mechanism 5. It should be noted that, in such a case in which multiple wind turbines 30 are provided within the internal space of the wind conducting unit 20 of each rotor mechanism 5, the number and the layout of the wind turbines 30 are not restricted in particular. Also, multiple kinds of wind turbines 30 having different sizes may be provided within the internal space of the wind conducting unit 20 of each rotor mechanism 5. Also, there may be a difference in the size or the like of each wind turbine 30 between the multiple rotor mechanisms 5 included in the wind power generation device 201.

Also, the fourth embodiment may be combined with the aforementioned third embodiment, so as to allow the casing member 120 to surround the overall arrangement of the multiple wind turbines 30. For example, the casing member 120 may be designed in a rectangular shape having rounded corners as viewed from the side thereof. Also, the casing member 120 having such a shape may be configured to surround the overall arrangement of the multiple rotor mechanisms 5 arranged in parallel.

Fifth Embodiment

Description will be made with reference to FIGS. 19 through 21 regarding a fifth embodiment of the present invention. It should be noted that the same components as those in each of the aforementioned embodiments are denoted by the same reference numerals, and redundant description thereof will be omitted as appropriate. The point of difference from the wind power generation device 1 according to the first embodiment and the wind power generation device 51 according to the second embodiment is that a wind power generation device 52 according to the present embodiment includes rotor mechanisms 500 each having a different configuration (see FIG. 21 for details). Furthermore, as a point in common with the wind power generation device 1 or 51, such three rotor mechanisms 500 are arranged in an isosceles triangular layout defined in a predetermined plane that is orthogonal to the rotor axial direction. The point of difference is that the three rotor mechanisms 500 are supported by a different support mechanism or the like.

It should be noted that description will be made in the fifth embodiment regarding the three rotor mechanisms 500 arranged in an isosceles triangular layout other than a regular triangular layout. Furthermore, such an isosceles triangular layout corresponds to that described above with reference to FIG. 15 with an angle θ of 90°. However, it should be noted that such a regular triangular layout is by no means intended to be eliminated from the technical scope of the present invention.

Figure 19:
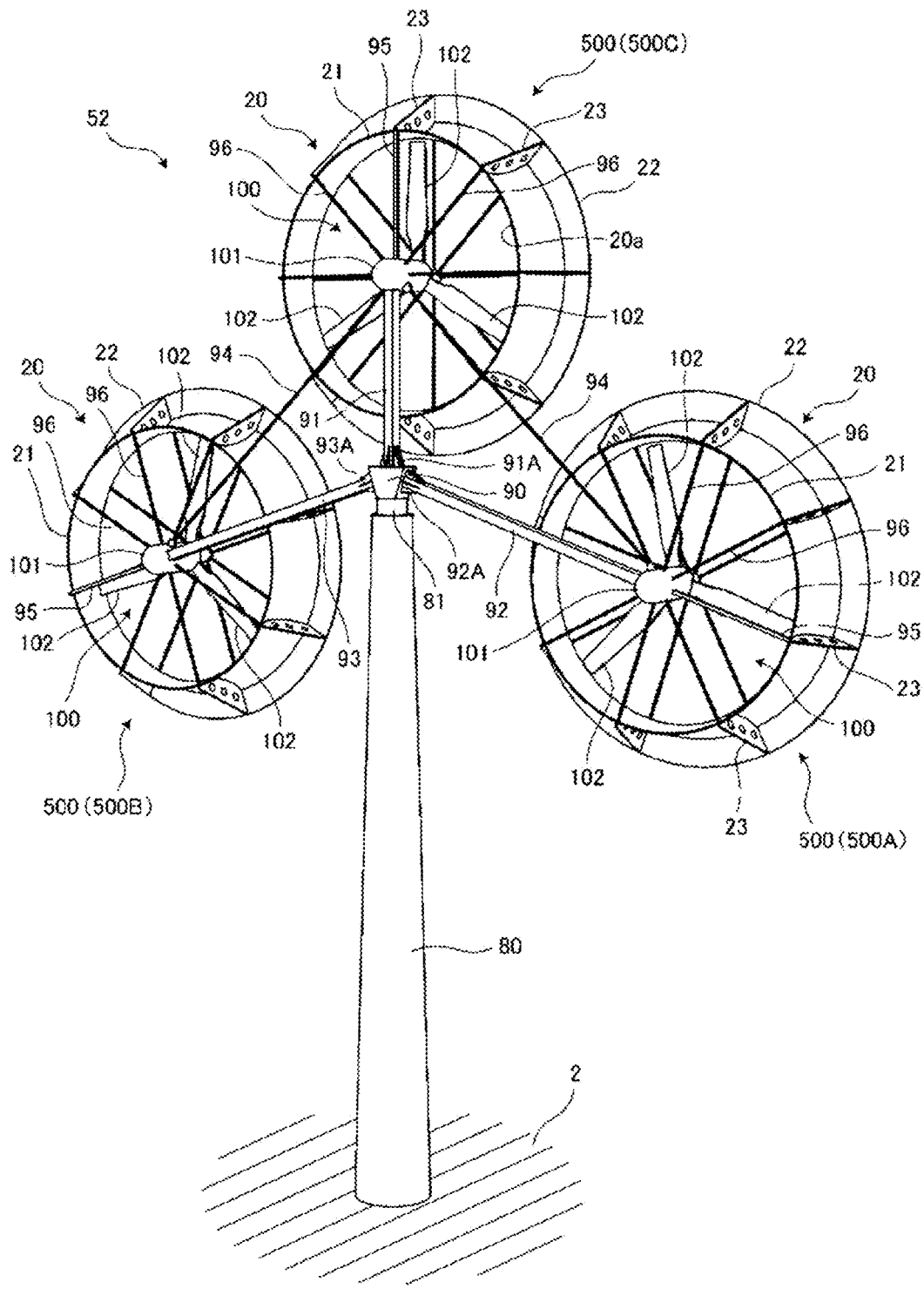
FIG. 19 is a perspective view from the front side showing a configuration of a wind power generation device according to a fifth embodiment of the present invention.
Figure 20:
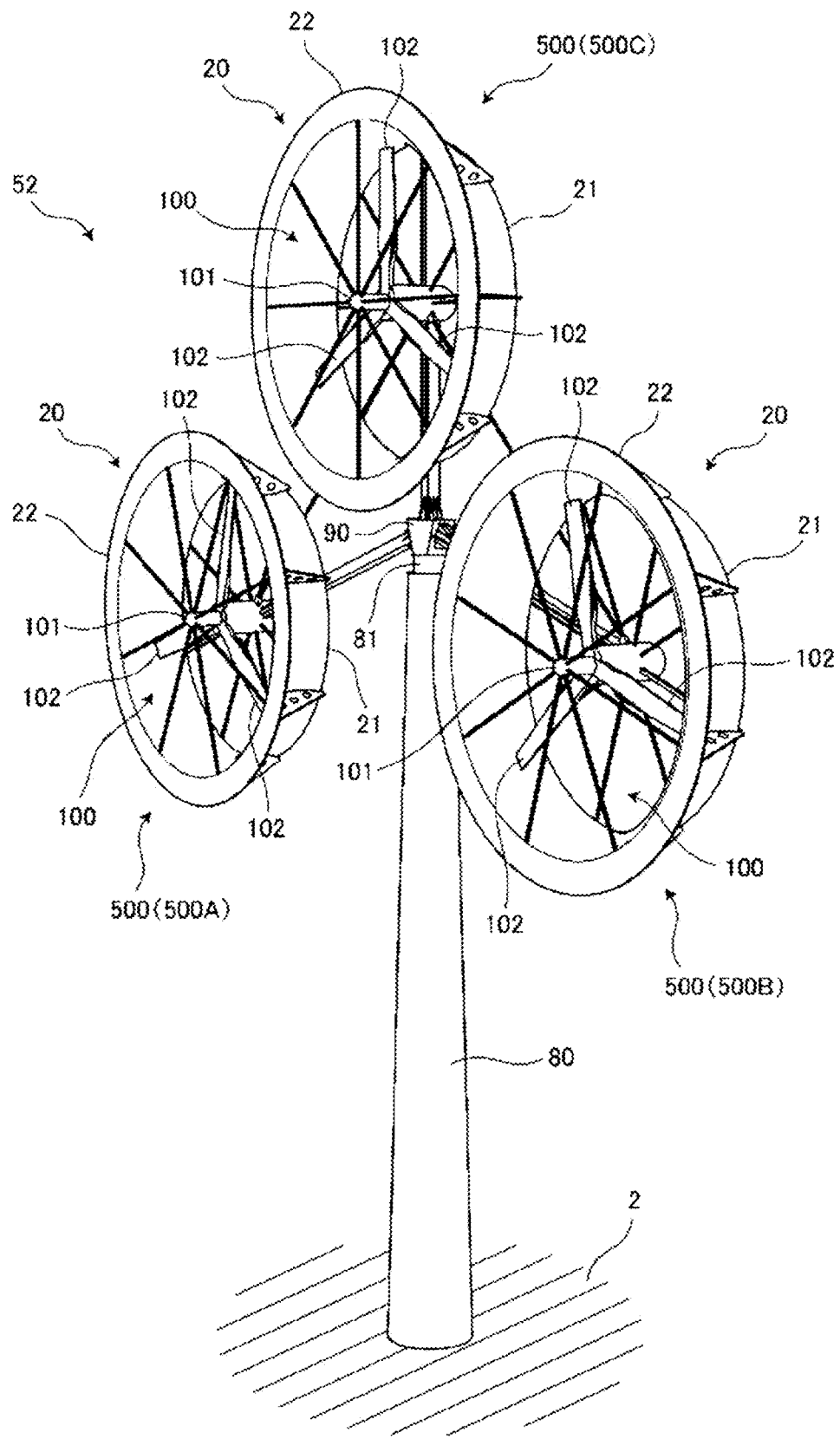
FIG. 20 is a perspective view from the back side showing the configuration of the wind power generation device according to the fifth embodiment of the present invention.

As shown in FIGS. 19 and 20, with the wind power generation device 52 according to the present embodiment, the three rotor mechanisms 500 are supported by a support mechanism structure installed such that it stands erect on the installation base 2 installed on the Earth's surface or the like. The support mechanism structure includes a support pole 80 arranged on the upwind side with respect to the three rotor mechanisms 500, and installed such that it stands erect on the installation base 20, and a support projecting portion 81 configured to have an approximately cylindrical structure such that it protrudes from the central portion of the top face of the support pole 80. Furthermore, a turning support unit 90 configured to have an inverted truncated pyramid shape is rotatably mounted on the upper side of the support projecting portion 81. The turning support unit 90 is mounted on the support projecting portion 81 via a predetermined turning mechanism.

The turning support unit 90 includes: an upper-side wind turbine support arm 91 configured such that it extends in the vertical direction; a right-side wind turbine support arm 92 configured such that it extends in the lower-right direction with a small negative slope angle; and a left-side wind turbine support arm 93 configured such that it extends in the lower-left direction with a small negative slope angle. The turning support unit 90 is configured as a support base for supporting the support arms. The wind turbine support arms 91 through 93 are mounted on the turning support unit 90 in a state in which they are reinforced by means of reinforcing ribs 91A through 91C with an angle θ of 90 degrees.

The top end of the upper-side wind turbine support arm 91 is connected to a fixed shaft portion 101 of the wind turbine 100 configured as an upper rotor mechanism 500C. Description will be made later regarding the configuration of the wind turbine 100 with reference to FIG. 21. Furthermore, the right end of the right-side wind turbine support arm 92 is connected to the fixed shaft portion 101 of the lower rotor mechanism 500A. Moreover, the right end of the right-side wind turbine support arm 93 is connected to a fixed shaft portion 101 of the lower rotor mechanism 500B. In addition, a support member 94 is provided between the fixed shaft portion 101 of the rotor mechanism 500C and the fixed shaft portion 101 of the rotor mechanism 500A so as to maintain the interval between them. Similarly, another support member 94 is provided between the fixed shaft portion 101 of the rotor mechanism 500C and the fixed shaft portion 101 of the rotor mechanism 500B so as to maintain the interval between them.

Furthermore, support arms 95 and support wire portions 96 are provided to each rotor mechanism 500 so as to connect the fixed shaft portion 101 of the wind turbine 100 and the wind conducting unit 20. The support arms 95 and the support wire portions 96 are each configured as a linear rod-shaped support member arranged in a radial direction of the wind conducting unit 20 as viewed along the rotor axial direction.

The support arm 95 is provided between the fixed shaft portion 101 and the wind conducting unit 20 on the front side of the wind conducting unit 20 such that it extends from the fixed shaft portion 101, and the end thus extended is connected to the opening edge of the wind inlet 20a side of the wind conducting unit 20. With the present embodiment, the end of the support arm 95 is connected to the front end of the phase control plate portion 23. With such an arrangement, three support arms 95 are provided for each of the wind support arms 91 through 93 such that one support arm 95 extends so as to define an extended line of the corresponding wind turbine support arm, and the other support arms 95 each extend along a direction that is orthogonal to the extended line.

The support wire portions 96 are each arranged such that one end thereof is connected to the fixed shaft portion 101 of the corresponding rotor mechanism 500, and such that the other end thereof is connected to the opening end portion on the wind inlet opening 20a side of the wind conducting unit 20 such that it does not overlap the support arm 95.

As described above, the wind power generation device 52 according to the fifth embodiment has a configuration in which the three rotor mechanisms 500 are respectively supported by the multiple (in this example, three) wind turbine support arms 91 through 93 mounted such that they extend from the single turning support unit 90. Such an arrangement has a markedly simple configuration as compared with the configurations described above with reference to FIGS. 1, 2, 9, and 10.

It should be noted that, with the wind power generation device 52 according to the fifth embodiment, the wind turbine support arms 91 through 93 respectively mounting the rotor mechanisms 500 are preferably arranged such that the turning support unit 90 configured as a support base matches the center of gravity of the three rotor mechanisms 500. By designing such a layout in which the turning support unit 90 matches the center of gravity of the three rotor mechanisms 500, such an arrangement provides the following advantage. That is to say, such an arrangement allows the moments generated due to the wind load (thrust force) received by each rotor mechanism 500 to cancel each other out even in strong wind. This provides the overall structure of the wind power generation device 52 with improved stability.

Furthermore, as with the wind power generation device 1 described in the first embodiment, such an arrangement provides a synergistic effect based on the layout of the three rotor mechanisms 5, thereby providing improved output capacity. Moreover, as with the wind power generation device 51 described in the second embodiment, the turning support unit 90 is configured to support the three rotor mechanisms 500 such that they can be rotated with respect to the support protrusion portion 80. Such an arrangement allows the orientations of the rotor mechanisms 500 to be changed as a single unit. For example, such an arrangement allows the three rotor mechanisms 500 to be turned according to the wind flow such that the wind inlet 20a side of the wind conducting unit 20 of each rotor mechanism 500 faces the upwind side at all times. By employing such a configuration, such an arrangement allows the orientations of the three rotor mechanisms 500 to be automatically adjusted so as to provide their maximum output. With such a rotating (turning) mechanism for adjusting the direction of each of the three rotor mechanisms 500, a mechanical rotation suppressing mechanism may be provide in order to suppress an extremely sensitive adjustment according to a slight change in the wind flow. Also, a control apparatus may be provided in order to suppress such an extremely sensitive adjustment.

It should be noted that, in a case in which the number of the rotor mechanisms 500 is four or more (which corresponds to an example shown in FIG. 12, 13, or 14), the rotor mechanisms 500 may be respectively supported by the support arms arranged such that they extend along respective (four or more) different directions. In this case, the turning support unit 90 is preferably arranged such that it matches the center of gravity of the rotor mechanisms 500.

Next, description will be made regarding a configuration of the rotor mechanism 500 according to the present fifth embodiment.

Figure 21:
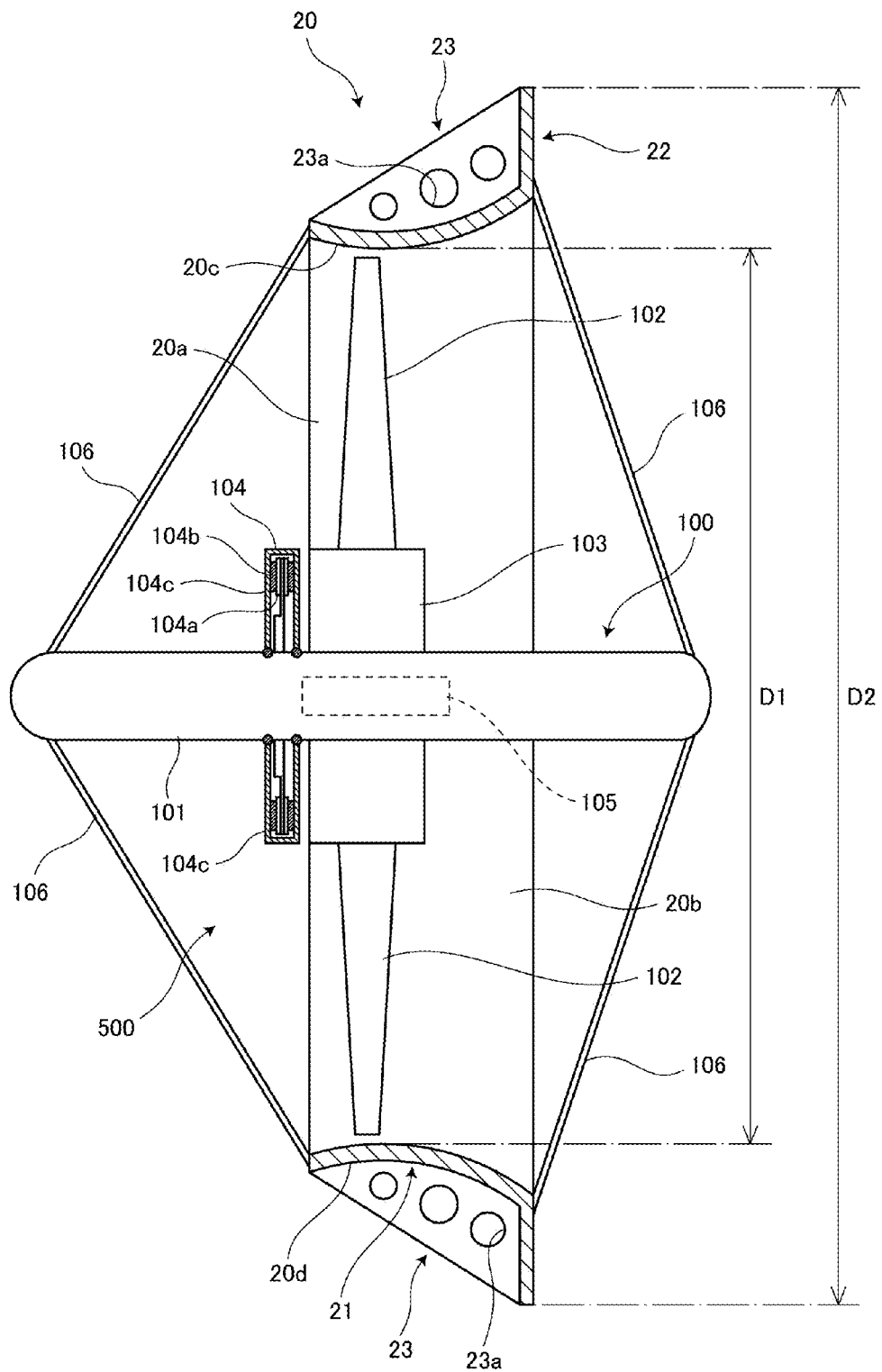
FIG. 21 is a longitudinal cross-sectional diagram showing a configuration of a rotor mechanism according to the fifth embodiment of the present invention.

FIG. 21 is a longitudinal cross-sectional diagram showing a configuration of a rotor mechanism 500 according to the fifth embodiment of the present invention. The point of difference form the rotor mechanism 5 is that the rotor mechanism 500 includes a wind turbine 100 instead of the wind turbine 30 (see FIG. 5) according to the first embodiment.

The wind turbine 100 is arranged within the wind conducting unit 20 in a concentric layout such that the central axis of the fixed shaft portion 101 is aligned with the central axis of the wind conducting unit 20.

The fixed shaft portion 101 is formed of a hollow thick steel tube, for example. The fixed shaft portion 101 is configured as a cylindrical or otherwise spindle-shaped housing, and arranged such that the longitudinal axial direction thereof is aligned with the rotational axial direction of the blades 20. The fixed shaft portion 101 is configured as a fixed shaft that cannot be rotated. The fixed shaft portion 101 includes: a front-side portion that is exposed to the external side via the wind inlet 20a of the wind conducting unit 20; and a rear-side portion that is exposed to the external side via the flange portion 22. The fixed shaft portion 101 includes, within its internal space, a pitch mechanism 104 for the blades 102. An outer rotor power generator 103 is mounted on the outer circumferential face of the fixed shaft portion 101.

The blades 102 are arranged radially from the outer circumferential face of the fixed shaft portion 101 via the outer rotor power generator 103 such that they are positioned closer to the wind inlet 20a side along the fixed shaft portion 101. The blades 102 are arranged such that the tip of each blade 102 does not come in contact with the inner circumferential face 20c of the wind conducting unit 20. More specifically, the blades 102 are arranged such that they are able to rotate with a clearance with respect to the inner circumferential face 20c. Description has been made in the present embodiment regarding an arrangement in which three blades 102 are arranged at regular intervals along the circumference of the fixed shaft portion 101. It should be noted that the number of the blades 102 and the shape of each blade 102 are not restricted in particular.

The outer rotor power generator 103 includes: a stator coil (which will also be referred to simply as the "coil" hereafter) 103a mounted on the outer circumferential face of the fixed shaft portion 101 such that it is fixed to the fixed shaft; and a magnet 103b arranged such that it covers the front side and the rear side of the coil 103a. The coil 103a and the magnet 103b are arranged within an outer shell 103c of the outer rotor power generator 103. With such an outer rotor power generator 103, the magnet 103b is rotated together with the outer shell 103c around the axis of the fixed shaft portion 101, thereby providing electric power generation. The outer rotor power generator 103 corresponds to a flywheel. It should be noted that internal heat generation occurs in the wind turbine when it enters the stalled state. However, the outer shell 103c and the fixed shaft portion 101 allow the heat thus generated to be released, thereby providing improved heat radiation performance.

The pitch mechanism 104 is mounted within the fixed shaft portion 101, and is configured to control the pitch angle of the blades 102. With the rotor mechanism 500 according to the fifth embodiment, the fixed shaft portion 101 having a hollow structure functions as a main axis, which is a point of difference from the aforementioned embodiments. Such a fixed shaft portion 101 having an internal space allows the wind turbine 100 to have a pitch angle control function (a control function for setting the blade pitch angle to approximately zero so as to allow the wind flow to pass through without generating lift force, i.e., feathering control). Such a pitch angle control function may be provided using known techniques, and accordingly, description thereof will be omitted.

Spokes 105 are each configured as a wire (thin wire) shaped support member that connects the fixed shaft portion 101 of the wind turbine 100 and the wind conducting unit 20 (which correspond to the support wire portions 96 shown in FIG. 19). Part of such spokes 105 are mounted between the fixed shaft portion 101 and the wind conducting unit 20 on the front side of the wind conducting unit 20 such that they extend from the front end of the fixed shaft portion 101, and the extending end thereof is connected to the opening edge portion on the wind inlet 20a side of the wind conducting unit 20. Furthermore, the other part of such spokes 105 are mounted between the fixed shaft portion 101 and the wind conducting unit 20 on the rear side of the wind conducting unit 20 such that they extend from the rear end of the fixed shaft portion 101, and the extending end thereof is connected to the opening edge of the flange portion 22 of the wind conducting unit 20.

By arranging at least four spokes 105 at respective positions, such an arrangement allows the wind conducting unit 20 to be supported along the upstream-downstream direction and along the upper-lower direction. Accordingly, such an arrangement provides each rotor mechanism 500 with strength, i.e., with structural stability with respect to the wind load that can be imposed on each rotor mechanism 500 in a strong wind. With conventional techniques, in a case in which such a rotor mechanism configured as a wind lens turbine is designed to have an extremely light weight, in many cases, this leads to an aerodynamic flutter problem due to its structure. Such spokes 105 allow the rotor mechanism 500 to solve such a problem. Furthermore, such spokes 105 require only low costs, thereby providing the rotor mechanism 500 with a low cost. Typically, each wind turbine configured as a component of a typical multi-rotor system is configured as a downwind-type wind turbine. By providing such an outer rotor power generator 103 and spokes 105 as described above, such a multi-rotor system may comprise upwind-type wind turbines.

As described above, with the rotor mechanism 500 according to the fifth embodiment, the fixed shaft portion 101 having a hollow structure is employed as its main axis. Thus, the internal space of the fixed shaft portion 101 allows the fixed shaft portion 101 to include the pitch mechanism 104. Furthermore, the wind collector (wind conducting unit 20) of the rotor mechanism 500 is fixedly supported by the outer rotor power generator 103 and the spokes 105, which solves the aforementioned structural problem. In addition, each rotor mechanism 500 requires no yaw mechanism, no nacelle, and no slip ring, thereby allowing the overall configuration thereof to be designed with a light weight and a simple structure. It should be noted that, with the wind power generation device 52 shown in FIG. 19 or 20, the rotor mechanism as described in the aforementioned embodiments (see FIG. 5) may be employed instead of the rotor mechanism 500.

Sixth Embodiment

Figure 22:
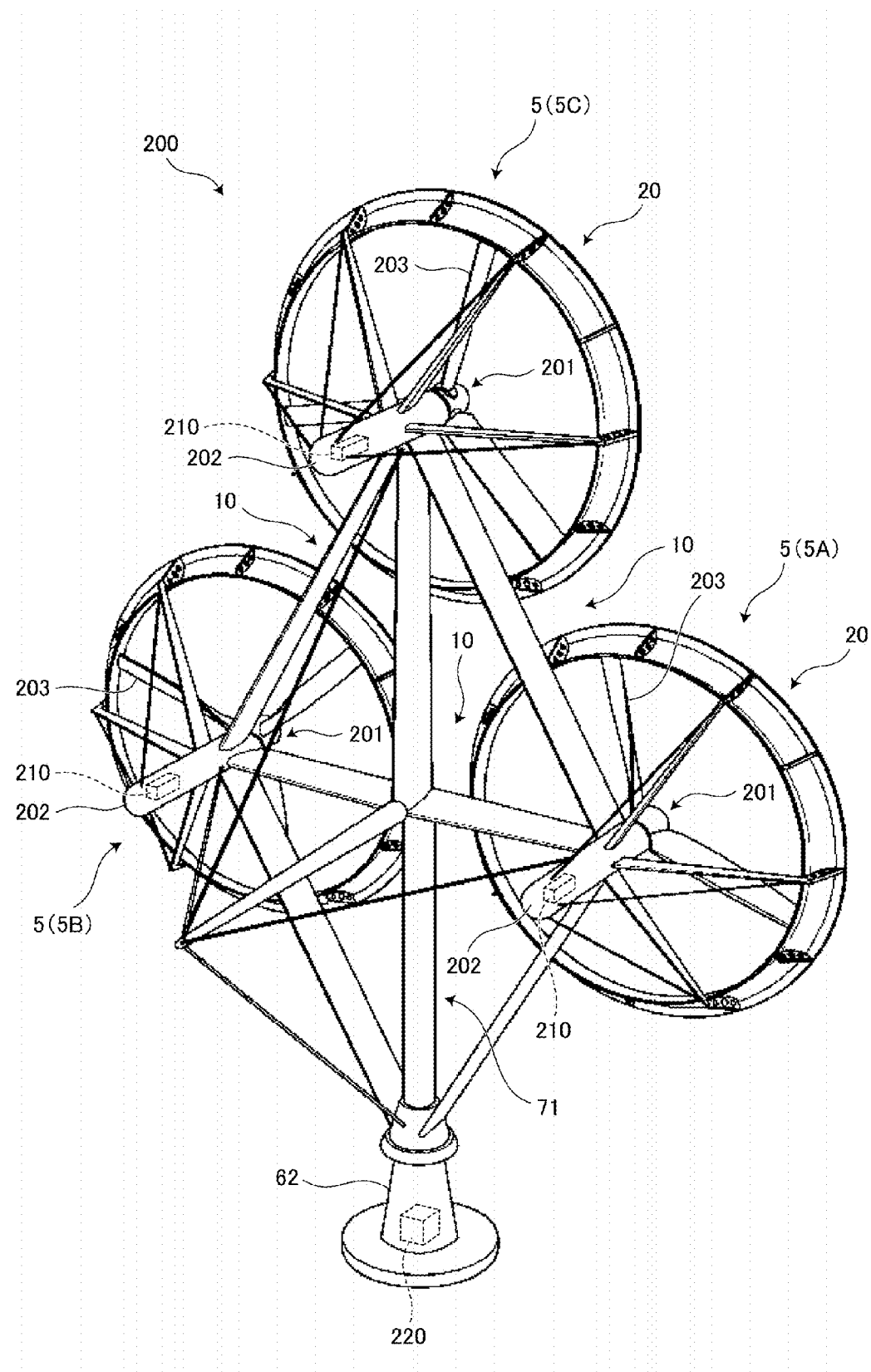
FIG. 22 is a diagram showing a schematic configuration of a wind power generation device according to a sixth embodiment of the present invention.

Description will be made with reference to FIG. 22 regarding a sixth embodiment of the present invention. FIG. 22 is a diagram showing a schematic configuration of a wind power generation device according to the sixth embodiment of the present invention. It should be noted that FIG. 22 shows a schematic configuration of a wind power generation device 200, which corresponds to the wind power generation device 51 (see FIG. 10) described above in the second embodiment. The wind power generation device 200 further includes a control unit 220 and driving units 210 each provided to the rotational shaft portion 202 of the wind turbine 201 of the corresponding one of the three rotor mechanisms 5, and each configured to drive the corresponding blades 203. The wind turbines 201, the rotational shaft units 202, and the blades 203 correspond to the wind turbines 30, the rotational shaft units 31, and the blades 32 shown in FIG. 10, respectively.

First, description will be made regarding the problem to be solved by the present sixth embodiment. Typically, a compact-size wind turbine has a fixed pitch angle. Accordingly, in a strong wind with a wind speed on the order of 10 m/s to 20 m/s, a large aerodynamic torque is generated, which leads to a problem of an excessive rotational speed beyond the limit determined by the blade material strength or the structural strength. Alternatively, in this case, such an excessive blade rotational speed leads to an increase in the wind load. In some cases, this leads to the occurrence of a large overturning moment, which is a problem. In a storm with a wind speed on the order of 20 m/s to 60 m/s, such a compact-size wind turbine receives a wind load that is greater than that in an ordinary wind state by 10 times or more. In some cases, this leads to a risk of collapse of the wind turbine main body, which is a problem.

In order to solve the aforementioned problem, with the wind power generation device 200 according to the present sixth embodiment, the driving units 210 and the control unit 220 perform the operations as described below based on a safety operation and safety shutdown in a strong wind state with a wind speed on the order of 10 m/s to 20 m/s, and a structural safety design that supports a storm state with a wind speed on the order of 20 m/s to 60 m/s.

The operation of each driving unit 210 is controlled by the control unit 220. The driving unit 210 is configured to rotationally drive the blades 203 with a predetermined rotational speed (angular speed) in a clockwise manner or otherwise in a counterclockwise manner. Furthermore, the driving unit 210 has a function of stopping the rotation of the blades 203. Specifically, the driving unit 210 is configured as a mechanism for rotationally driving an unshown rotor shaft included within the rotational shaft unit 200. The driving unit 210 is housed in the nacelle included in the rotational shaft unit 200.

The control unit 220 is configured as a control apparatus that performs a driving control operation for driving each driving unit 210. The control unit 220 is housed in the support protruding portion 62 configured as a bottom portion of the support pole. The control unit 220 is connected to each driving unit 210 via unshown wiring. It should be noted that, in the control operation of the control unit 220, upon detection of a strong wind state with a wind speed that is higher than a predetermined threshold wind speed by means of an unshown anemometer or the like, the control unit 220 instructs the lower rotor mechanisms 5A and 5B to enter different rotational states.

For example, the control unit 220 instructs a particular rotor mechanism 5B to enter a short-circuit state so as to stop the operation of the rotor mechanism 5B, thereby providing a difference in the rotational state between the lower rotor mechanisms 5A and 5B. In this state, the wind load received by the rotor mechanism 5B falls because, in such a short-circuit state, the rotor mechanism 5B stops its operation. This provides a difference in the wind load between the left and right rotor mechanisms 5A and 5B, which provides yaw rotation of the wind power generation device 200. As described above, such an arrangement allows the wind power generation device 200 to be forcibly turned by yaw rotation based on the passive characteristics of the yaw mechanism. That is to say, such an arrangement supports a furling control operation.

Furthermore, when the aforementioned control operation cannot provide a sufficient yawing torque, the control unit 220 instructs the rotor mechanism 5B, which has been stopped according to the aforementioned short-circuit control operation, to rotate in a rotational direction that is the reverse of that of the other rotor mechanism 5A. Such a control operation allows the rotor mechanism 5B to generate a momentum in a direction that is the reverse of the wind direction, thereby increasing the yaw moment around the vertical support portion 71 that functions as a yaw axis. Such an arrangement supports a furling control operation.

As described above, with the wind power generation device 200 according to the sixth embodiment, when strong wind or the like occurs, a control operation is performed for the lower pair of rotor mechanisms 5A and 5B arranged such that they face each other across the vertical support portion 71 that functions as a yaw axis, in order to provide a difference in the rotational state between them, thereby allowing the wind power generation device 200 to be forcibly turned by yaw rotation. Such an arrangement supports a safety operation and safety shutdown in a strong wind state with a wind speed on the order of 10 m/s to 20 m/s. Furthermore, such an arrangement is capable of protecting the wind power generation device 200 from collapsing or the like even in a storm state with a wind speed on the order of 20 m/s to 60 m/s.

It should be noted that description has been made in the present sixth embodiment as an example regarding an arrangement in which the three rotor mechanisms 5 are arranged. Also, the same control operation is preferably performed for a multi-rotor system comprising four or more rotor mechanisms 5. That is to say, in a case in which four or more rotor mechanisms 5 are arranged such that they can be rotated around the yaw axis extending in the vertical direction, such a control operation is performed for at least one pair of rotor mechanisms 5 arranged such that they face each other across the yaw axis, in order to provide a difference in the rotational state between the pair of rotor mechanisms 5. Also, in a case in which multiple rotor mechanisms 5 are arranged such that they face each other across the yaw axis, and in a case in which there are multiple rotor mechanisms 5 on one side, the aforementioned control operation is performed for at least one of such multiple rotor mechanisms 5 arranged on such one side. In particular, by performing the aforementioned control operation for the rotor mechanism 5 farthest from the yaw axis, such an arrangement is capable of raising the yaw moment with high efficiency.

As described above, with the fluid power generation device according to the present invention, the rotor (wind turbine) of each rotor mechanism is rotated using fluid flow such as wind flow, tidal current flow, or the like, so as to generate electric power. The fluid power generation device includes multiple rotor mechanisms each including a rotor having a wind collector structure or a water collector structure provided to its circumferential face. The multiple rotor mechanisms are arranged such that their rotational axes are aligned with the same direction. The fluid power generation device is configured as a unit-based structure system (multi-rotor system) comprising such multiple rotor mechanisms arranged at intervals so as to define suitable spaces between them in a layout defined in a predetermined plane that is orthogonal to the rotor axial direction.

For example, in a case of providing wind power generation, typically, a wind turbine system provides overall output represented by the product of the number (n) of the wind turbine units and the output of a single wind turbine unit when it is operated separately. In contrast, with the fluid power generation device according to the present invention, such an arrangement provides output that is equal to or greater than the output value represented by the product of the number of the wind turbine units and the output of a single wind turbine unit when it is operated separately. Thus, by arranging rotor mechanisms each configured as a general-purpose-scale rotor mechanism that exhibits the highest cost performance, such an arrangement provides a large output capacity, reduced aerodynamic noise, reduced costs, improved maintenance efficiency, and reduced weight. This provides a new style of wind turbine or water turbine having a great output capacity.

As a practical application of the fluid power generation device according to the present invention, the wind power generation device 1 according to the aforementioned embodiment may be configured using a compact-size wind lens turbine having an output capacity on the order of 3 kW as a basic unit, for example. It can be estimated that such an arrangement supports an increased output capacity on the order of 20 kW. Furthermore, it can be expected that, by employing a middle-size wind lens turbine having an output capacity on the order of 300 kW as such a basic unit, such an arrangement supports a great output capacity on the order of several megawatts. Typical wind lens turbines have an advantage of low noise. Accordingly, a multi-rotor system having a great output capacity on the order of several megawatts may be configured with such a middle-size wind lens turbine as a basic unit having an output capacity on the order of several hundred kW having an advantage of low aerodynamic noise on such an order that it does not become a problem. Such an arrangement provides a wind power generation device with a dramatic reduction in the aerodynamic noise that is a typical disadvantage of a large-size wind power generation device having an output capacity of several megawatts or more. Furthermore, such an arrangement provides a wind power generation device configured to operate without involving low-frequency noise. Thus, the present invention provides an environmentally friendly wind power generation device that is acceptable in society.

The wind power generation device as described in the embodiments is not restricted to the aforementioned embodiments. Rather, various kinds of modifications may be made to the embodiments without departing from the spirit and technical scope of the present invention.

REFERENCE SIGNS LIST 1 wind power generation device (fluid power generation device), 5 rotor mechanism, 10 wind turbine gap space, 20 wind conducting unit (casing), 20a wind inlet, 20b wind outlet, 21 main body portion, 22 flange portion, 30 wind turbine (rotor).

The invention claimed is:
1. A fluid power generation method employed in a fluid power generation device configured to perform electric power generation using a fluid action, wherein the fluid power generation device comprises a plurality of power generation mechanisms, wherein each of the power generation mechanisms comprises:

a casing configured to allow a fluid to pass through an interior thereof; and a power generation unit arranged within the casing, and configured to generate electric power using the fluid action, wherein the casing is configured to have a structure for generating vortexes in the vicinity of a fluid outlet, wherein the plurality of casings are arranged so as to define a space between each adjacent pair thereof, and wherein the fluid power generation method comprises:

generating, by means of each casing, the vortexes in the vicinity of the fluid outlet; and controlling the vortex so as to provide an interaction effect between the vortexes thus generated in the vicinity of the fluid outlets of the plurality of casings arranged with the spaces as intervals between them.

2. The fluid power generation method according to claim 1, wherein the fluid power generation device comprises at least a first power generation mechanism, a second power generation mechanism, and a third power generation mechanism, wherein the first power generation mechanism, the second power generation mechanism, and the third power generation mechanism are arranged in a layout other than a linear array layout, and wherein the space defined between the casing of the first power generation mechanism and the casing of the third power generation mechanism is larger than the space defined between the casing of the first power generation mechanism and the casing of the second power generation mechanism, and is larger than the space defined between the casing of the second power generation mechanism and the casing of the third power generation mechanism.

3. The fluid power generation method according to claim 1, wherein the fluid power generation device comprises at least a first power generation mechanism, a second power generation mechanism, and a third power generation mechanism, wherein the first power generation mechanism, the second power generation mechanism, and the third power generation mechanism are sequentially arranged in a linear array layout, so as to provide a vortex interaction effect between the first power generation mechanism and the second power generation mechanism, and between the second power generation mechanism and the third power generation mechanism, without involving such a vortex interaction effect between the first power generation mechanism and the third power generation mechanism.

4. The fluid power generation method according to claim 1, wherein the fluid power generation device comprises at least a first power generation mechanism, a second power generation mechanism, and a third power generation mechanism, and wherein a space between the casings of the first power generation mechanism and the second power generation mechanism, a space between the casings of the second power generation mechanism and the third power generation mechanism, and a space between the casings of the first power generation mechanism and the third power generation mechanism are each defined to have the same size.

5. The fluid power generation method according to claim 1, wherein a part of or otherwise all of the plurality of power generation mechanisms are arranged such that they can be rotated around a predetermined axis defined along a vertical direction, and wherein the fluid power generation device comprises a control unit configured to control a pair of the power generation mechanisms arranged such that they face each other across the predetermined axis so as to provide a difference in a load applied to the power generation unit between the pair of power generation mechanisms.

6. The fluid power generation method according to claim 1, wherein the casing comprises a flange portion configured to generate vortexes in the vicinity of the fluid outlet.

7. The fluid power generation method according to claim 1, wherein the orientations of the inner flows of the fluid that flows through the internal spaces of the respective casings are approximately in parallel with each other.

8. The fluid power generation method according to claim 1, wherein the casing is configured to generate vortexes in the vicinity of a fluid outlet thereof, so as to accelerate an inner flow speed of the fluid that flows through the casing, and wherein, in the acceleration of the inner flow speed of the fluid, the vortexes thus generated in the vicinity of the fluid outlet of each casing are controlled so as to provide an interaction effect between the plurality of casings arranged with the spaces as intervals between them, so as to raise the inner flow speed of the fluid that flows through each casing as compared with the inner flow speed provided without such an interaction effect.

9. The fluid power generation method according to claim 1, wherein the power generation unit comprises a rotor configured to rotate around a rotational axis and/or a rotor comprising an outer rotor generator comprising a coil fixed to a fixed shaft, and a magnet arranged on an outer circumferential side of the coil, and configured to rotate according to rotation of blades, and wherein the power generation unit further comprises a plurality of spokes each mounted between the casing and a front end or otherwise a rear end of the fixed shaft along an axial direction of the fixed shaft.

10. The fluid power generation method according to claim 1, wherein the fluid power generation device further comprises a casing member configured to surround the plurality of power generation mechanisms.

11. The fluid power generation method according to claim 1, wherein the space is defined with a size that is included within a range comprising 0.05 times to 1.5 times a maximum outer size of the casing.

12. A fluid power generation device configured to provide electric power generation using a fluid action, comprising a plurality of power generation mechanisms, wherein each of the power generation mechanisms comprises:

a casing that allows a fluid to pass through an internal space thereof; and a power generation unit arranged within the casing, and configured to perform electric power generation using the fluid action, wherein the casing is configured to have a shape for generating vortexes in the vicinity of a fluid outlet thereof, wherein the plurality of casings are arranged with spaces as intervals between them, and wherein the vortexes generated in the vicinity of the fluid outlet of each casing are controlled so as to provide an interaction effect between the plurality of casings arranged with the spaces as intervals between them.

13. The fluid power generation device according to claim 12, wherein the space is defined with a size that is included within a range comprising 0.05 times to 1.5 times a maximum outer size of the casing.

* * * * *